(12) United States Patent
Hong et al.

(10) Patent No.: US 10,064,103 B2
(45) Date of Patent: Aug. 28, 2018

(54) METHOD AND APPARATUS FOR PROCESSING USER PLANE DATA

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/488,608

(22) Filed: Apr. 17, 2017

(65) Prior Publication Data

US 2017/0223578 A1     Aug. 3, 2017

Related U.S. Application Data

(62) Division of application No. 15/511,296, filed as application No. PCT/KR2015/009741 on Sep. 16, 2015.

(30) Foreign Application Priority Data

Sep. 18, 2014    (KR) .................... 10-2014-0124570
Oct. 2, 2014    (KR) .................... 10-2014-0133265

(Continued)

(51) Int. Cl.
    *H04W 28/18*      (2009.01)
    *H04W 76/25*      (2018.01)
(Continued)

(52) U.S. Cl.
CPC ........... *H04W 28/18* (2013.01); *H04W 16/14* (2013.01); *H04W 76/045* (2013.01); *H04W 76/25* (2018.02); *H04W 84/12* (2013.01)

(58) Field of Classification Search
CPC ... H04W 28/18; H04W 16/14; H04W 76/045; H04W 84/12
(Continued)

(56) References Cited

U.S. PATENT DOCUMENTS 8,824,298 B2 *   9/2014   Gupta ..................... H04W 4/70
                                                        370/235
8,989,762 B1 *   3/2015   Negus ................... H04W 24/02
                                                        455/454
(Continued)

FOREIGN PATENT DOCUMENTS

WO      2012/148482 A1    11/2012

OTHER PUBLICATIONS

Intel Corporation, "New SI Proposal: LTE-WLAN Radio Level Integration", RP-141276, 3GPP TSG RAN Meeting #65, Edinburgh, Scotland, Sep. 9-12, 2014, pp. 1-6.

(Continued)

*Primary Examiner* — Hai V Nguyen
(74) *Attorney, Agent, or Firm* — IP Legal Services, LLC

(57) ABSTRACT

Provided are a method and apparatus for processing user plane data by a terminal. The method may include: receiving additional configuration information for additionally configuring a WLAN carrier using an unlicensed frequency band; receiving downlink user plane data through a base station carrier using the WLAN carrier or a licensed frequency band according to the additional configuration information; and transmitting included uplink user plane data through the WLAN carrier or the base station carrier according to the additional configuration information.

15 Claims, 26 Drawing Sheets

(30) Foreign Application Priority Data

| May 15, 2015 | (KR) | 10-2015-0067822 |
|---|---|---|
| Aug. 13, 2015 | (KR) | 10-2015-0114273 |
| Aug. 13, 2015 | (KR) | 10-2015-0114278 |

(51) Int. Cl.
*H04W 16/14* (2009.01)
*H04W 76/04* (2009.01)
*H04W 84/12* (2009.01)

(58) Field of Classification Search
USPC .......................................................... 455/509
See application file for complete search history.

(56) References Cited

U.S. PATENT DOCUMENTS

| | | | |
|---|---|---|---|
| 8,995,370 B2* | 3/2015 | Pelletier | H04W 72/0453 370/329 |
| 9,036,473 B2* | 5/2015 | Himayat | H04N 21/2365 370/231 |
| 9,264,928 B2* | 2/2016 | Liu | H04W 24/10 |
| 9,288,734 B2* | 3/2016 | Jha | H04W 36/22 |
| 9,414,223 B2* | 8/2016 | Ginzboorg | H04W 12/02 |
| 9,426,689 B2* | 8/2016 | Himayat | H04N 21/2365 |
| 9,510,133 B2* | 11/2016 | Gupta | H04W 4/70 |
| 9,510,387 B2* | 11/2016 | Vesterinen | H04W 8/02 |
| 9,585,048 B2* | 2/2017 | Ozturk | H04W 28/0205 |
| 9,713,019 B2* | 7/2017 | Negus | H04W 24/02 |
| 9,722,731 B2* | 8/2017 | Ozturk | H04L 1/1628 |
| 9,763,199 B2* | 9/2017 | Pelletier | H04W 52/146 |
| 2005/0181776 A1* | 8/2005 | Verma | H04W 48/16 455/418 |
| 2009/0318124 A1* | 12/2009 | Haughn | G06F 8/65 455/418 |
| 2011/0058531 A1* | 3/2011 | Jain | H04W 80/04 370/331 |
| 2013/0028069 A1* | 1/2013 | Pelletier | H04W 72/0453 370/216 |
| 2013/0083653 A1 | 4/2013 | Jain et al. | |
| 2013/0083661 A1 | 4/2013 | Gupta et al. | |
| 2013/0083726 A1 | 4/2013 | Jain et al. | |
| 2013/0083783 A1 | 4/2013 | Gupta et al. | |
| 2013/0084885 A1 | 4/2013 | Jain et al. | |
| 2013/0084894 A1 | 4/2013 | Jain et al. | |
| 2013/0086653 A1 | 4/2013 | Gupta | |
| 2013/0088983 A1 | 4/2013 | Pragada et al. | |
| 2013/0114446 A1* | 5/2013 | Liu | H04W 24/10 370/252 |
| 2013/0216043 A1* | 8/2013 | Ginzboorg | H04L 63/205 380/270 |
| 2013/0242783 A1 | 9/2013 | Horn et al. | |
| 2013/0242897 A1 | 9/2013 | Meylan et al. | |
| 2013/0242965 A1 | 9/2013 | Horn et al. | |
| 2013/0265972 A1 | 10/2013 | Shirani-Mehr et al. | |
| 2013/0268986 A1 | 10/2013 | Venkatachalam et al. | |
| 2013/0287139 A1 | 10/2013 | Zhu et al. | |
| 2013/0288686 A1 | 10/2013 | Chou | |
| 2013/0294390 A1 | 11/2013 | Yang et al. | |
| 2013/0294423 A1 | 11/2013 | Wang et al. | |
| 2014/0003270 A1 | 1/2014 | Maltsev et al. | |
| 2014/0010207 A1 | 1/2014 | Horn et al. | |
| 2014/0036669 A1 | 2/2014 | Yang et al. | |
| 2014/0050086 A1* | 2/2014 | Himayat | H04N 21/2365 370/230 |
| 2014/0079022 A1* | 3/2014 | Wang | H04W 36/22 370/331 |
| 2014/0101726 A1 | 4/2014 | Gupta et al. | |
| 2014/0112406 A1 | 4/2014 | Zhu et al. | |
| 2014/0161004 A1 | 6/2014 | Wang et al. | |
| 2014/0177427 A1 | 6/2014 | Yiu et al. | |
| 2014/0185523 A1 | 7/2014 | Davydov et al. | |
| 2014/0219185 A1 | 8/2014 | Etemad et al. | |
| 2014/0307622 A1 | 10/2014 | Horn et al. | |
| 2014/0348115 A1 | 11/2014 | Wang et al. | |
| 2014/0355529 A1 | 12/2014 | Zhu et al. | |
| 2014/0362704 A1* | 12/2014 | Jha | H04W 36/22 370/237 |
| 2014/0369201 A1* | 12/2014 | Gupta | H04W 4/70 370/235 |
| 2015/0029845 A1 | 1/2015 | Jain et al. | |
| 2015/0036495 A1 | 2/2015 | Venkatachalam et al. | |
| 2015/0117357 A1* | 4/2015 | Ozturk | H04W 28/0205 370/329 |
| 2015/0139079 A1 | 5/2015 | Zhu et al. | |
| 2015/0208274 A1* | 7/2015 | Himayat | H04N 21/2365 370/230 |
| 2015/0208286 A1* | 7/2015 | Ozturk | H04W 36/0022 370/331 |
| 2016/0073265 A1* | 3/2016 | Vutukuri | H04W 12/06 455/411 |
| 2016/0112896 A1* | 4/2016 | Karampatsis | H04W 28/0252 370/230.1 |
| 2016/0227504 A1 | 8/2016 | Etemad et al. | |
| 2016/0285716 A1* | 9/2016 | Pelletier | H04L 5/0098 |
| 2016/0302135 A1 | 10/2016 | Yang et al. | |
| 2016/0323027 A1 | 11/2016 | Zhu et al. | |
| 2016/0323798 A1 | 11/2016 | Horn et al. | |
| 2016/0337781 A1 | 11/2016 | Jain et al. | |
| 2017/0013565 A1* | 1/2017 | Pelletier | H04W 52/146 |
| 2017/0055313 A1* | 2/2017 | Sharma | H04W 76/15 |
| 2017/0094701 A1* | 3/2017 | Hong | H04W 76/022 |
| 2017/0134123 A1* | 5/2017 | Ozturk | H04L 1/1628 |
| 2017/0257265 A1* | 9/2017 | Hong | H04L 41/0803 |
| 2017/0311362 A1* | 10/2017 | Hong | H04W 84/12 |

OTHER PUBLICATIONS

Intel Corporation, "Stage-2 details of WLAN/3GPP Radio Interworking for LTE", R2-143177, 3GPP TSG-RAN W/G2 Meeting #87, Dresden, Germany, Aug. 18-22, 2014, pp. 1-2.

Sony, "Ue capabilities for WLAN Interworking", R2-143162, 3GPP TSG-RAN WG2 Meeting #87, Dresden, Germany, Aug. 18-22, 2014, pp. 1-3.

Samsung, "AS/NAS modelling for WLAN/3GPP radio interworking", R2-142214, 3GPP TSG-RAN2 Meeting #86, Seoul, Korea, May 19-23, 2014, pp. 1-3.

* cited by examiner

METHOD AND APPARATUS FOR PROCESSING USER PLANE DATA

CROSS REFERENCE TO RELATED APPLICATIONS

The present application is a Divisional of pending U.S. patent application Ser. No. 15/511,296 (filed on Mar. 15, 2017), which is a National Stage Patent Application of PCT International Patent Application No. PCT/KR2015/009741 (filed on Sep. 16, 2015) under 35 U.S.C. § 371, which claims priority to Korean Patent Application Nos. 10-2014-0124570 (filed on Sep. 18, 2014), 10-2014-0133265 (filed on Oct. 2, 2014), 10-2015-0067822 (filed on May 15, 2015), 10-2015-0114273 (filed on Aug. 13, 2015), and 10-2015-0114278 (filed on Aug. 13, 2015), the teachings of which are incorporated herein in their entireties by reference.

TECHNICAL FIELD

The present disclosure relates to a method and an apparatus for processing user plane data by a terminal and a base station. More specifically, the present disclosure relates to a method and an apparatus for transmitting and receiving user plane data by adding a wireless local area network (WLAN) to an evolved UMTS terrestrial radio access network (E-UTRAN) carrier in a radio access network (RAN) level.

BACKGROUND ART

Due to advance in a communication system, various types of wireless terminals have been introduced to consumers, such as companies and individuals. The current $3^{rd}$ generation partnership project (3GPP) family of mobile communication systems, such as LTE (Long Term Evolution) or LTE-Advanced, is a high-speed and large-capacity communication system. Such a communication system can provide a service for transmitting and receiving a various types of data, such as images or wireless data, as well as a voice data. Accordingly, there is demand for developing technology for transmitting a large amount of data at a high speed as fast as transmission in a wired communication network. For transmitting a large amount of data at a high speed, data may be efficiently transmitted by using a plurality of cells.

However, a base station has a limitation to provide a communication service to a plurality of terminals. For example, a base station uses limited frequency resources to provide a communication service to a plurality of terminals with a large amount of data. Because of the limited frequency resources, a communication service provider (e.g., carrier) needs to secure exclusive frequency resources, and such securement of frequency resources may require a high cost.

Meanwhile, an unlicensed frequency band is not allowed to be exclusively used by a specific communication service provider. The unlicensed frequency band may be shared by a plurality of communication service providers or communication systems. For example, a wireless local area network (WLAN) technology (e.g., WiFi) provides a data transmission/reception service by using frequency resources of the unlicensed band.

Therefore, it is required to develop technology for enabling a mobile communication system to transmit and receive data by using an access point (AP) of the corresponding WiFi.

DETAILED DESCRIPTION OF THE INVENTION

Technical Problem

The present disclosure has been made based on such a background, and provides a downlink data transmission method of a base station and an uplink data transmission method of a terminal when the base station and the terminal transmit and receive data by using a WLAN carrier.

In addition, the present disclosure provides a detailed method and apparatus for configuring data transmitting/receiving paths to be different for each bearer when the terminal and the base station transmit and receive data by configuring a WLAN carrier.

In addition, the present disclosure provides a method and apparatus for identifying a safe transfer of data even when the base station and the terminal transmit and receive data by using a WLAN carrier.

In addition, the present disclosure provides a method and apparatus for performing a Packet Data Convergence Protocol (PDCP) function in the E-UTRAN, similar to performing the PDCP in a WLAN carrier.

Technical Solution

The present disclosure to solve the problems above provides a method for processing user plane data by a terminal, which may include: receiving additional configuration information to further configure a WLAN carrier that uses an unlicensed frequency band; receiving downlink user plane data through the WLAN carrier or through a base station carrier that uses a licensed frequency band according to the additional configuration information; and transmitting included uplink user plane data through the WLAN carrier or through the base station carrier according to the additional configuration information.

In addition, the present disclosure provides a method for processing user plane data by a base station, which may include: creating and transmitting additional configuration information to further configure a WLAN carrier that uses an unlicensed frequency band; transmitting downlink user plane data through the WLAN carrier or through a base station carrier that uses a licensed frequency band according to the additional configuration information; and receiving uplink user plane data through the WLAN carrier or through the base station carrier according to the additional configuration information.

In addition, the present disclosure provides a terminal for processing user plane data, which may include: a receiving unit that is configured to receive additional configuration information to further configure a WLAN carrier that uses an unlicensed frequency band, and is configured to receive downlink user plane data through the WLAN carrier or through a base station carrier that uses a licensed frequency band according to the additional configuration information; and a transmitting unit that is configured to transmit included uplink user plane data through the WLAN carrier or through the base station carrier according to the additional configuration information.

In addition, the present disclosure provides a base station for processing user plane data, which may include: a transmitting unit that is configured to create and transmit additional configuration information to further configure a WLAN carrier that uses an unlicensed frequency band, and is configured to transmit downlink user plane data through the WLAN carrier or through a base station carrier that uses a licensed frequency band according to the additional configuration information; and a receiving unit that is configured to receive uplink user plane data through the WLAN carrier or through the base station carrier according to the additional configuration information.

In addition, the present disclosure provides a method for processing data by a terminal, which may include: configuring an interface and a user plane entity for transmitting and receiving data to and from a base station through a WLAN carrier; receiving user plane data from the base station through the interface; and transmitting control information indicating the successful or unsuccessful reception of the user plane data to the base station through the interface or through the interface between the terminal and the base station. The present disclosure provides a method in which the user plane entity is configured to be associated with each data radio bearer. In addition, the method of the present disclosure may further include receiving radio bearer configuration information that includes configuration information for configuring the user plane entity through an upper layer signaling. The present disclosure provides a method in which the control information is provided in the user plane entity or the PDCP entity. The present disclosure provides a method in which the transmission of the control information is triggered based on at least one of a polling of the base station or a period or timer that is set by the base station.

In addition, the present disclosure provides a method for processing data by a base station, which may include: configuring an interface and a user plane entity for transmitting and receiving data to and from a terminal through a WLAN carrier; transmitting user plane data to the terminal through the interface; and receiving control information indicating the successful or unsuccessful reception of the user plane data from the terminal through the interface or through the interface between the terminal and the base station. The present disclosure provides a method in which the user plane entity is configured to be associated with each data radio bearer. In addition, the method of the present disclosure may further include transmitting radio bearer configuration information that includes configuration information for configuring the user plane entity through an upper layer signaling. The present disclosure provides a method in which the control information is provided in the user plane entity or the PDCP entity of the terminal. The present disclosure provides a method in which the transmission of the control information is triggered based on at least one of a polling of the base station or a period or timer that is set by the base station.

In addition, the present disclosure provides a terminal for processing data that may include: a controller that is configured to configure an interface and a user plane entity for transmitting and receiving data to and from a base station through a WLAN carrier; a receiving unit that is configured to receive user plane data from the base station through the interface; and a transmitting unit that is configured to transmit control information indicating the successful or unsuccessful reception of the user plane data to the base station through the interface or through the interface between the terminal and the base station. The present disclosure provides a terminal in which the user plane entity is configured to be associated with each data radio bearer. In addition, the present disclosure provides a terminal that further executes transmitting radio bearer configuration information that includes configuration information for configuring the user plane entity through an upper layer signaling. The present disclosure provides a terminal in which the control information is provided in the user plane entity or the PDCP entity of the terminal. The present disclosure provides a terminal in which the transmission of the control information is triggered based on at least one of a polling of the base station or a period or timer that is set by the base station.

In addition, the present disclosure provides a base station for processing data that may include: a controller that is configured to configure an interface and a user plane entity for transmitting and receiving data to and from a terminal through a WLAN carrier; a transmitting unit that is configured to transmit user plane data to the terminal through the interface; and a receiving unit that is configured to receive control information indicating the successful or unsuccessful reception of the user plane data from the terminal through the interface or through the interface between the terminal and the base station. The present disclosure provides a base station in which the user plane entity is configured to be associated with each data radio bearer. In addition, the present disclosure provides the base station that further executes transmitting radio bearer configuration information that includes configuration information for configuring the user plane entity through an upper layer signaling. The present disclosure provides a base station in which the control information is provided in the user plane entity or the PDCP entity of the terminal. The present disclosure provides a base station in which the transmission of the control information is triggered based on at least one of a polling of the base station or a period or timer that is set by the base station.

Advantageous Effects

The present disclosure described above has an effect of providing a downlink data transmission method of a base station and an uplink data transmission method of a terminal when the base station and the terminal transmit and receive data by using a WLAN carrier.

In addition, the present disclosure has an effect of providing a detailed method and apparatus for configuring data transmission/reception paths to be different for each bearer when the terminal and the base station transmit and receive data by configuring a WLAN carrier.

In addition, the present disclosure gives an effect for operating the typical PDCP function in the same manner even when the base station and the terminal transmit and receive data by adding a WLAN carrier.

In addition, the present disclosure gives an effect of transmitting data in sequence without duplicately using the sequence numbers even when the base station and the terminal transmit and receive data by adding a WLAN carrier.

MODE FOR CARRYING OUT THE INVENTION

Figure 1:
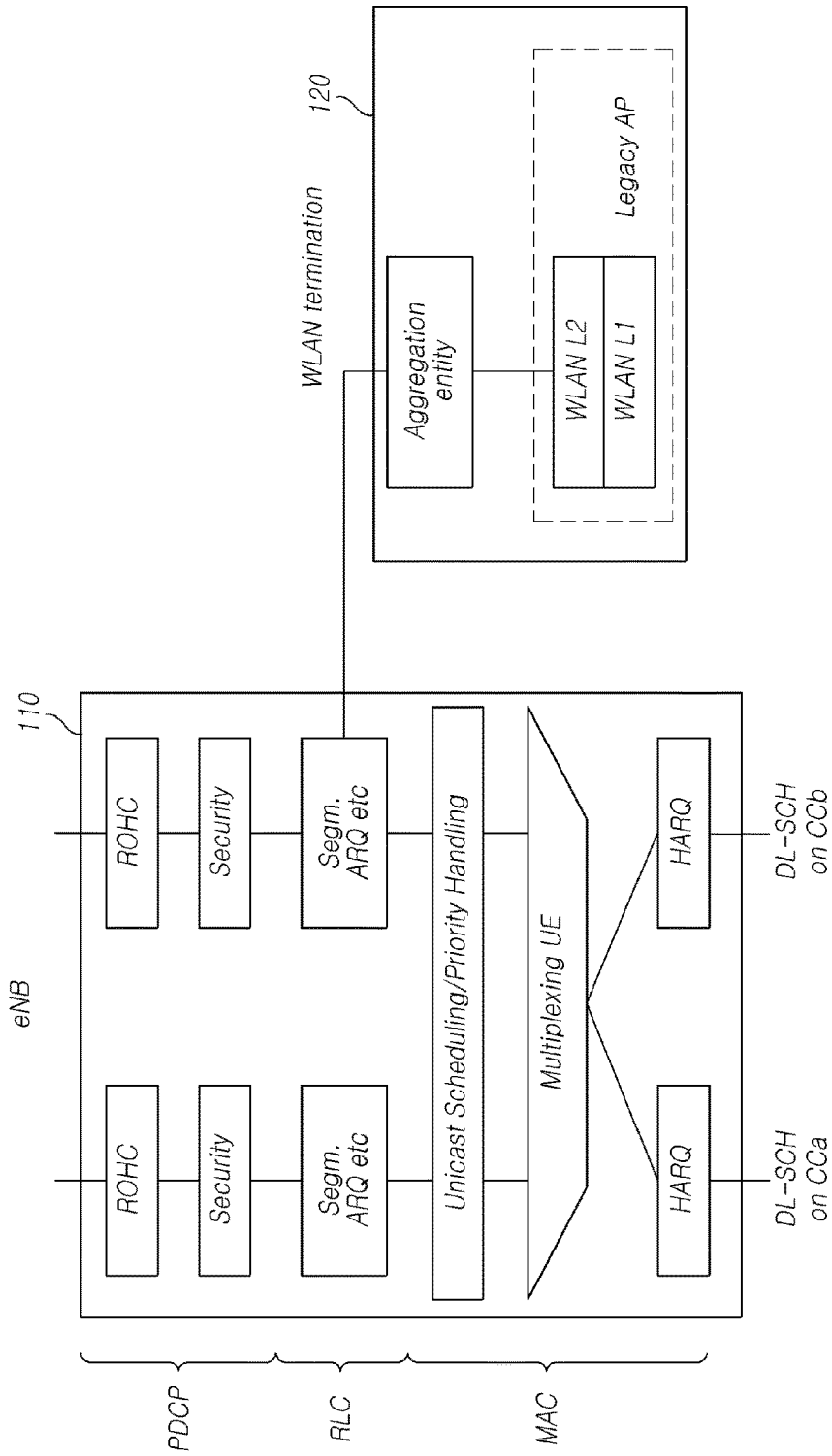
FIG. 1 is a view exemplary illustrating a configuration diagram of Layer 2 for the downlink, according to at least one embodiment of the present disclosure.

Hereinafter, some embodiments of the present disclosure will be described in detail through illustrative drawings. With regard to reference numerals for elements of each drawing, it should be noted that the same element will bear the same reference numeral even when it is shown in other drawings. Further, in the following description of the present disclosure, the detailed description of related well-known configurations or functions will be omitted if it is determined to obscure the subject matter of the present disclosure.

In the present specification, a machine type communication (MTC) terminal may refer to a terminal that supports a low cost (or low complexity), or the MTC may refer to a terminal that supports coverage enhancement. In the present specification, an MTC terminal may refer to a terminal that supports a low cost (or low complexity) and coverage enhancement. Alternatively, in the present specification, an MTC terminal may refer to a terminal that is defined as a specific category to support a low cost (or low complexity) and/or coverage enhancement.

A wireless communication system is widely deployed to provide various communication services, such as voice or packet data, in the present disclosure. The wireless communication system includes user equipment (UE) and a base station (BS or eNB). In the present disclosure, the user equipment has a comprehensive concept to refer to a terminal in wireless communication, and it should be interpreted as a concept encompassing a mobile station (MS), a user terminal (UT), a subscriber station (SS), and a wireless device in GSM, as well as user equipment in WCDMA, LTE, HSPA, or the like.

A base station or a cell generally refers to a station to communicate with the user equipment, and may be referred to as another name, such as Node-B, evolved Node-B (eNB), a sector, a site, a base transceiver system (BTS), an access point, a relay node, a remote radio head (RRH), a radio unit (RU), a small cell, or the like.

That is, a base station or a cell should be interpreted to encompass a partial area or function that is covered by a base station controller (BSC) in CDMA, Node-B in WCDMA, or eNB or a sector (site) in LTE, and has a meaning that encompasses a variety of coverage areas, such as a mega-cell, a macro-cell, a micro-cell, a pico-cell, a femto-cell, a relay node, RRH, RU, small cell communication ranges, or the like.

The various cells described above have a base station for controlling each cell, and the base station may be interpreted in two senses. i) The base station may indicate a device itself that provides a mega-cell, a macro-cell, a micro-cell, a pico-cell, a femto-cell, or a small cell in relation to the wireless area, or ii) the base station may indicate the wireless area itself. The same entity that controls the devices for providing a predetermined wireless area in i) or all devices that interact with each other to cooperatively configure the wireless area may be indicated as a base station. The base station may include eNB, RRH, an antenna, RU, LPN, a point, a transmission/reception point, a transmission point, or a reception point depending on the configuration method of the wireless area. The base station may be indicated as a wireless area itself in which signals are transmitted and received in terms of user equipment or from a position of a nearby base station.

Therefore, a mega-cell, a macro-cell, a micro-cell, a pico-cell, a femto-cell, a small cell, RRH, an antenna, RU, LPN (Low Power Node), a point, eNB, a transmission/reception point, a transmission point, and a reception point may be collectively referred to as a base station.

In the present specification, the user equipment and the base station will be used to have a comprehensive meaning to indicate two main transmission and reception entities that are used to implement the technology or technical concept described in the present specification, and are not limited to specific terms or words. The user equipment and the base station will be used to have a comprehensive meaning to indicate two (uplink and downlink) main transmission and reception entities that are used to implement the technology or technical concept described in the present specification, and are not limited to specific terms or words. Here, the uplink (UL) refers to a scheme for transmitting and receiving data to and from the base station by the user equipment, and the downlink (DL) refers to a scheme for transmitting and receiving data to and from the user equipment by the base station.

Multiple access techniques applied to the wireless communication system are not limited. Various multiple access techniques may be used, such as code division multiple access (CDMA), time division multiple access (TDMA), frequency division multiple access (FDMA), orthogonal frequency division multiple access (OFDMA), OFDM-FDMA, OFDM-TDMA, OFDM-CDMA, or the like. One embodiment of the present disclosure may be applied to the resource allocation in asynchronous wireless communication schemes that evolve to LTE and LTE-Advanced through GSM, WCDMA, and HSPA, and in synchronous wireless communication schemes that evolve to CDMA, CDMA-2000, and UMB. The present disclosure should not be construed to be limited or restricted to a specific wireless communication scheme, and should be construed to include all the technical fields to which the spirit of the invention can be applied.

The uplink transmission and downlink transmission may use a time division duplex (TDD) scheme that transmits data at different times, or may use a frequency division duplex (FDD) scheme that transmits data with different frequencies.

In addition, in the system, such as LTE, LTE-Advanced, or the like, the uplink and downlink are configured for a standard based on a single carrier wave or a pair of carrier waves. The uplink and downlink transmit control information through a control channel, such as a physical downlink control channel (PDCCH), a physical control format indicator channel (PCFICH), a physical hybrid ARQ indicator channel (PHICH), a physical uplink control channel (PUCCH), an enhanced physical downlink control channel (EPDCCH), or the like, and transmit data by configuring a data channel, such as a physical downlink shared channel (PDSCH), a physical uplink shared channel (PUSCH), or the like.

Meanwhile, the control information may also be transmitted by using EPDCCH (enhanced PDCCH or extended PDCCH).

In the present specification, the cell may refer to: coverage of signals transmitted from a transmission point or transmission/reception point; a component carrier that has a coverage of signals transmitted from a transmission point or transmission/reception point; or a transmission point or transmission/reception point itself.

A wireless communication system to which the embodiments are applied may be a coordinated multi-point transmission/reception system (CoMP system) that transmits signals in cooperation with two or more transmission/reception points, a coordinated multi-antenna transmission system, or a coordinated multi-cell transmission system. The CoMP system may include two or more multi-transmission/reception points and terminals.

The multi-transmission/reception point may be a base station or a macro-cell (hereinafter, referred to as 'eNB') and one or more RRHs that are wiredly controlled while being connected to the eNB through an optic cable or optical fiber, and have a high transmission power or have a low transmission power in the macro-cell area.

Hereinafter, the downlink will refer to communication or a communication path from a multi-transmission/reception point to a terminal, and the uplink will refer to communication or a communication path from a terminal to a multi-transmission/reception point. In the downlink, a transmitter may be a part of the multi-transmission/reception point, and a receiver may be a part of the terminal. In the uplink, a transmitter may be a part of the terminal, and a receiver may be a part of the multi-transmission/reception point.

Hereinafter, the operation in which a signal is transmitted or received through a channel, such as PUCCH, PUSCH, PDCCH, EPDCCH, or PDSCH, will also be expressed as "PUCCH, PUSCH, PDCCH, EPDCCH, or PDSCH is transmitted or received".

In addition, the expression "PDCCH is transmitted or received or a signal is transmitted or received through PDCCH" may be used as a meaning that includes "EPDCCH is transmitted or received or a signal is transmitted or received through EPDCCH".

That is, a physical downlink control channel to be described below is used to refer to PDCCH, EPDCCH, or both of them.

In addition, for the convenience of explanation, the EPDCCH that is an embodiment of the present disclosure may be applied to the description that is made of the PDCCH, and the EPDCCH as an embodiment of the present disclosure may be applied to the description that is made of the EPDCCH.

Meanwhile, the upper layer signaling described below includes an RRC signaling that transmits RRC information including RRC parameters.

The eNB performs a downlink transmission to the terminals. The eNB may transmit a physical downlink shared channel (PDSCH) that is a main physical channel for a unicast transmission, and may transmit a physical downlink control channel (PDCCH) for transmitting downlink control information, such as scheduling necessary for the reception of the PDSCH, and scheduling approval information for the transmission in an uplink data channel {for example, a physical uplink shared channel (PUSCH)}. Hereinafter, the operation in which a signal is transmitted or received through each channel will be expressed such that the corresponding channel is transmitted or received.

In the typical 3GPP Release 12, there was a discussion about technology of 3GPP/WLAN interworking. The 3GPP/WLAN interworking technology provides a RAN assisted WLAN interworking function. The E-UTRAN can assist with the terminal-based bi-directional traffic steering between the E-UTRAN and the WLAN with respect to the terminals in the state of RRC_IDLE and RRC_CONNECTED.

The E-UTRAN provides assistance parameters to the terminal through a broadcast signaling or dedicated RRC signaling. RAN assistance parameters may include at least one of an E-UTRAN signal intensity threshold value, a WLAN channel usage threshold value, a WLAN backhaul data rate threshold value, a WLAN signal strength, or an offload preference indicator. In addition, the E-UTRAN may provide a list of WLAN identifiers to the terminal through the broadcast signaling.

The terminal uses the RAN assistance parameters for evaluating access network selection and traffic steering rules. When the access network selection and traffic steering rules are fulfilled, the terminal may indicate the same in an access stratum (AS) upper layer.

When the terminal applies the access network selection and traffic steering rules, the terminal makes a traffic control in an APN granularity between the E-UTRAN and the WLAN. As described above, the RAN assisted WLAN interworking function provides only a method in which the E-UTRAN and the WLAN are built to stand alone and perform an interwork function.

However, according to the interworking function described above, since the E-UTRAN and the WLAN are built to stand alone and interwork with each other, it is impossible for the base station to tightly control the wireless resources in consideration of the wireless state or mobility of the terminal. Therefore, there is a growing need for a technology that considers tighter integration in the RAN level than the Release 12 RAN assisted WLAN interworking function. That is, there is a problem in which the terminal cannot use an E-UTRAN carrier and a WLAN carrier at the same time by adding the WLAN carrier to the E-UTRAN as a carrier in the RAN level by means of the E-UTRAN in consideration of the wireless state or mobility of the terminal in the transmission of specific user plane data. In addition, the terminal cannot effectively select the E-UTRAN carrier and the WLAN carrier for usage in consideration of the wireless state, mobility, or power consumption. The WLAN carrier described above refers to a wireless resource of the WLAN, and may mean a WLAN wireless link, a WLAN radio frequency, a WLAN wireless resource, or a WLAN wireless network. However, for the convenience of understanding, a WLAN wireless link, a WLAN radio frequency, a WLAN wireless resource, or a WLAN wireless network will be expressed as a WLAN carrier hereinafter. Meanwhile, the typical carrier that is used for the data transmission and reception between the terminal and the base station will be expressed as an LTE carrier, an E-UTRAN carrier, or a base station carrier.

In addition, an RLC layer or a PDCP layer below means a logical layer that performs a function thereof, and may be implemented in the terminal and the base station. In addition, conceptual entities for performing the RLC layer and the PDCP layer will be referred to as an RLC entity and a PDCP entity, respectively. Therefore, the RLC layer and the RLC entity may be interchangeably used as necessary. Likewise, the PDCP layer and the PDCP entity may be interchangeably used as necessary.

Meanwhile, the terminal may utilize the LTE carrier and the WLAN carrier at the same time. To this end, the terminal may split (or route)/integrate (or aggregate) a user plane data unit to be transmitted in a layer of L4 or more (for example, an application layer, a session layer, a transmission layer, or a core network upper layer), and may use the LTE carrier and the WLAN carrier in the execution of data communication. However, such methods have no standardized procedure, or it is impossible to quickly add/release the WLAN carrier by effectively considering the wireless environment of the RAN level and the mobility of the terminal.

As described above, according to the typical E-UTRAN, it is impossible to simultaneously use the E-UTRAN carrier and the WLAN carrier by adding the WLAN carrier as a carrier to the E-UTRAN in the RAN level when the terminal transmits specific user plane data.

In addition, the typical method for using the LTE carrier and the WLAN carrier by splitting/integrating a data unit in an application layer, a session layer, a transmission layer, or a core network has a problem in which there is no standardized procedure, or the wireless environment of the RAN level, the mobility of the terminal, or the power consumption thereof cannot be effectively considered.

The present disclosure has been made in order to solve the problems above, and the objective of the present disclosure is to provide a method for enabling the terminal i) to add a WLAN carrier as a carrier in the E-UTRAN to the terminal in the RAN level, and ii) to effectively select the E-UTRAN carrier or the WLAN carrier with respect to the downlink and uplink in consideration of the wireless environment, the mobility, or the power consumption to then transmit the user plane data when the terminal transmits specific user plane data.

The present disclosure may be provided from the scenario in which a base station (eNode-B) and a WLAN termination are co-located. The present disclosure may also be provided from the scenario in which a base station (eNode-B) and a WLAN termination are not co-located. In the scenario in which a base station (eNode-B) and a WLAN termination are not co-located, the base station and the WLAN termination may be connected through a non-ideal backhaul, a near-ideal backhaul, or an ideal backhaul.

The WLAN termination (WT) refers to a logical WLAN network node in the present specification. For example, the WT may be a WLAN access point (AP) or a WLAN access controller (AC). The WLAN termination may be the same WLAN network node as an existing WLAN termination or an existing WLAN AC, or the WLAN termination may be a WLAN network node that includes an additional function for the WLAN aggregation transmission in addition to the existing WLAN termination or the existing WLAN AC. The WLAN termination may be implemented as a standalone entity, or the WLAN termination may be implemented as a functional entity that is included in another entity.

For the terminal to add a WLAN carrier as a carrier of the E-UTRAN to the terminal in the RAN level and to transmit the user plane data by using the E-UTRAN carrier and the WLAN carrier, a protocol structure for the same and the operation of each layer should be provided.

The operation of enabling the E-UTRAN to add the WLAN or WLAN carrier as a carrier may logically or conceptually mean that the terminal and the base station add an additional WLAN carrier or a WLAN PHY/MAC (or L1/L2) transmission function to an existing E-UTRAN cell.

Hereinafter, the structure for transmitting and receiving the downlink user plane data and the uplink user plane data of the present disclosure will be described with reference to the embodiments. Therefore, the respective transmitting and receiving structures may be connected to each other, or may be applied independently.

<Protocol Provision Structure for Downlink User Plane Data Transmission>

1) Split/Aggregation Structure

Split/Aggregation Structure in RLC Layer

FIG. 1 is a view exemplary illustrating a configuration diagram of Layer 2 for the downlink, according to at least one embodiment of the present disclosure.

The E-UTRAN may transmit user plane data in an RLC layer by providing a split/aggregation function as shown in FIG. 1 when transmitting the user plane data by adding a WLAN carrier as a carrier.

The RLC layer provides a function of segmenting and/or concatenating RLC SDUs to allow PDUs to conform to a total size of an RLC PDU that is indicated by a lower layer in a specific transmission opportunity notified of by the lower layer. In addition, the RLC layer provides an error correction function through ARQ for the transmission of acknowledged mode (AM) data.

Since the data transmission (or retransmission) through the WLAN carrier is provided through the WLAN PHY/MAC (or L1/L2) layer, it may not be necessary for the RLC layer to conduct the segmentation and/or concatenation through the interworking with a WLAN MAC layer that is a different standard. However, the RLC layer may provide an HARQ reordering function. Thus, when the E-UTRAN wishes to use the WLAN carrier as a carrier in the RLC layer, the data, which is received through the WLAN carrier different from the E-UTRAN, is reordered by using the HARQ reordering function (or the reordering of the RLC layer) and then is transmitted in sequence. If the E-UTRAN supports the transmission by using a plurality of WLANs (or WLAN APs) for any purpose, such as the improvement of the WLAN coverage, the reordering may also be applied to the case where the RLC layer accommodates a plurality of WLANs (or WLAN APs). To this end, the transmitting end of the AM RLC entity may not segment and/or concatenate the RLC SDUs that are to be split and transferred to the WLAN termination 120 when forming the AMD PDUs from the RLC SDUs.

Alternatively, the transmitting end of the AM RLC entity may perform the retransmission of the RLC data PDUs. The transmitting end of the AM RLC entity may not segment and/or concatenate the RLC PDUs in response to a request from the WLAN termination 120 or the RLC PDUs to be split and transferred to the WLAN termination 120 when retransmitting the RLC data PDUs.

The transmitting end of the AM RLC entity may include a related RLC header in the RLC data PDU when forming the AMD PDUs from the RLC SDUs or when retransmitting the RLC data PDUs (segments).

As another method, it may be efficient for the RLC layer to segment and/or concatenate the data to have a constant size to use the WLAN carrier when transmitting the data through the WLAN carrier. Therefore, the RLC layer may perform the same segmenting and/or concatenating function as the typical RLC operation.

Meanwhile, as described above, for the E-UTRAN to add the WLAN carrier as a carrier and to transmit the downlink user data traffic by using or selecting the LTE carrier and the WLAN carrier, an aggregation entity for aggregation and interworking between the base station and the WLAN termination, an interworking entity or a logical entity for an interworking function or the LTE-WLAN aggregation may be required. In the present specification, such a logical entity will be expressed as an aggregation entity.

The aggregation entity may be a standalone entity or a functional or logical entity of another network entity. For example, when the base station and the WLAN termination are co-located to be provided as an integrated device, the aggregation entity may be a functional entity included in the integrated device. The aggregation entity may execute functions of: creating a tunnel (for example, a GTP tunnel or an IPSEC tunnel) necessary for transmitting data between the base station and the terminal through the WLAN carrier; and transmitting data between the base station and the terminal {between the entity of Layer 2 (for example, a PDCP entity) of the base station and the entity of Layer 2 of the terminal} through the WLAN carrier. As another example, the aggregation entity may be a functional entity that is included in the WLAN termination when the base station and the WLAN termination are not co-located.

In the RLC layer split/aggregation or interlocking structure, the aggregation entity may receive RLC PDUs from the RLC entity of the base station. Alternatively, the aggregation entity may make a request to the RLC entity of the base station for the RLC PDUs and may receive the same.

In the RLC layer split/aggregation or interlocking structure, the aggregation entity may transmit the received RLC PDUs to the terminal through the WLAN carrier. Alternatively, in the RLC layer split/aggregation or interlocking structure, the aggregation entity may transmit the received RLC PDUs to the terminal by using a WLAN L1/L2 protocol. Alternatively, in the RLC layer split/aggregation or interlocking structure, the aggregation entity may transmit the received RLC PDUs to the terminal through the WLAN termination (or the WLAN carrier) by using IP communication.

In the RLC layer split/aggregation or interlocking structure, the terminal may transfer the RLC PDUs that are received through the WLAN carrier to the corresponding RLC entity in the terminal. Alternatively, the terminal may transfer the RLC PDUs received by using the WLAN L1/L2 protocol in the terminal to the corresponding RLC entity in the terminal.

Meanwhile, in the PDCP layer split/aggregation or interlocking structure, the aggregation entity may receive PDCP data (for example, PDCP SDUs or PDUs) from the PDCP entity of the base station. Alternatively, the aggregation entity may make a request to the PDCP entity of the base station for the PDCP data (for example, PDCP SDUs or PDCP PDUs), and may receive the PDCP data.

In the PDCP layer split/aggregation or interlocking structure, the aggregation entity may transmit the received PDCP SDUs/PDUs to the terminal through a WLAN wireless link. Alternatively, in the PDCP layer split/aggregation or interlocking structure, the aggregation entity may transmit the received PDCP SDUs/PDUs to the terminal by using a WLAN L1/L2 protocol. Alternatively, in the PDCP layer split/aggregation or interlocking structure, the aggregation entity may transmit the received PDCP SDUs/PDUs to the terminal through the WLAN termination (or the WLAN carrier) by using IP communication.

In the PDCP layer split/aggregation or interlocking structure, the terminal may receive the PDCP SDUs/PDUs through the WLAN carrier and transfer the PDCP SDUs/PDUs to the corresponding PDCP entity in the terminal. Alternatively, the terminal may receive the PDCP PDUs by using the WLAN L1/L2 protocol in the terminal and transfer the received PDCP PDUs to the corresponding PDCP entity in the terminal.

Figure 2:
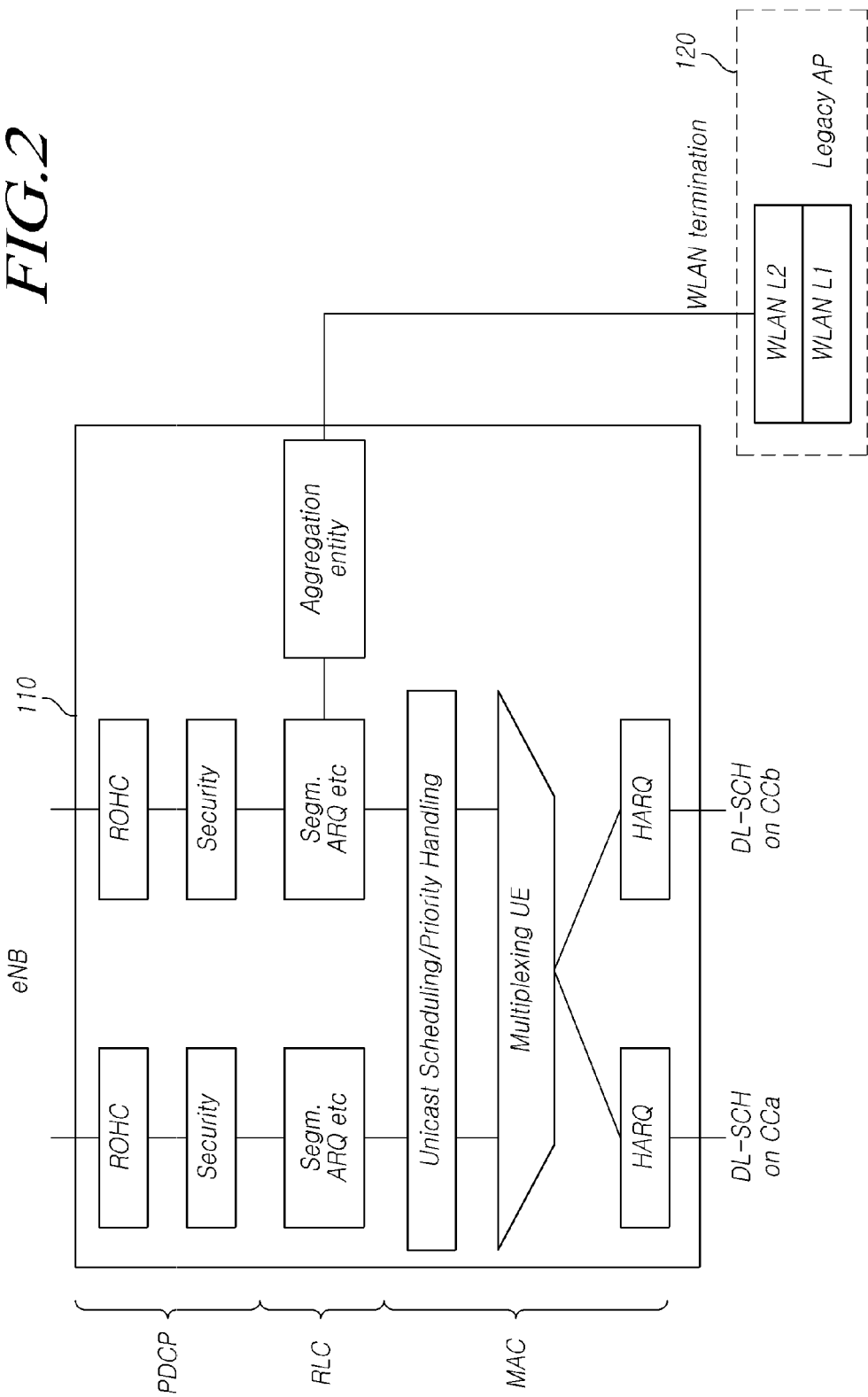
FIG. 2 is a view exemplary illustrating a configuration diagram of Layer 2 for the downlink, according to another embodiment of the present disclosure.

FIG. 2 is a view exemplary illustrating a configuration diagram of Layer 2 for the downlink, according to another embodiment of the present disclosure.

FIG. 2 shows another configuration diagram of Layer 2 that provides a split/aggregation function with respect to the user plane data in the RLC layer when the E-UTRAN transmits the user plane data by adding a WLAN carrier as a carrier.

For example, when the aggregation entity is configured as a functional entity included in the base station 110 as shown in FIG. 2, it may be configured to be included in the RLC entity. As another example, when the aggregation entity is configured as a functional entity included in the base station as shown in FIG. 2, it may be configured as a separate entity that is distinct from the RLC entity.

Split/Aggregation Structure in PDCP Layer

Figure 3:
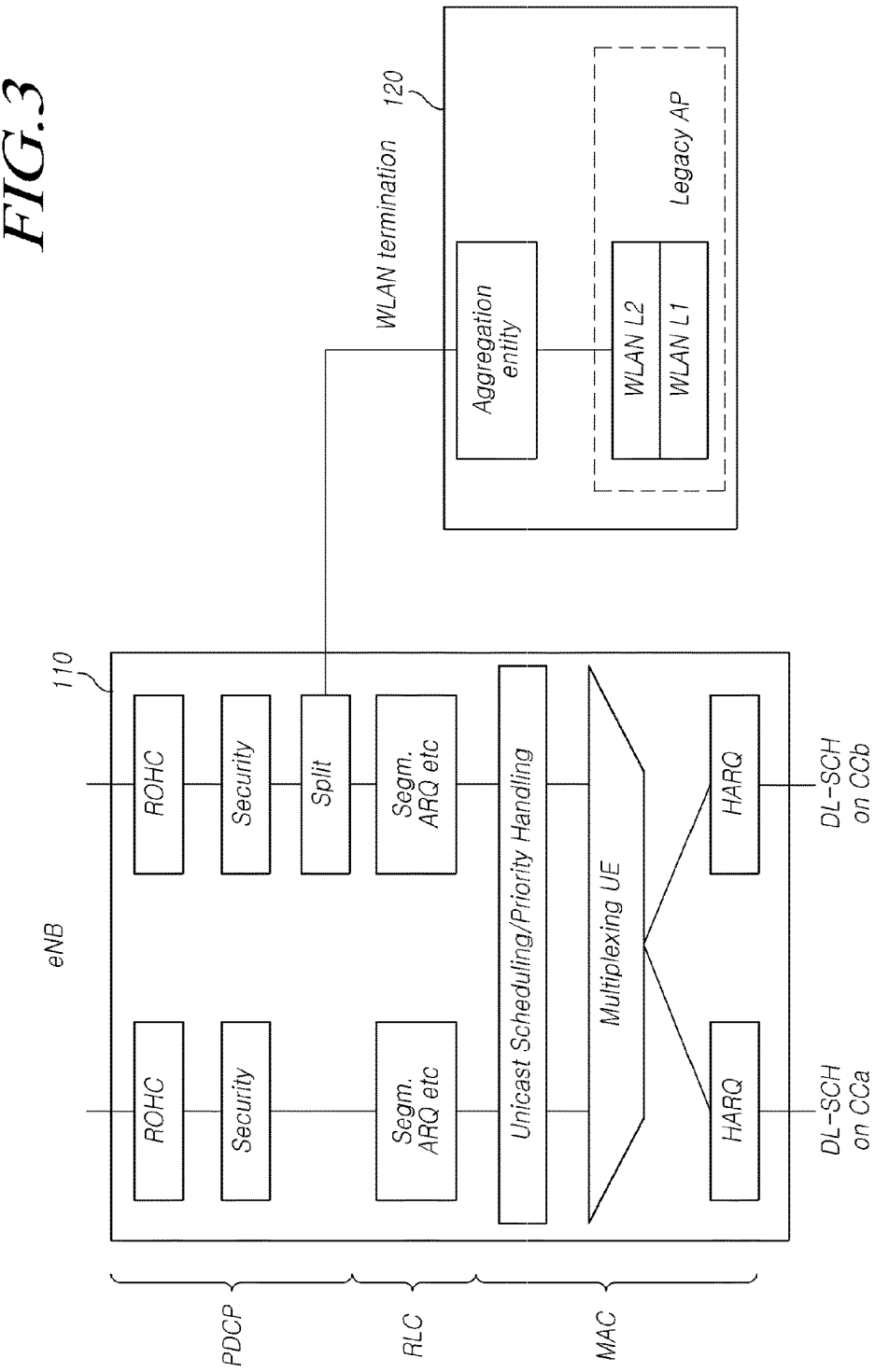
FIG. 3 is a view exemplary illustrating a configuration diagram of Layer 2 for the downlink in a split structure, according to at least one embodiment of the present disclosure.
Figure 4:
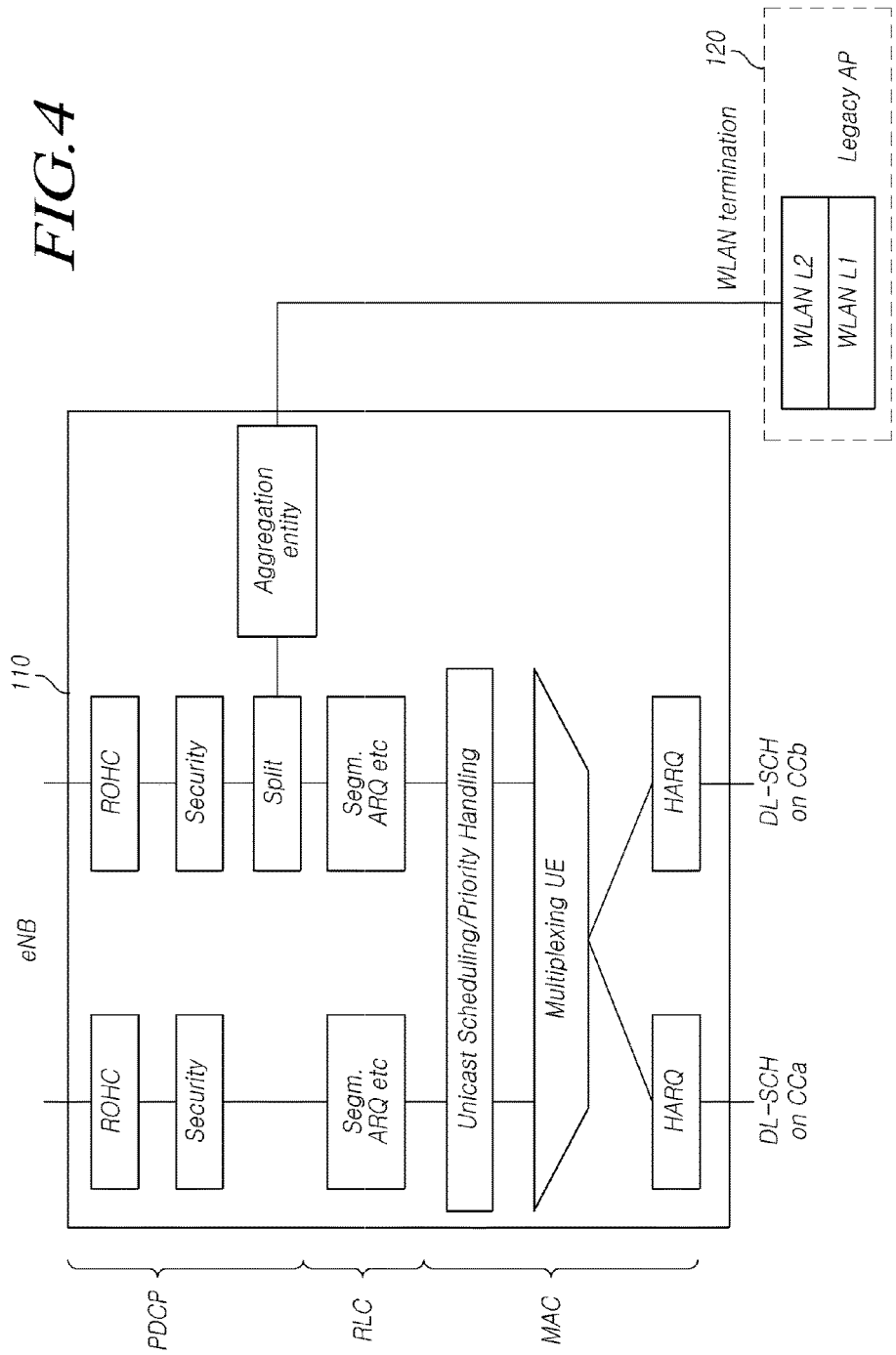
FIG. 4 is a view exemplary illustrating a configuration diagram of Layer 2 for the downlink in a split structure, according to another embodiment of the present disclosure.

FIG. 3 is a view exemplary illustrating a configuration diagram of Layer 2 for the downlink in a split structure, according to still another embodiment of the present disclosure, and FIG. 4 is a view illustrating a configuration diagram of Layer 2 for the downlink in a split structure, according to yet another embodiment of the present disclosure.

The E-UTRAN may transmit the user plane data by providing a split/aggregation function with respect to the user plane data in a PDCP layer as shown in FIG. 3 and FIG. 4 when transmitting the user plane data by adding a WLAN carrier as a carrier.

For example, when the aggregation entity is configured as a functional entity included in the base station 110 as shown in FIG. 4, it may be configured to be included in the PDCP entity. For example, the aggregation entity may be configured to be included in the PDCP entity, after a split/routing step of the PDCP PDUs, before a step of performing sequence numbering for the PDCP SDUs, or after a step of sequence numbering for the PDCP SDUs. As another example, when the aggregation entity is configured as a functional entity included in the base station 110 as shown in FIG. 4, it may be configured as a separate entity distinct from the PDCP entity in a lower layer of the PDCP entity. As another example, when the aggregation entity is configured as a functional entity included in the base station 110, it may be configured as a separate entity distinct from the PDCP entity in an upper layer of the PDCP entity.

The PDCP layer provides a header compression and ciphering function for the user plane data. In addition, when simultaneously using the E-UTRAN carrier and the WLAN carrier, data may be received in sequence by using a PDCP reordering function for providing the Release 12 dual connectivity. Alternatively, if the E-UTRAN supports the transmission by using a plurality of WLANs (or WLAN terminations) for any purpose, such as the improvement of the WLAN coverage, data may be received in sequence by using a PDCP reordering function for providing the Release 12 dual connectivity.

In addition, it is possible to reduce the overhead according to an RLC function process and the addition of a header, compared to the split/aggregation method through the RLC layer. However, an indication on a successful delivery of the PDCP PDUs may be required from a low entity for a data transmission procedure of the PDCP entity. To address this, the aggregation entity or the PDCP entity itself may receive indication information on a successful delivery of the PDCP PDUs. For example, a periodic or aperiodic status report or an acknowledgement transmission operation may be performed.

2) Interworking (or WLAN-Dedicated Bearer) Structure

When the E-UTRAN transmits user plane data by using the split/aggregation structure as shown in FIG. 1 to FIG. 4 and when transmitting the user plane data by adding a WLAN carrier as a carrier, the terminal should perform the reordering in the RLC layer or PDCP layer in order to receive the downlink data in sequence. The WLAN may: i) have a smaller coverage than the E-UTRAN network; ii) provide a slow status monitoring with respect to the wireless link; or iii) not manage wireless resources by the network in order to thereby limit the performance by a significantly increased delay during the reordering. For example, the RLC entity or PDCP entity that performs a window operation may cause the window stalling. Alternatively, the data transmission through the split/aggregation may require an additional buffer capacity of the terminal, or the data transmission may cause power consumption thereof for other reasons.

In order to overcome the problems above, in accordance with at least one embodiment, a method is provided for enabling the E-UTRAN to transmit the user plane data only through a WLAN carrier when transmitting the user plane data by adding the WLAN carrier as a carrier. Hereinafter, such a method and an associated interlocking structure according to at least one embodiment will be described.

RLC Layer Interworking WLAN-Dedicated Bearer Structure

Figure 5:
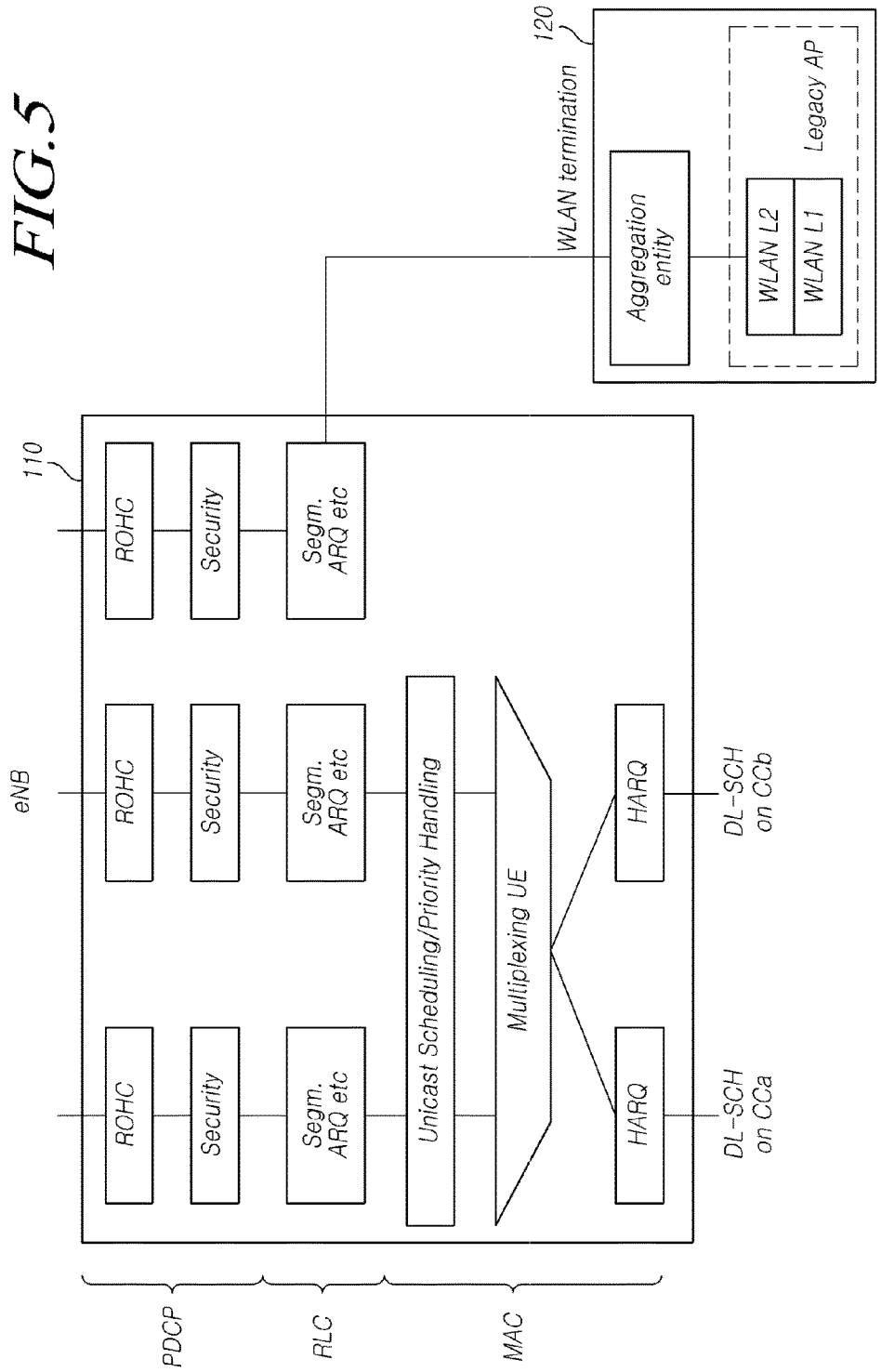
FIG. 5 is a view exemplary illustrating a configuration diagram of Layer 2 for the downlink in an interworking structure, according to at least one embodiment of the present disclosure.

FIG. 5 is a view exemplary illustrating a configuration diagram of Layer 2 for the downlink in an interworking structure, according to at least one embodiment of the present disclosure.

The E-UTRAN may transmit user plane data in the RLC layer by providing an interworking function with respect to the user plane data as shown in FIG. 5 when transmitting the user plane data by adding a WLAN carrier as a carrier.

As described above, the RLC layer provides a function of segmenting and/or concatenating RLC SDUs in order to adjust the PDUs within a total size of the RLC PDU that is indicated by a lower layer in a specific transmission opportunity notified of by the lower layer. The RLC layer provides an error correction function through ARQ for the transmission of acknowledged mode (AM) data.

As described above, since the data transmission through a WLAN carrier is provided through the WLAN PHY/MAC (or L1/L2) layer, it may not be necessary for the RLC layer to perform the segmentation and/or concatenation for the interworking with a WLAN MAC layer that is a different standard. However, the RLC layer may provide an error correction function through ARQ for the transmission of acknowledged mode (AM) data. An acknowledgement on a successful delivery through the WLAN may be received according to the same. If the E-UTRAN supports the transmission by using a plurality of WLANs (or WLAN APs) for any purpose, such as the improvement of the WLAN coverage, the RLC layer may reorder the data that is received through different WLAN APs by using an HARQ reordering function (or the reordering of the RLC layer) to then transmit the data in sequence. To this end, a transmitting end of the AM RLC entity may not segment and/or concatenate the RLC SDUs to be split and transferred to the WLAN termination when forming the AMD PDUs from the RLC SDUs.

Alternatively, the transmitting end of the AM RLC entity may perform the retransmission of the RLC data PDUs. The transmitting end of the AM RLC entity may not segment and/or concatenate the RLC PDUs in response to a request from the WLAN termination or the RLC PDUs to be split and transferred to the WLAN termination when retransmitting the RLC data PDUs.

The transmitting end of the AM RLC entity may include a related RLC header in the RLC data PDU when forming the AMD PDUs from the RLC SDUs or when retransmitting the RLC data PDUs (segments).

As another method, it may be efficient for the RLC layer to segment and/or concatenate the data to have a constant size to use a WLAN carrier when transmitting the data through the WLAN carrier. Therefore, the RLC layer may perform the same segmenting and/or concatenating function as the typical operation of the RLC.

Figure 6:
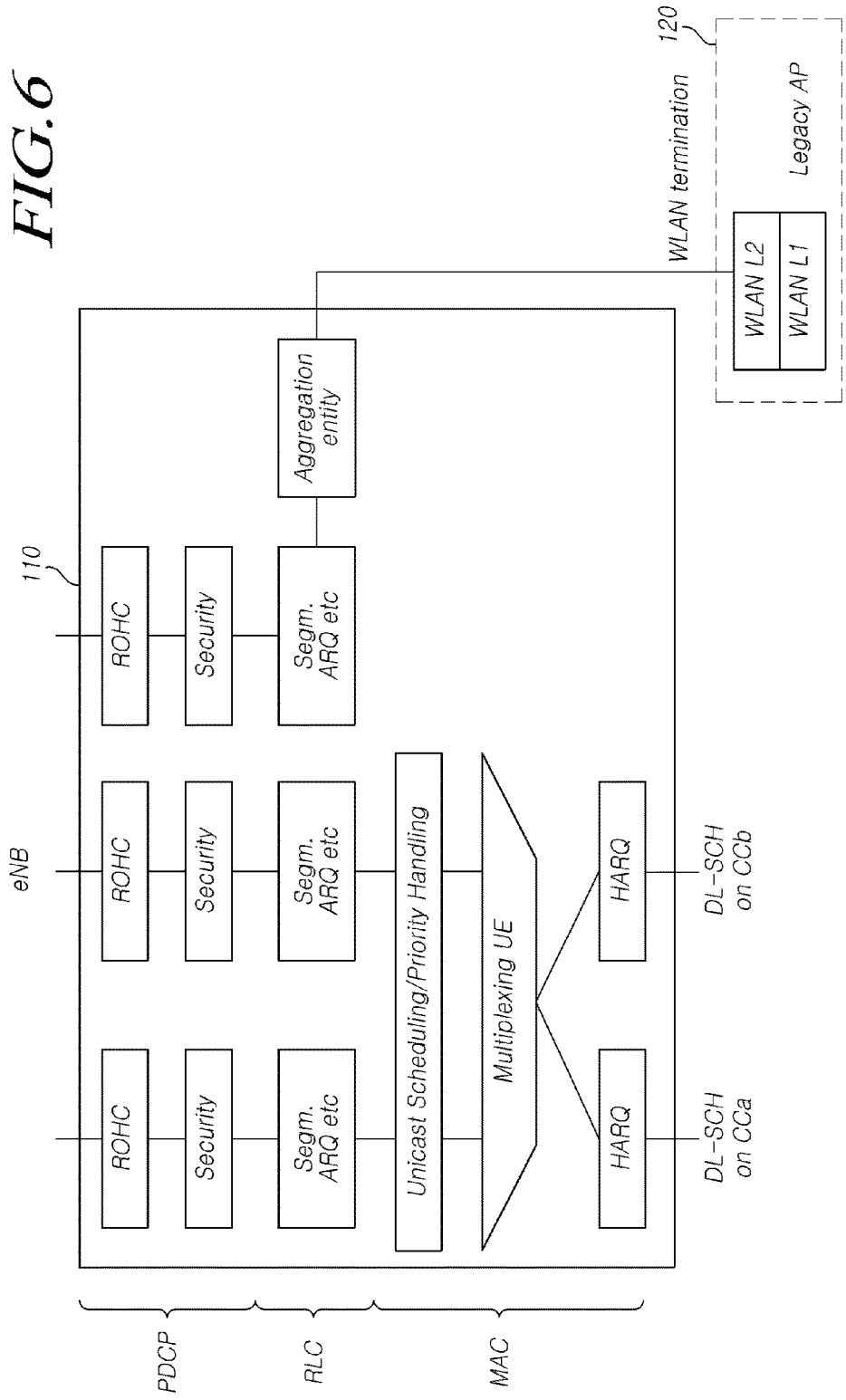
FIG. 6 is a view exemplary illustrating a configuration diagram of Layer 2 for the downlink in an interworking structure, according to another embodiment of the present disclosure.

FIG. 6 is a view exemplary illustrating a configuration diagram of Layer 2 for the downlink in an interworking structure, according to another embodiment of the present disclosure.

FIG. 6 shows another exemplary configuration diagram of Layer 2 for providing an interworking function with respect to the user plane data in the RLC layer. For example, when the aggregation entity is configured as a functional entity included in the base station 110 as shown in FIG. 6, it may be configured to be included in the RLC entity. As another example, when the aggregation entity is configured as a functional entity included in the base station 110 as shown in FIG. 6, it may be configured as a separate entity from the RLC entity.

PDCP Layer Interworking WLAN-Dedicated Bearer Structure

Figure 7:
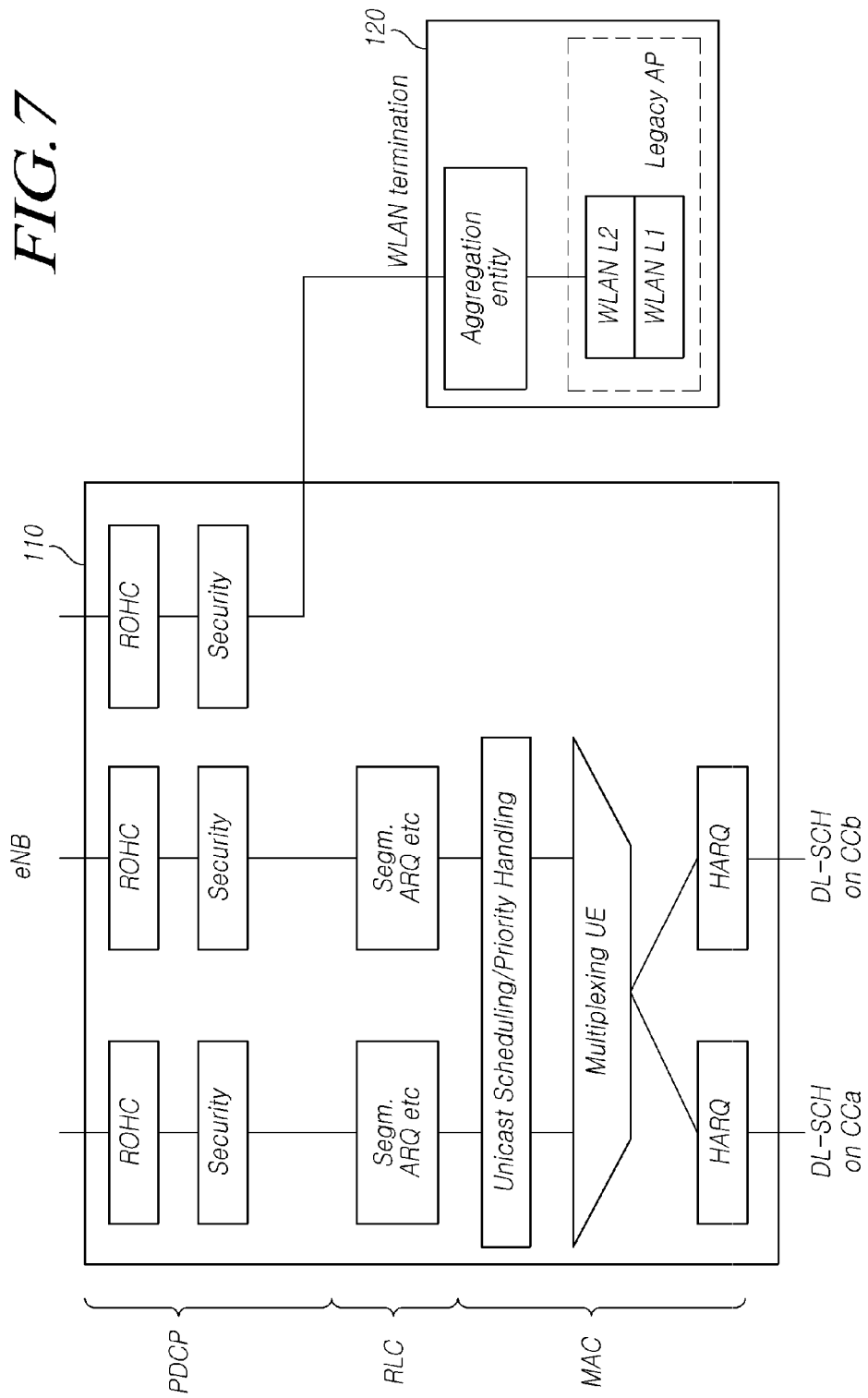
FIG. 7 is a view exemplary illustrating a configuration diagram of Layer 2 for downlink in an interworking structure, according to still another embodiment of the present disclosure.

FIG. 7 is a view exemplary illustrating a configuration diagram of Layer 2 for downlink in an interworking structure, according to still another embodiment of the present disclosure.

The E-UTRAN may transmit user plane data by providing an interworking function with respect to the user plane data in the PDCP layer as shown in FIG. 7 when transmitting the user plane data by adding a WLAN carrier as a carrier.

Figure 8:
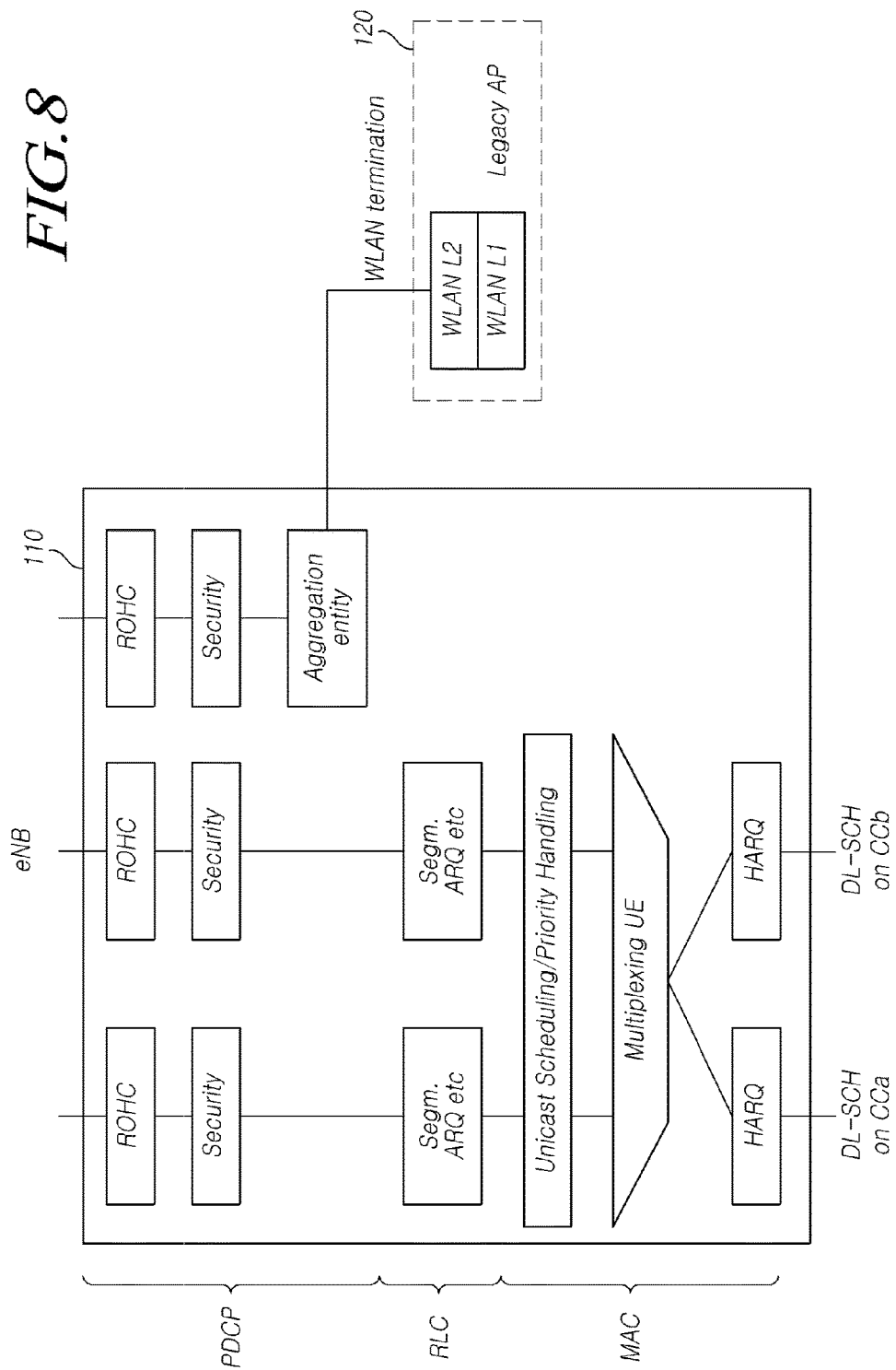
FIG. 8 is a view exemplary illustrating a configuration diagram of Layer 2 for downlink in an interworking structure, according to yet another embodiment of the present disclosure.

FIG. 8 is a view exemplary illustrating a configuration diagram of Layer 2 for downlink in an interworking structure, according to yet another embodiment of the present disclosure.

The E-UTRAN may transmit user plane data by providing an interworking function with respect to the user plane data in the PDCP layer as shown in FIG. 8 when transmitting the user plane data by adding a WLAN carrier as a carrier.

For example, when the aggregation entity is configured as a functional entity included in the base station 110 as shown in FIG. 8, it may be configured to be included in the PDCP entity. For example, the aggregation entity may be configured by adding an interworking/switching/routing step of the PDCP PDUs in the PDCP entity or by adding an interworking/switching/routing step of the PDCP SDUs prior to a step of performing the sequence numbering with respect to the PDCP SDUs. Alternatively, the aggregation entity may be configured by adding the same after the step of performing the sequence numbering with respect to the PDCP SDUs in the PDCP entity. As another example, when the aggregation entity is configured as a functional entity included in the base station 110 as shown in FIG. 8, it may be configured as a separate entity distinct from the PDCP entity in a lower layer of the PDCP entity. As another example, when the aggregation entity is configured as a functional entity included in the base station 110, it may be configured as a separate entity distinct from the PDCP entity in an upper layer of the PDCP entity.

As described above, the PDCP layer provides a header compression and ciphering function with respect to the user plane data. If the E-UTRAN supports the transmission by using a plurality of WLANs (or WLAN APs) for any purpose, such as the improvement of the WLAN coverage, the data may be received in sequence by using a PDCP reordering function for providing the Release 12 dual connectivity. Therefore, it is possible to reduce the overhead according to an RLC function process and the addition of a header, compared to the interworking method through the RLC layer. However, an indication on a successful delivery of the PDCP PDUs may be required from a low entity for a data transmission procedure of the PDCP entity. To address this, the aggregation entity or the PDCP entity itself may receive indication information on a successful delivery of the PDCP PDUs. For example, a periodic or aperiodic status report or an acknowledgement transmission operation may be received.

Until now, an exemplary structure according to the split or interworking structure of the base station and the WLAN termination for the transmission of the downlink user plane data has been described with reference to the drawings. Hereinafter, a structure of the terminal for transmitting the uplink user plane data according to the split or interlocking structure will be described with reference to the drawings.

<Protocol Provision Structure for Uplink User Plane Data Transmission>

Hereinafter, the description will be made of a protocol provision structure for transmitting the uplink user plane data and operation of a terminal for transmitting uplink user plane data and receiving downlink user plane data.

The base station may transmit downlink user plane data by using the split/aggregation structure as shown in FIG. 1, to FIG. 4 when the E-UTRAN transmits the user plane data by adding a WLAN carrier as a carrier. Alternatively, the base station may transmit downlink user plane data by using the interworking structure (or the dedicated bearer structure) as shown in FIG. 5 to FIG. 8. The transmission of the uplink user plane data may be provided in various manners in each case, which will be described in more detail below.

1) Uplink Data Transmission Structure Using Base Station Wireless Link

When the E-UTRAN transmits the user plane data by adding a WLAN carrier as a carrier, and when transmitting the downlink user plane data according to each structure of FIG. 1 to FIG. 8, the transmission of the uplink user plane data with respect to the corresponding specific bearer(s) may be performed by using a base station wireless link or by configuring and using a base station-dedicated bearer. Alternatively, the transmission of the uplink user plane data for the corresponding specific bearer(s) may be performed by using a base station carrier or by configuring and using only a base station-dedicated bearer.

Figure 9:
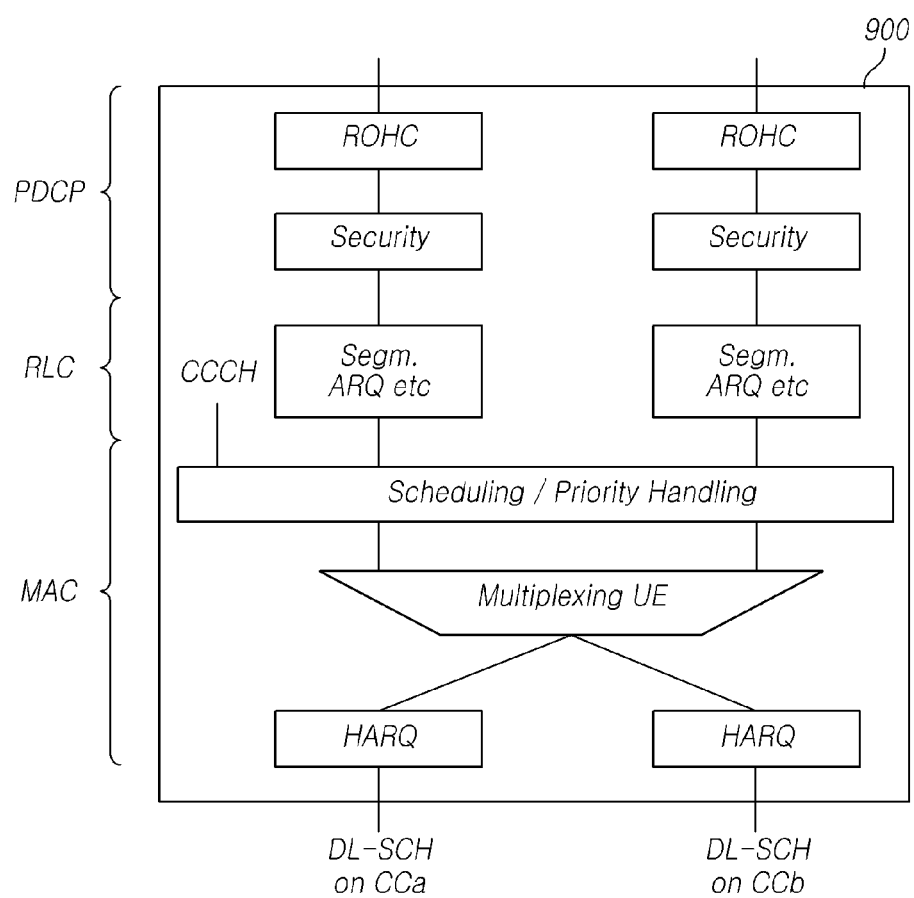
FIG. 9 is a view exemplary illustrating a configuration diagram of Layer 2 for the uplink, which is configured with the WLAN aggregation or the WLAN interworking in accordance with at least one embodiment of the present disclosure.

FIG. 9 is a view exemplary illustrating a configuration diagram of Layer 2 for the uplink, which is configured with the WLAN aggregation or the WLAN interworking in accordance with at least one embodiment.

Referring to FIG. 9, the terminal 900 may transmit the uplink user plane data through the base station when the E-UTRAN transmits the user plane data by adding a WLAN carrier as a carrier. Alternatively, the terminal may transmit the uplink user plane data only through the base station.

That is, even when the terminal 900 is configured with the WLAN aggregation or the interworking to receive the downlink data, the uplink user plane data may be transmitted by using the typical uplink transmission procedure with respect to the base station. For example, by utilizing the typical MAC procedures, such as a logical channel priority (LCP) procedure, a buffer status report (BSR) procedure, or the like, an additional process of the terminal or the provision of functions are not required. In addition, the enhanced mobility performance may be provided by transmitting the uplink data through the base station that has a wider coverage than the WLAN.

2) Uplink Data Transmission Structure Using WLAN Carrier

When the E-UTRAN transmits the user plane data by adding a WLAN carrier as a carrier, and when transmitting the downlink user plane data according to each structure of FIG. 1 to FIG. 8, the transmission of the uplink user plane data with respect to the corresponding specific bearer(s) may be performed by using a WLAN carrier or by using a WLAN-dedicated bearer. Alternatively, the transmission of the uplink user plane data with respect to the corresponding specific bearer(s) may be performed by using a WLAN carrier or by using only a WLAN-dedicated bearer.

Figure 10:
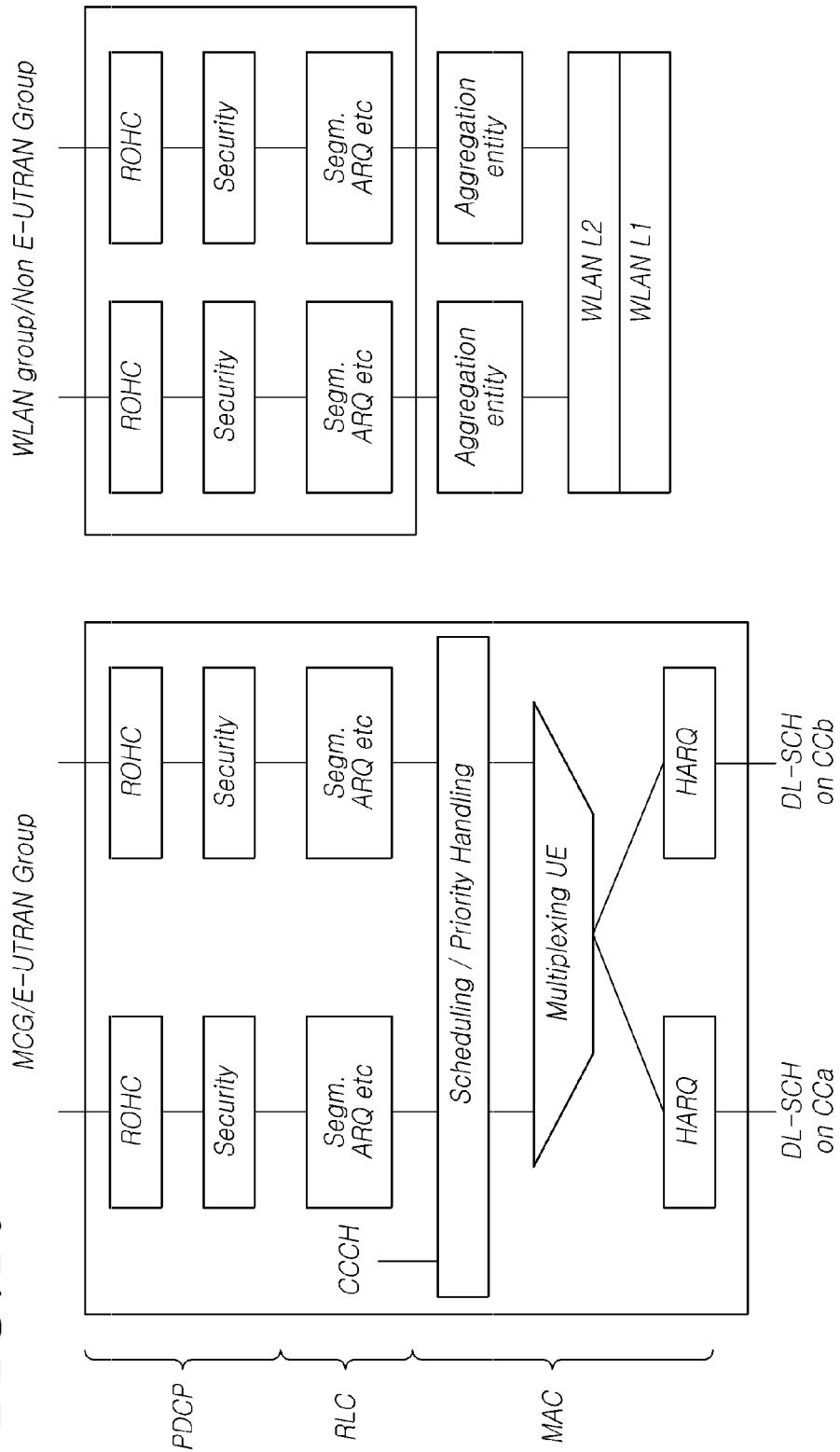
FIG. 10 is a view exemplary illustrating a configuration diagram of Layer 2 for the uplink, which is configured with the WLAN aggregation or the WLAN interworking in accordance with another embodiment of the present disclosure.

FIG. 10 is a view exemplary illustrating a configuration diagram of Layer 2 for the uplink, which is configured with the WLAN aggregation or the WLAN interworking in accordance with another embodiment of the present disclosure.

As shown in FIG. 10, the terminal may configure a WLAN group for transmitting uplink user plane data through a WLAN carrier, and the terminal may transmit the same through the WLAN, when the E-UTRAN transmits the user plane data by adding a WLAN carrier as a carrier. Alternatively, the terminal may transmit the uplink user plane data only through the WLAN. Here, the WLAN group may be variously expressed as a WLAN wireless link, a WLAN termination, a WLAN termination group, a WLAN group, or a non-E-UTRAN group. However, for convenience and ease of understanding, the group for mapping radio bearers that delivers the uplink user plane data through the WLAN carrier or the wireless group for transmitting the uplink user plane data through the WLAN carrier will be expressed as a WLAN group in the description.

The WLAN group for transmitting the uplink user plane data through the WLAN may include a related RLC entity and PDCP entity. The WLAN group for transmitting the uplink user plane data through the WLAN may be configured regardless of the typical MAC layer or MAC entity.

To this end, the terminal may establish the PDCP entities and RLC entities for the bearers that are associated with the WLAN group through an RRC-dedicated signaling that is received from the base station. That is, bearer configuration information received from the base station may include PDCP-CONFIG information and RLC-CONFIG information. Alternatively, the bearer configuration information may include PDCP-CONFIG information and RLC-CONFIG information without association with MAC-MainConfig.

After the terminal received the RRC-dedicated signaling, the terminal may transfer the RLC PDUs to the aggregation entity in the RLC entity of the corresponding radio bearer or may transfer the same through the WLAN.

As described above, since the data transmission through the WLAN carrier is provided through the WLAN PHY/MAC (or L1/L2) layer, it may not be necessary for the RLC layer to perform the segmentation and/or concatenation through the interworking with the WLAN MAC layer that is a different standard. However, the RLC layer may provide an error correction function through ARQ for the transmission of acknowledged mode (AM) data. An acknowledgement on a successful delivery through the WLAN carrier may be received according to the same. If the E-UTRAN supports the transmission by using a plurality of WLANs (or WLAN terminations) for any purpose, such as the improvement of the WLAN coverage, the RLC layer may reorder the data that is received through different WLAN terminations by using an HARQ reordering function (or the reordering of the RLC layer) to then transmit the data in sequence.

The transmitting end of the AM RLC entity may not segment and/or concatenate the RLC SDUs in response to a request from the WLAN termination or the RLC SDUs to be split and transferred to the WLAN termination when forming the AMD PDUs from the RLC SDUs.

Alternatively, the transmitting end of the AM RLC entity in the terminal may perform the retransmission of the RLC data PDUs. The transmitting end of the AM RLC entity in the terminal may not segment and/or concatenate the RLC PDUs in response to a request from the WLAN termination or the RLC PDUs to be split and transferred to the WLAN termination when retransmitting the RLC data PDUs.

The transmitting end of the AM RLC entity in the terminal may include a related RLC header in the RLC data PDU when forming the AMD PDUs from the RLC SDUs or when retransmitting the RLC data PDUs (segments).

As another method, it may be efficient for the RLC layer to segment and/or concatenate the data to have a constant size to use the WLAN carrier when transmitting the data through the WLAN carrier. Therefore, the RLC layer may perform the same segmenting and/or concatenating function as the typical operation of the RLC. The size information for the same may be configured in the terminal through an RRC Reconfiguration message, or the size information may be internally configured.

The terminal may submit/forward the RLC data PDU to the aggregation entity. Alternatively, the terminal may transmit the RLC data PDU through the WLAN carrier. When the terminal submits the RLC data PDU to the aggregation entity, or when the terminal transmits the RLC data PDU through the WLAN carrier, the terminal may include information for identifying the radio bearer by the aggregation entity of the base station in the same and transmit the same. That is, the terminal may include, in the uplink user plane data, information that allows the base station to transfer the RLC PDUs received through the WLAN carrier to the RLC entity in the base station, and may transmit the same.

For example, the terminal may send, together with the RLC PDUs, information for mapping the RLC PDUs transmitted by the terminal with the RLC entity in the base station. Alternatively, the terminal may attach, to the header information of the RLC PDUs, the information for mapping the RLC PDUs transmitted by the terminal with the RLC entity in the base station, and may transmit the same. Alternatively, the terminal may add, as new header information (for example, new information in the RLC header or new information in a new header for the payload of the RLC PDUs), information for mapping the RLC PDUs transmitted by the terminal with the RLC entity in the base station, and may transmit the same. Alternatively, the terminal may include information for mapping the RLC PDUs transmitted by the terminal with the RLC entity of the base station in a WLAN MAC header, an LLC header, an IP header, a UDP header, a GTP header, or an IPSEC header between the WLAN termination and the terminal, which includes the RLC PDUs, and may transmit the same.

Meanwhile, preferably, the information for mapping the RLC PDUs transmitted by the terminal with the RLC entity of the base station may use the information for identifying the corresponding radio bearer.

For example, a logical channel identifier that has a value of 3 to 10 may be used as the information for mapping the RLC PDUs transmitted by the terminal with the RLC entity of the base station. As another example, eps-BearerIdentity may be used as the information for mapping the RLC PDUs transmitted by the terminal with the RLC entity of the base station. As another example, dRB-Identity may be used as the information for mapping the RLC PDUs transmitted by the terminal with the RLC entity of the base station. As another example, as the information for mapping the RLC PDUs transmitted by the terminal with the RLC entity of the base station, index information for identifying the corresponding radio bearer may be newly defined and used. Then, the index information for identifying the radio bearer may be added to DRB configuration information (DRB-ToAddMod) in the terminal.

The terminal may establish an aggregation entity in the terminal, which is peered with the aggregation entity described above. Alternatively, the terminal may establish, in the RLC entity, an aggregation entity in the terminal, which is peered with the aggregation entity described above.

The aggregation entity in the terminal, which is peered with the aggregation entity described above, may receive the RLC PDUs from the RLC entity, and the aggregation entity may associate the same with the information (for example, the identification information or tunnel endpoint information) for mapping the RLC PDUs transmitted by the terminal with the RLC entity of the base station. In addition, the terminal may forward the same to the aggregation entity described above through the WLAN carrier, and the terminal may allow the aggregation entity to forward the same to the corresponding RLC entity.

Alternatively, for the base station to map the RLC PDUs to be transmitted through the WLAN carrier with a corresponding RLC entity in the RLC layer, the terminal may associate the RLC PDUs transmitted by the terminal with the information (for example, the identification information or tunnel endpoint information) for the mapping with the RLC entity in the base station. In addition, the terminal may forward/transfer/submit the same to a logical entity (or layer) for the transmission thereof through the WLAN carrier.

Figure 11:
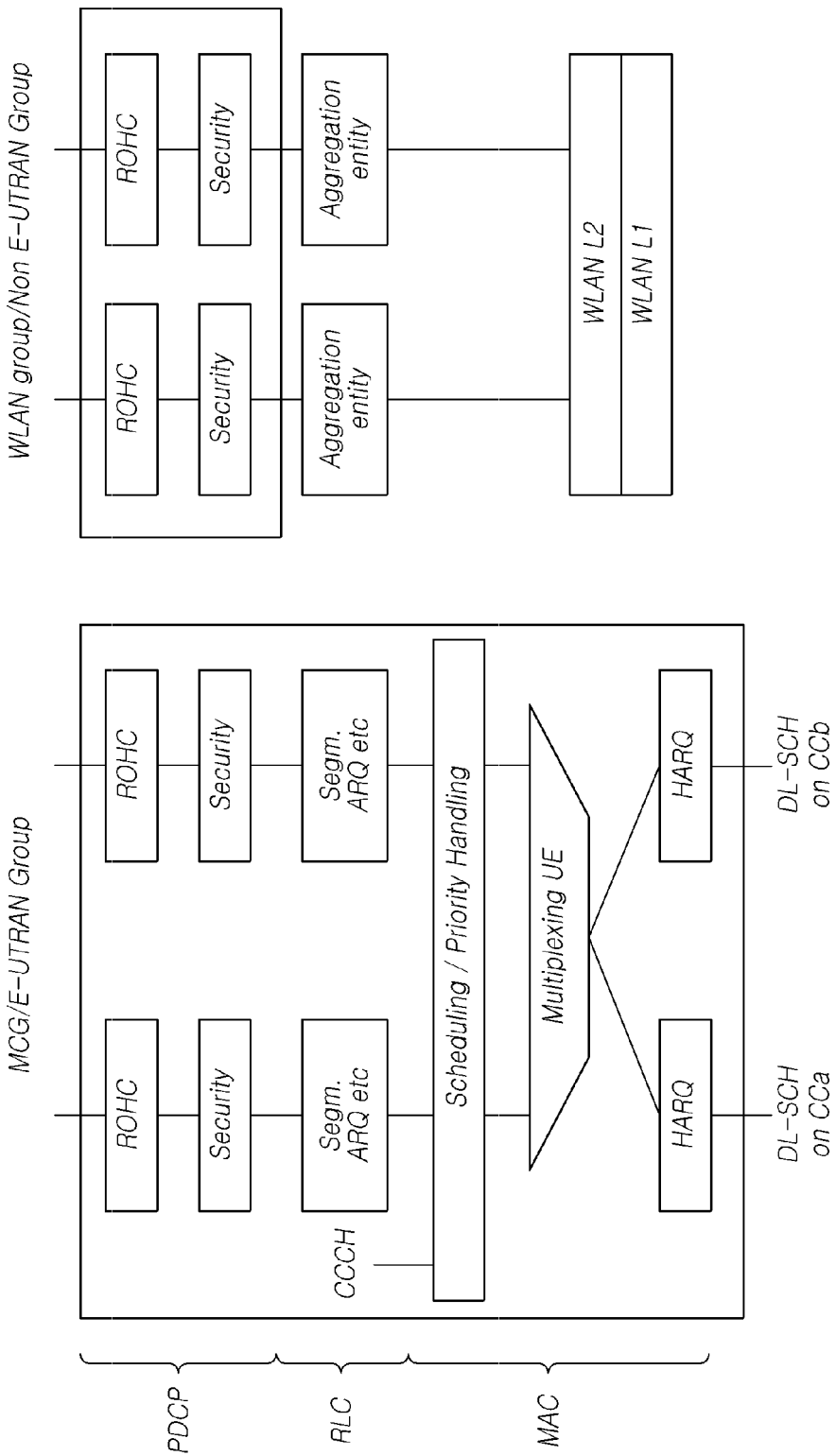
FIG. 11 is a view exemplary illustrating a configuration diagram of Layer 2 for the uplink, which is configured with the WLAN aggregation or the WLAN interworking in accordance with still another embodiment of the present disclosure.

FIG. 11 is a view exemplary illustrating a configuration diagram of Layer 2 for the uplink, which is configured with the WLAN aggregation or the WLAN interworking in accordance with yet another embodiment of the present disclosure.

As shown in FIG. 11, the terminal may configure a WLAN group for transmitting the uplink user plane data through a WLAN carrier, and the terminal may transmit the same through the WLAN carrier. Alternatively, the terminal may transmit the same only through a WLAN carrier.

The WLAN group may include a related PDCP entity. The WLAN group may be configured regardless of the MAC layer or MAC entity.

To this end, the terminal may establish the PDCP entities for the bearers that are associated with the WLAN group through an RRC-dedicated signaling that is received from the base station. That is, the corresponding bearer configuration information may include PDCP-CONFIG information. Alternatively, the corresponding bearer configuration information may include PDCP-CONFIG information without association with MAC-MainConfig and RLC-CONFIG information. Alternatively, the corresponding bearer configuration information may not include the RLC-CONFIG information, and the corresponding bearer configuration information may include only the PDCP-CONFIG information without association with the MAC-MainConfig information.

After the terminal has received the RRC-dedicated signaling, the terminal may transfer the PDCP SDUs or the PDUs to the aggregation entity in the PDCP entity of the corresponding radio bearer. Alternatively, the terminal may transfer the user plane data {that is, the PDCP SDUs (IP packets)} to the base station through a WLAN carrier.

With regard to the bearer that is configured as shown in FIG. 11, when the terminal receives the PDCP SDU from an upper layer, the terminal may execute at least one of the typical operations {for example, operations of associating the PDCP SN, performing header compression of the PDCP SDU (if configured), or performing integrity protection and ciphering} of the PDCP layer for the uplink data transmission. Alternatively, when receiving the PDCP SDU from an upper layer, the terminal may submit/transfer the same to the aggregation entity.

The terminal may submit/transfer the PDCP data (PDCP SDU or PDCP PDU) to the aggregation entity. Alternatively, the terminal transmits the PDCP SDU/PDU through the WLAN carrier. When submitting the PDCP SDU/PDU to the aggregation entity, or when transmitting the PDCP SDU/PDU through the WLAN carrier, the terminal may include, in the same, information to allow the base station to transfer the PDCP SDUs/PDUs that are received through the WLAN wireless link to the corresponding PDCP entity in the base station, and may send the same.

To allow the base station to transfer the PDCP SDUs/PDUs received through the WLAN carrier to the PDCP entity in the base station, the terminal may send information for mapping the PDCP SDUs/PDUs transmitted by the terminal with the PDCP entity of the base station together with the PDCP SDUs/PDUs. Alternatively, the terminal may attach, to the header information of the PDCP SDUs/PDUs, the information for mapping the PDCP SDUs/PDUs transmitted by the terminal with the PDCP entity in the base station, and the terminal may transmit the same. Alternatively, the terminal may add, as new header information (for example, new information in the PDCP header or new information in a new header for the payload of the PDCP SDUs/PDUs), information for mapping the PDCP SDUs/PDUs transmitted by the terminal with the PDCP entity in the base station, and the terminal may transmit the same. Alternatively, the terminal may include information for mapping the PDCP SDUs/PDUs transmitted by the terminal with the PDCP entity of the base station in a WLAN MAC header, an LLC header, an IP header, a UDP (User Datagram Protocol) header, a GTP (GPRS Tunneling Protocol) header, or an IPSEC (Internet Protocol Security Protocol) header between the WLAN termination and the terminal, which includes the PDCP SDUs/PDUs, and may transmit the same.

Preferably, the information for mapping the PDCP PDUs transmitted by the terminal with the PDCP entity in the base station may use the information for identifying the corresponding radio bearer.

For example, a logical channel identifier that has a value of 3 to 10 may be used as the information for mapping the PDCP PDUs transmitted by the terminal with the PDCP entity in the base station. As another example, eps-BearerIdentity may be used as the information for mapping the PDCP PDUs transmitted by the terminal with the PDCP entity in the base station. As another example, dRB-Identity may be used as the information for mapping the PDCP PDUs transmitted by the terminal with the PDCP entity in the base station. As another example, as the information for mapping the PDCP PDUs transmitted by the terminal with the PDCP entity in the base station, index information for identifying the corresponding radio bearer may be newly defined and used, and the index information for identifying the radio bearer may be added to DRB configuration information (DRB-ToAddMod) in the terminal to then be configured.

The terminal may establish an aggregation entity in the terminal, which is peered with the aggregation entity described above. Alternatively, the terminal may establish, in the PDCP entity, an aggregation entity of the terminal, which is peered with the aggregation entity described above.

The aggregation entity in the terminal, which is peered with the aggregation entity described above, may receive the PDCP PDUs from the PDCP entity, and may associate the same with the information (for example, the identification information or tunnel endpoint information) for mapping the PDCP PDUs transmitted by the terminal with the PDCP entity of the base station. In addition, the terminal may transfer the same to the aggregation entity described above through the WLAN carrier, and may allow the aggregation entity to transfer the same to the corresponding PDCP entity.

Alternatively, for the base station to map the PDCP PDUs to be transmitted through the WLAN carrier with a corresponding PDCP entity in the PDCP layer, the terminal may associate the PDCP PDUs transmitted by the terminal with the information (for example, the identification information or tunnel endpoint information) for the mapping with the PDCP entity in the base station. In addition, the terminal may forward/transfer/submit the same to a logical entity (or layer) for the transmission through the WLAN carrier.

As shown in FIG. 10 and FIG. 11, since the terminal processes the uplink user plane data through the WLAN carrier or the WLAN-dedicated bearer in the situation of WLAN aggregation, the terminal may utilize a nearby WLAN termination. Therefore, it is possible to reduce the power consumption of the terminal. Furthermore, it is possible to reduce the usage of the E-UTRAN wireless resources by offloading the uplink traffic of the base station.

3) Simultaneous Transmission of Link Data Using Base Station Carrier and WLAN Carrier The terminal may transmit uplink user plane data for specific bearers by using a base station carrier and a WLAN carrier in the case of using the structures described in FIG. 1 to FIG. 8 when the E-UTRAN transmits the user plane data by adding the WLAN carrier as a carrier.

Figure 12:
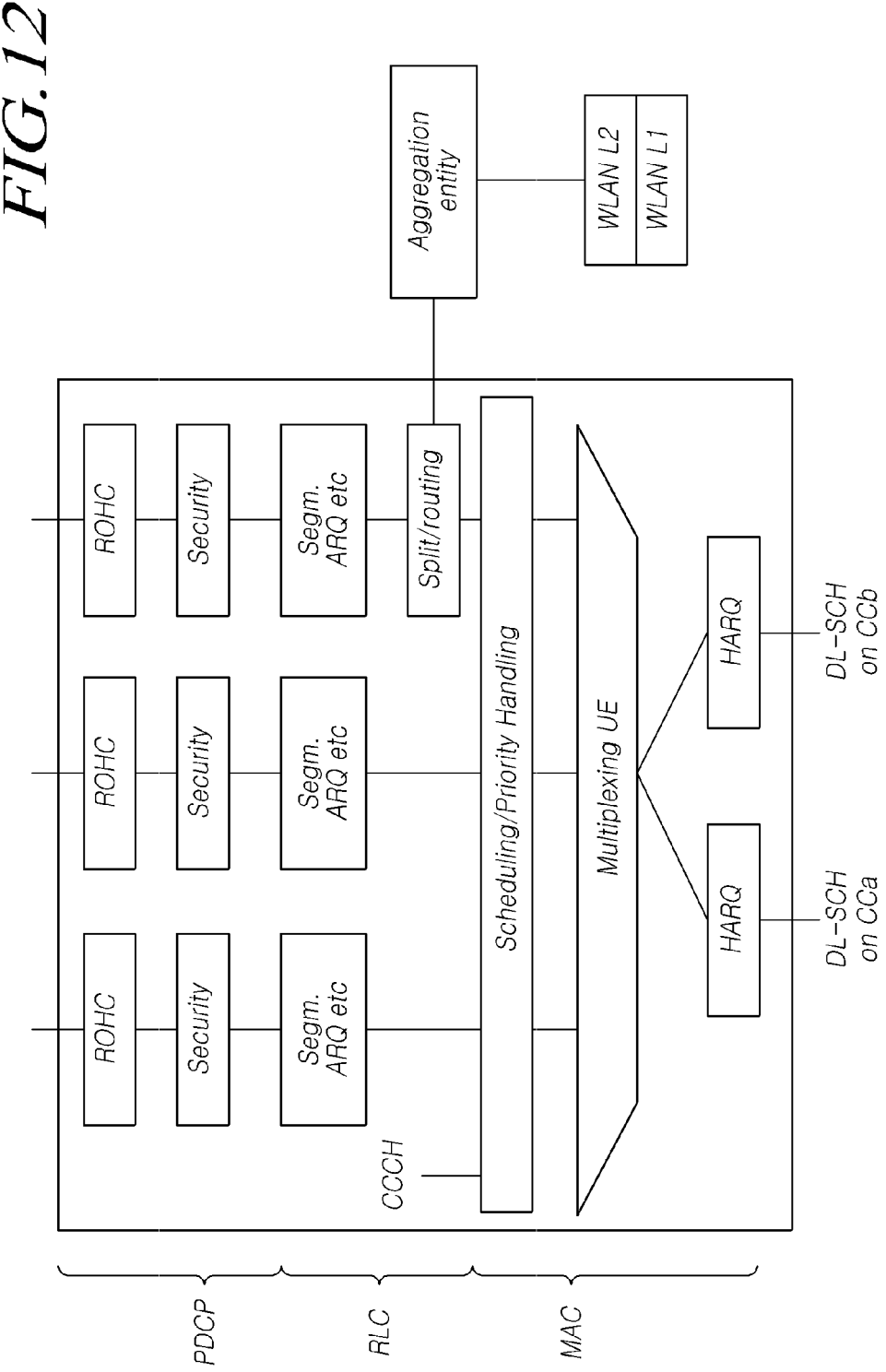
FIG. 12 is a view exemplary illustrating a configuration diagram of Layer 2 for the uplink, which is configured with the WLAN aggregation or the WLAN interworking in accordance with yet another embodiment of the present disclosure.
Figure 13:
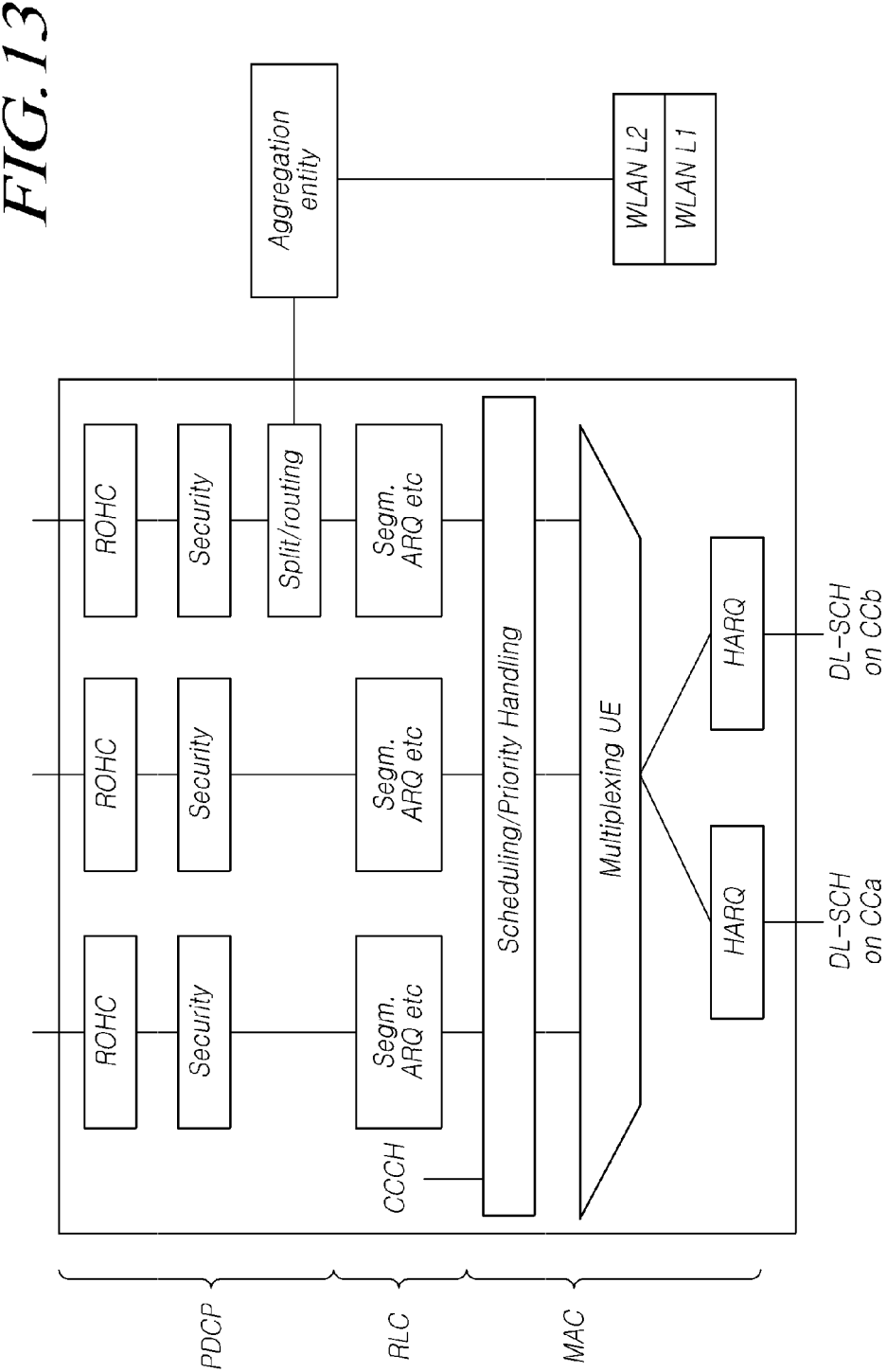
FIG. 13 is a view exemplary illustrating a configuration diagram of Layer 2 for the uplink, which is configured with the WLAN aggregation or the WLAN interworking in accordance with yet another embodiment of the present dislcousre.

FIG. 12 is a view exemplary illustrating a configuration diagram of Layer 2 for the uplink, which is configured with the WLAN aggregation or the WLAN interworking in accordance with still another embodiment, and FIG. 13 is a view exemplary illustrating a configuration diagram of Layer 2 for the uplink, which is configured with the WLAN aggregation or the WLAN interworking in accordance with yet another embodiment.

As shown in FIG. 12 or FIG. 13, the terminal may transmit the uplink user plane data by using a base station carrier and a WLAN carrier when the E-UTRAN transmits the user plane data by adding a WLAN carrier as a carrier.

The RLC entity of FIG. 12 or the PDCP entity of FIG. 13 splits or routes the uplink data into the base station carrier and the WLAN carrier and transfer the same.

As shown the FIG. 12 or FIG. 13, the terminal transmits the uplink user plane data through the base station carrier and the WLAN carrier so that the terminal is configured with the WLAN aggregation or the WLAN interworking. Therefore, it is possible to improve the uplink data transmission rate/throughput in the case of receiving the downlink data. In addition, when the WLAN wireless link quality temporarily becomes bad, it is possible to enhance the performance by transmitting or retransmitting the uplink data through the E-UTRAN. However, in the case of transmitting the uplink user plane data through the base station carrier and the WLAN carrier, when the terminal performs a buffer status reporting procedure for performing the uplink data transmission through the MAC of the E-UTRAN, the terminal may make a buffer status report to exceed the actual transmission amount of E-UTRAN because the terminal uses the data available for the transmission of the PDCP entity and the data available for the transmission of the RLC entity in FIG. 12 or the data available for the transmission of the PDCP entity in FIG. 13. In order to address this, in the case where a base station-dedicated bearer or a WLAN-dedicated bearer is configured to be used for the uplink data transmission or the terminal performs a buffer status reporting procedure for the uplink data transmission through the MAC of the E-UTRAN, the terminal may report only some (or a constant amount) of the data available for the transmission of the PDCP entity and the data available for the transmission of the RLC entity in FIG. 12 or some of the data available for the transmission of the PDCP entity in FIG. 13. Alternatively, the uplink user plane data transmission may be performed by means of the base station carrier using method or the WLAN carrier using method.

<Bearer Configuration Information>

The base station may be configured to enable the terminal to transmit the user plane data by adding a WLAN carrier to a base station carrier by using an upper layer message (for example, an RRC Reconfiguration message). Alternatively, the base station may be configured to enable an RRC-connected terminal to transmit the user plane data by adding a WLAN carrier by means of an upper layer message (for example, an RRC reconfiguration message).

For example, the base station may be configured to enable the terminal i) to receive the downlink user plane data for a specific radio bearer through the interworking structure (or the WLAN-dedicated bearer structure or the WLAN wireless link using structure) described above and ii) to transmit the uplink user plane data through the base station wireless link using structure (or the base station-dedicated bearer structure).

For example, in the RLC layer interlocking structure, the downlink RLC data PDU, as described with reference to FIG. 5 and FIG. 6, may be transmitted from the RLC entity of the base station to the RLC entity of the terminal through the WLAN carrier. On the contrary, as described with reference to FIG. 9, the uplink RLC data PDU may be transmitted from the RLC entity of the terminal to the RLC entity of the base station through the base station carrier.

An uplink RLC status report with respect to the downlink RLC data PDU may be transmitted from the RLC entity of the terminal to the RLC entity of the base station through the base station carrier. A downlink RLC status report with respect to the uplink RLC data PDU may be transmitted from the RLC entity of the base station to the RLC entity of the terminal through the base station carrier.

In this case, if the downlink RLC entity of the terminal does not allow the transmission through different APs, the reordering function may not be performed. Alternatively, the RLC SDU may be transmitted to the PDCP entity without performing the reordering function. Alternatively, a T-reordering timer may be set to be zero or a small value.

As another example, in the PDCP layer interworking structure described above, the downlink PDCP data PDU, as described in FIG. 7 and FIG. 8, may be transmitted from the PDCP entity of the base station to the PDCP entity of the terminal through WLAN carrier. On the contrary, the uplink PDCP data PDU, as described in FIG. 9, may be transmitted from the PDCP entity of the terminal to PDCP entity of the base station through the base station carrier. An acknowledgement on a successful delivery of the PDCP SDUs/PDUs from a low entity may be required for the data transmission procedure of the PDCP entity. To address this, the aggregation entity or the PDCP entity itself may be configured to receive indication information on a successful delivery of the PDCP SDUs/PDUs. For example, a periodic or aperiodic status report or an acknowledgement transmission operation may be performed.

To configure this, the information for instructing the terminal to receive the downlink data through a WLAN carrier (or information for identifying the type of bearer) may be included in the radio bearer configuration information (DRB-ToAddMod) to then be transmitted. Alternatively, in the case of the RLC layer interworking structure (FIG. 5 and FIG. 6) described above, the information for instructing the terminal to receive the downlink data through a WLAN carrier (or information for identifying the type of bearer) may be included in the RLC configuration information (RLC-CONFIG) and transmitted. Alternatively, in the case of the PDCP layer interworking structure (FIG. 7 and FIG. 8) described above, the information for instructing the terminal to receive the downlink data through a WLAN carrier (or information for identifying the type of bearer) may be included in the PDCP configuration information (PDCP-CONFIG) to then be transmitted. The information for instructing the terminal to transmit the uplink data through a base station carrier (or information for designating the uplink data path) and the information to configure the content described above may be included in the RLC configuration information (RLC-CONFIG) in the case of the radio bearer configuration information (DRB-ToAddMod) or the RLC layer interworking structure described above, or may be included in the PDCP configuration information (PDCP-CONFIG) in the case of the PDCP layer interworking structure described above, and may be transmitted.

Alternatively, the base station may be configured to enable the terminal to receive the downlink user plane data for a specific radio bearer through the interworking structure (or the WLAN-dedicated bearer structure or the WLAN wireless link using structure) described above, and to transmit the uplink user plane data through the WLAN signal link using structure (or the WLAN-dedicated bearer structure) described above.

For example, in the RLC layer interworking structure described above, the downlink RLC data PDU, as shown in FIG. 5 and FIG. 6, may be transmitted from the RLC entity of the base station to the RLC entity of the terminal through a WLAN carrier. The uplink RLC data PDU, as shown in FIG. 10, may be transmitted from the RLC entity of the terminal to the RLC entity of the base station through a WLAN carrier.

An uplink RLC status report with respect to the downlink RLC data PDU may be transmitted from the RLC entity of the terminal to the RLC entity of the base station through the WLAN carrier. A downlink RLC status report with respect to the uplink RLC data PDU may be transmitted from the RLC entity of the base station to the RLC entity of the terminal through the WLAN carrier.

In this case, if the downlink RLC entity of the terminal does not allow the transmission through different APs, the reordering function may not be performed. Alternatively, the RLC SDU may be transferred to the PDCP entity without performing the reordering function. As another method, a T-reordering timer may be configured to be zero or a small value.

As another example, in the PDCP layer interworking structure described above, the downlink PDCP data PDU, as described in FIG. 7 and FIG. 8, may be transmitted from the PDCP entity of the base station to the PDCP entity of the terminal through a WLAN wireless link. The uplink PDCP data PDU, as described in FIG. 11, may be transmitted from the PDCP entity of the terminal to PDCP entity of the base station through a WLAN carrier. An acknowledgement on a successful delivery of the PDCP PDUs from a low entity may be required for the data transmission procedure of the PDCP entity. To address this, the aggregation entity or the PDCP entity itself may be configured to receive indication information on a successful delivery of the PDCP PDUs. For example, a periodic or aperiodic status report or an acknowledgement transmission operation may be performed.

To configure this, the information for instructing the terminal to transmit or receive the downlink or uplink data through a WLAN carrier (or information for identifying the downlink/uplink WLAN wireless link usage or the type of downlink WLAN wireless link using bearer) may be included in the radio bearer configuration information (DRB-ToAddMod), and transmitted. Alternatively, in the case of the RLC layer interworking structure, the information for instructing the terminal to transmit and/or receive the downlink and/or uplink data through a WLAN carrier (or information for identifying the downlink/uplink WLAN wireless link usage or the type of downlink WLAN wireless link using bearer) may be included in the RLC configuration information (RLC-CONFIG) and transmitted. Alternatively, in the case of the PDCP layer interworking structure, the information for instructing the terminal to transmit and/or receive the downlink and/or uplink data through a WLAN carrier (or information for identifying the downlink/uplink WLAN wireless link usage or the type of downlink WLAN wireless link using bearer) may be included in the PDCP configuration information (PDCP-CONFIG) and transmitted. Additionally or alternatively, the information for instructing the terminal to transmit the uplink data through a WLAN carrier (or information for designating the uplink data path) and/or the information to configure the content described above (for example, information to instruct to provide an acknowledgement on a successful delivery of the base station PDCP PDUs) may be included in the RLC configuration information (RLC-CONFIG) in the case of the radio bearer configuration information (DRB-ToAddMod) or the RLC layer interworking structure described above, or the information may be included in the PDCP configuration information (PDCP-CONFIG) in the case of the PDCP layer interworking structure described above. Then, the same may be transmitted.

Alternatively, the base station may be configured to enable the terminal to receive the downlink user plane data for a specific radio bearer through the split/aggregation structure described above and to transmit the uplink user plane data through the base station wireless link using structure (or base station-dedicated bearer structure).

For example, in the RLC layer split/aggregation structure described above, the downlink RLC data PDU, as shown in FIGS. 1 and 2, may be transmitted from the RLC entity of the base station to the RLC entity of the terminal through a base station wireless link and/or a WLAN wireless link. On the contrary, the uplink RLC data PDU, as shown in FIG. 9, may be transmitted from the RLC entity of the terminal to the RLC entity of the base station through a base station carrier.

An uplink RLC status report with respect to the downlink RLC data PDU may be transmitted from the RLC entity of the terminal to the RLC entity of the base station through the base station carrier. A downlink RLC status report with respect to the uplink RLC data PDU may be transmitted from the RLC entity of the base station to the RLC entity of the terminal through the base station carrier. Alternatively, a downlink RLC status report with respect to the uplink RLC data PDU may be transmitted from the RLC entity of the base station to the RLC entity of the terminal through the base station carrier and the WLAN carrier.

As another example, in the PDCP layer split/aggregation structure described above, the downlink PDCP data PDU, as shown in FIG. 3 and FIG. 4, may be transmitted from the PDCP entity of the base station to the PDCP entity of the terminal through a base station wireless link and/or a WLAN wireless link. On the contrary, the uplink PDCP data PDU, as shown in FIG. 9, may be transmitted from the PDCP entity of the terminal to the PDCP entity of the base station through a base station carrier. An acknowledgement on a successful delivery of the PDCP PDUs from a low entity may be required for the data transmission procedure of the PDCP entity. To address this, the aggregation entity or the PDCP entity itself may be configured to receive indication information on a successful delivery of the PDCP PDUs. For example, a periodic or aperiodic status report or an acknowledgement transmission operation may be performed.

To configure this, the information for instructing the terminal to receive the downlink data through a WLAN carrier (or information for identifying the type of bearer) may be included in the radio bearer configuration information (DRB-ToAddMod) to then be transmitted. Alternatively, in the case of the RLC layer split/aggregation structure described above, the information for instructing the terminal to receive the downlink data through a base station carrier or a WLAN carrier (or information for identifying the type of bearer) may be included in the RLC configuration information (RLC-CONFIG), and the information may be transmitted with the RLC configuration information. Alternatively, in the case of the PDCP layer split/aggregation structure described above, the information for instructing the terminal to receive the downlink data through a base station carrier or a WLAN carrier (or information for identifying the type of bearer) may be included in the PDCP configuration information (PDCP-CONFIG) and be transmitted. Additionally or alternatively, the information for instructing the terminal to transmit the uplink data through a base station carrier (or information for designating the uplink data path) and/or the information to configure the content described above (for example, information to instruct to provide an acknowledgement on a successful delivery of the base station PDCP PDUs) may be included in the RLC configuration information (RLC-CONFIG) in the case of the radio bearer configuration information (DRB-ToAddMod) or the RLC layer split/aggregation structure described above, or the information may be included in the PDCP configuration information (PDCP-CONFIG) in the case of the PDCP layer split/aggregation structure described above. Then, the information may be transmitted.

Alternatively, the base station may be configured to enable the terminal i) to receive the downlink user plane data for a specific radio bearer through the split/aggregation structure described above and ii) to transmit the uplink user plane data through the WLAN carrier using structure (or the WLAN-dedicated bearer structure) described above.

For example, in the RLC layer split/aggregation structure described above, the downlink RLC data PDU, as shown in FIG. 1 and FIG. 2, may be transmitted from the RLC entity of the base station to the RLC entity of the terminal through a base station carrier and/or a WLAN carrier. On the contrary, the uplink RLC data PDU, as shown in FIG. 10, may be transmitted from the RLC entity of the terminal to the RLC entity of the base station through a WLAN wireless link/carrier.

An uplink RLC status report with respect to the downlink RLC data PDU may be transmitted from the RLC entity of the terminal to the RLC entity of the base station through the WLAN carrier. A downlink RLC status report with respect to the uplink RLC data PDU may be transmitted from the RLC entity of the base station to the RLC entity of the terminal through the base station carrier. Alternatively, a downlink RLC status report with respect to the uplink RLC data PDU may be transmitted from the RLC entity of the base station to the RLC entity of the terminal through the base station carrier and the WLAN carrier.

As another example, in the PDCP layer split/aggregation structure described above, the downlink PDCP data PDU, as shown in FIG. 3 and FIG. 4, may be transmitted from the PDCP entity of the base station to the PDCP entity of the terminal through a base station carrier and/or a WLAN carrier. On the contrary, the uplink PDCP data PDU may be transmitted from the PDCP entity of the terminal to the PDCP entity of the base station through a WLAN carrier. An acknowledgement on a successful delivery of the PDCP PDUs from a low entity may be required for the data transmission procedure of the PDCP entity. To address this, the aggregation entity or the PDCP entity itself may be configured to receive indication information on a successful delivery of the PDCP PDUs. For example, a periodic or aperiodic status report or an acknowledge transmission operation may be performed.

To configure this, the information for instructing the terminal to receive the downlink data through a base station carrier or a WLAN carrier (or information for identifying the type of bearer) may be included in the radio bearer configuration information (DRB-ToAddMod), and the same may be transmitted. Alternatively, in the case of the RLC layer split/aggregation structure, the information for instructing the terminal to receive the downlink data through a base station carrier and/or a WLAN carrier (or information for identifying the type of bearer) may be included in the RLC configuration information (RLC-CONFIG), and the same may be transmitted. Alternatively, in the case of the PDCP layer split/aggregation structure, the information for instructing the terminal to receive the downlink data through a base station carrier and/or a WLAN carrier (or information for identifying the type of bearer) may be included in the PDCP configuration information (PDCP-CONFIG), and the same may be transmitted. Additionally or alternatively, the information for instructing the terminal to transmit the uplink data through a WLAN carrier (or information for designating the uplink data path) and/or the information to configure the content described above (for example, information to instruct to provide an acknowledgement on a successful delivery of the base station PDCP PDUs) may be included in the RLC configuration information (RLC-CONFIG) in the case of the radio bearer configuration information (DRB-ToAddMod) or the RLC layer split/aggregation structure described above, or the same may be included in the PDCP configuration information (PDCP-CONFIG) in the case of the PDCP layer split/aggregation structure described above. After the including, the same may be transmitted.

As described above, the base station may include the information for separating the transfer path of the downlink user plane data and/or the information for separating the transfer path of the uplink user plane data for each radio bearer. That is, the terminal may recognize the reception structure of the downlink user plane data. The terminal may receive the downlink user plane data through a corresponding entity and process the received downlink user plane data. Alternatively, the terminal may configure a transmission structure of the uplink user plane data and transmit data through the same.

For example, if the base station and the WLAN termination are connected to each other through a backhaul having a relatively large delay, the base station may attempt to perform the downlink transmission only through a WLAN carrier. In the case of a large backhaul delay, even if the downlink data is transmitted through a split structure that aggregates the base station carrier and the WLAN carrier, the reordering requires a lot of processing, thereby degrading the performance. When the WLAN wireless state is changed due to the movement of the terminal during the attempt at the downlink transmission only through the WLAN carrier, it may cause a delay and a data interruption to process the switch from the radio bearer (for example, FIG. 5 to FIG. 8) that is configured to receive data only through the WLAN carrier into a base station bearer.

To address this, in the case of configuring the terminal to receive data only through the WLAN carrier, the base station may configure information to allow the terminal that receives data only through the WLAN carrier to quickly switch to the base station bearer when configuring to receive data only through the WLAN carrier.

For example, the description will be made of a radio bearer that is configured to transmit the downlink data only through a WLAN carrier by interworking with the PDCP entity and is configured to transmit the uplink data only through the base station carrier.

The base station transmits information to configure/add/correct the downlink data transmission bearer through a WLAN carrier to the terminal through an RRC reconfiguration message. The configuration information to configure/add/correct the downlink data transmission bearer through a WLAN carrier may include information (for example, tunnel endpoint information in a GTP tunnel or IPSEC tunnel) to transmit the downlink data (PDCP SDUs or PDCP PDUs) to the terminal through a WLAN carrier or information by which the terminal separates and transfers the downlink data received through a WLAN carrier to the PDCP entity (or the aggregation entity). In addition, the RRC reconfiguration message may include the radio bearer configuration information (DRB-ToAddMod) to configure the terminal to transmit the uplink data through the base station carrier.

When the terminal detects a problem in the WLAN wireless link, the terminal may report the same to the base station. Alternatively, the base station may directly find the problem of the WLAN wireless link. Thereafter, the base station may operate as follows.

For example, the base station transmits the downlink data through the base station carrier. That is, the data may be received by using the radio bearer configuration information (DRB-ToAddMod) that is configured to transmit the uplink data.

As another example, the base station transmits information to release/correct the downlink data transmission bearer through a WLAN carrier to the terminal through an RRC reconfiguration message. At this time, the radio bearer configuration information (DRB-ToAddMod) may be transferred through a delta signaling. At this time, the base station may instruct the PDCP entity/aggregation entity of the terminal to transfer, to the base station, the PDCP SDUs/PDUs that have been received successfully. The instruction information for the same may be configured through the RRC reconfiguration message.

The base station may retransmit the PDCP SDUs or PDCP PDUs based on the same. In addition, the base station may submit the PDCP SDUs or PDCP PDUs to a low entity based on the same.

As described above, in accordance with at least one embodiment, the terminal is enabled to transmit the user plane data by simultaneously using the E-UTRAN carrier and the WLAN carrier with respect to the downlink and/or uplink in a unit of radio bearer or by selecting the E-UTRAN carrier or the WLAN carrier when transmitting the user plane data by adding the WLAN carrier to the E-UTRAN carrier.

Hereinafter, the operation of the terminal and the base station according to the embodiments of present disclosure, will be described again with reference to the drawings.

Figure 14:
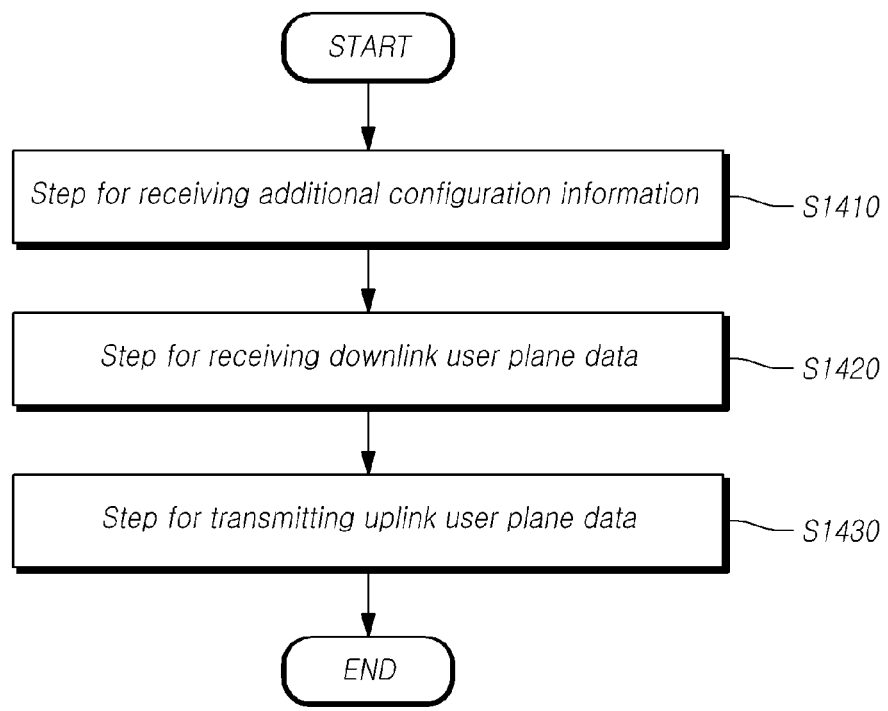
FIG. 14 is a view for explaining operation of a terminal, according to an embodiment of the present disclosure.

FIG. 14 is a flowchart for explaining operation of a terminal, according to an embodiment of the present disclosure.

The terminal, according to an embodiment of the present disclosure, may process the user plane data by a method including: receiving additional configuration information to further configure a WLAN carrier that uses an unlicensed frequency band; receiving downlink user plane data through a WLAN carrier or a base station carrier that uses a licensed frequency band according to the additional configuration information; and transmitting included uplink user plane data through the WLAN carrier or the base station carrier according to the additional configuration information.

Referring to FIG. 14, the terminal may execute receiving additional configuration information to further configure a WLAN carrier that uses an unlicensed frequency band (S1410). The additional configuration information may include information for identifying the transfer path of the downlink user plane data or information for identifying the transfer path of the uplink user plane data for each radio bearer. That is, as described above, the additional configuration information may include information for configuring a reception structure of the downlink user plane data and a transmission structure of the uplink user plane data. For example, it may include information to configure the PDCP entity, the RLC entity, or the aggregation entity.

The terminal may perform receiving the downlink user plane data through a WLAN carrier or a base station carrier that uses a licensed frequency band according to the additional configuration information (S1420). The terminal may execute transmitting included uplink user plane data through the WLAN carrier or the base station carrier according to the additional configuration information (S1430).

For example, the downlink user plane data may be received through the WLAN carrier by an interworking function in the PDCP (Packet Data Convergence Protocol) entity of the base station, and the uplink user plane data may be transmitted only through the base station carrier. Alternatively, the downlink user plane data may be received through the WLAN carrier by an interworking function in the PDCP (Packet Data Convergence Protocol) entity of the base station, and the uplink user plane data may be transmitted only through the WLAN carrier. Alternatively, the downlink user plane data may be received through the WLAN carrier and the base station carrier by a split function in the PDCP (Packet Data Convergence Protocol) entity of the base station, and the uplink user plane data may be transmitted only through the base station carrier. Alternatively, the downlink user plane data may be received through the structure of each embodiment described with reference to FIG. 1 to FIG. 8. In addition, the uplink user plane data may be transmitted through the structure of each embodiment described with reference to FIG. 9 to FIG. 13.

Meanwhile, when the terminal transmits the uplink user plane data only through the WLAN carrier, the terminal may add information for identifying the radio bearer in the aggregation entity to the uplink user plane data, and may transmit the same.

Furthermore, the terminal may receive and transmit the downlink user plane data and the uplink user plane data by a combination of the downlink structure and the uplink structure described above.

Figure 15:
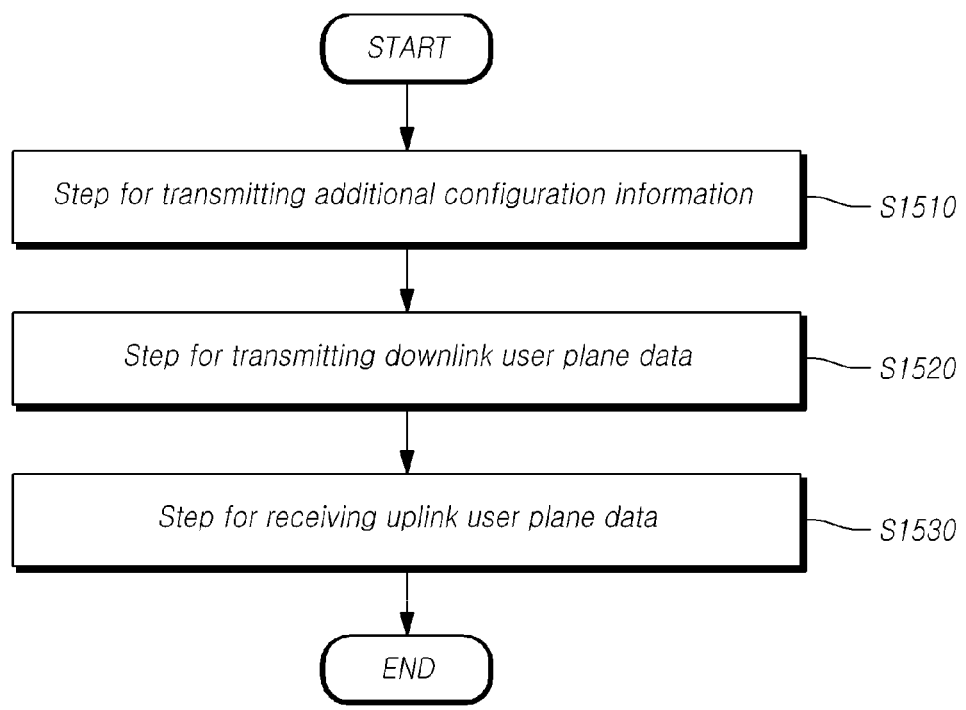
FIG. 15 is a view for explaining the operation of a base station, according to another embodiment of the present disclosure.

FIG. 15 is a flowchart for explaining operation of a base station, according to an embodiment of the present disclosure.

The base station, according to an embodiment of the present disclosure, may process the user plane data by a method including: creating and transmitting additional configuration information to further configure a WLAN carrier that uses an unlicensed frequency band; transmitting downlink user plane data through a WLAN carrier or a base station carrier that uses a licensed frequency band according to the additional configuration information; and receiving uplink user plane data through the WLAN carrier or the base station carrier according to the additional configuration information.

Referring to FIG. 15, the base station may execute creating and transmitting additional configuration information to further configure a WLAN carrier that uses an unlicensed frequency band (S1510). The additional configuration information may include information for identifying the transfer path of the downlink user plane data or information for identifying the transfer path of the uplink user plane data for each radio bearer. That is, as described above, the additional configuration information may include information for configuring a transmission structure of the downlink user plane data and a reception structure of the uplink user plane data. For example, it may include information to configure the PDCP entity, the RLC entity, or the aggregation entity.

The base station may execute transmitting downlink user plane data through a WLAN carrier or a base station carrier that uses a licensed frequency band according to the additional configuration information (S1520). The base station may execute receiving uplink user plane data through the WLAN carrier or the base station carrier according to the additional configuration information (S1530).

For example, the downlink user plane data may be transmitted through the WLAN carrier by an interworking function in the PDCP (Packet Data Convergence Protocol) entity of the base station, and the uplink user plane data may be received only through the base station carrier. Alternatively, the downlink user plane data may be transmitted through the WLAN carrier by an interworking function in the PDCP (Packet Data Convergence Protocol) entity of the base station, and the uplink user plane data may be received only through the WLAN carrier. Alternatively, the downlink user plane data may be transmitted through the WLAN carrier and the base station carrier by a split function in the PDCP (Packet Data Convergence Protocol) entity of the base station, and the uplink user plane data may be received only through the base station carrier. Alternatively, the downlink user plane data may be transmitted through the structure of each embodiment described with reference to FIG. 1 to FIG. 8. In addition, the uplink user plane data may be received through the structure of each embodiment described with reference to FIG. 9 to FIG. 13.

Meanwhile, when the terminal transmits the uplink user plane data only through the WLAN carrier, information for identifying the radio bearer in the aggregation entity may be added to the uplink user plane data, and the same may be received.

Furthermore, the base station may transmit and receive the downlink user plane data and the uplink user plane data by combination of the downlink structure and the uplink structure described above.

Meanwhile, a terminal and a base station may perform the above operations according to at least one embodiment of the present disclosure.

According to an embodiment, the terminal may include: a receiving unit that receives additional configuration information to further configure a WLAN carrier that uses an unlicensed frequency band and receives the downlink user plane data through a WLAN carrier or a base station carrier that uses a licensed frequency band according to the additional configuration information; and a transmitting unit that transmits uplink user plane data through the WLAN carrier or the base station carrier according to the additional configuration information.

For example, the receiving unit may receive the downlink user plane data through the WLAN carrier by an interworking function in the PDCP (Packet Data Convergence Protocol) entity of the base station, and the transmitting unit may transmit the uplink user plane data only through the base station carrier. Alternatively, the receiving unit may receive the downlink user plane data through the WLAN carrier by an interworking function in the PDCP (Packet Data Convergence Protocol) entity of the base station, and the transmitting unit may transmit the uplink user plane data only through the WLAN carrier. Alternatively, the receiving unit may receive the downlink user plane data through the WLAN carrier and the base station carrier by a split function in the PDCP (Packet Data Convergence Protocol) entity of the base station, and the transmitting unit may transmit the uplink user plane data only through the base station carrier. Alternatively, the receiving unit may receive the downlink user plane data through the structure of each embodiment described with reference to FIG. 1 to FIG. 8. In addition, the transmitting unit may transmit the uplink user plane data through the structure of each embodiment described with reference to FIG. 9 to FIG. 13.

Meanwhile, when the transmitting unit transmits the uplink user plane data only through the WLAN carrier, the transmitting unit may add information for identifying the radio bearer in the aggregation entity to the uplink user plane data, and the transmitting unit may transmit the same.

Furthermore, the receiving unit may receive downlink control information, data, or messages from the base station through a corresponding channel. In addition, the transmitting unit may transmit uplink control information, data, or messages to the base station through a corresponding channel.

A controller may control the overall operations of the terminal to perform the present disclosure in which: the E-UTRAN adds a WLAN as a carrier of the E-UTRAN to the terminal in the RAN level when the terminal transmits specific user plane data; the terminal effectively selects one of an E-UTRAN carrier and a WLAN carrier with respect to the downlink and uplink in consideration of the wireless state, mobility, or power consumption thereof; and the terminal transmits the user plane data.

The base station, according to an embodiment of the present disclosure, may include: a transmitting unit that creates and transmits additional configuration information to further configure a WLAN carrier that uses an unlicensed frequency band and that transmits the downlink user plane data through a WLAN carrier or a base station carrier that uses a licensed frequency band according to the additional configuration information; and a receiving unit that receives the uplink user plane data through the WLAN carrier or the base station carrier according to the additional configuration information.

For example, the transmitting unit may transmit the downlink user plane data through the WLAN carrier by an interworking function in the PDCP (Packet Data Convergence Protocol) entity of the base station, and the receiving unit may receive the uplink user plane data only through the base station carrier. Alternatively, the transmitting unit may transmit the downlink user plane data through the WLAN carrier by an interworking function in the PDCP (Packet Data Convergence Protocol) entity of the base station, and the receiving unit may receive the uplink user plane data only through the WLAN carrier. Alternatively, the transmitting unit may transmit the downlink user plane data through the WLAN carrier and the base station carrier by a split function in the PDCP (Packet Data Convergence Protocol) entity of the base station, and the receiving unit may receive the uplink user plane data only through the base station carrier. Alternatively, the transmitting unit may transmit the downlink user plane data through the structure of each embodiment described with reference to FIG. 1 to FIG. 8. In addition, the receiving unit may receive the uplink user plane data through the structure of each embodiment described with reference to FIG. 9 to FIG. 13.

Meanwhile, when the terminal transmits the uplink user plane data only through the WLAN carrier, the receiving unit may add information for identifying the radio bearer in the aggregation entity to the uplink user plane data to then be received.

Furthermore, the transmitting unit and receiving unit may be used to transmit or receive signals, messages, or data that are necessary for executing the present disclosure to or from the terminal.

A controller may control the overall operations of the base station to perform the present disclosure in which: the E-UTRAN adds a WLAN as a carrier of the E-UTRAN to the terminal in the RAN level when the terminal transmits specific user plane data; the terminal effectively selects an E-UTRAN carrier and a WLAN carrier with respect to the downlink and uplink in consideration of the wireless state, mobility, or power consumption thereof; and the terminal transmits the user plane data.

Meanwhile, the present disclosure includes a detailed embodiment for splitting and interworking the data by using the WLAN carrier described above. Hereinafter, the detailed description will be made of a split or interworking method that is necessary for splitting or interworking a user plane data unit in the PDCP layer and for transmitting the user plane data through an E-UTRAN carrier and/or a WLAN carrier.

In order for the E-UTRAN to add a WLAN carrier to the E-UTRAN as a carrier of the RAN level and to transmit the user plane data through the E-UTRAN carrier and the WLAN carrier, a method for splitting (or routing) or interworking a user plane data unit in the E-UTRAN layer 2 may be considered.

For example, the PDCP entity may split data into first data to be transmitted through the E-UTRAN carrier and/or second data to be transmitted through the WLAN carrier and may transmit at least one of the first and second data. Then, a peered PDCP entity may receive (or aggregately receive) the at least one of first and second data. Alternatively, the PDCP entity may interwork the data to be transmitted through a WLAN carrier and may transmit the same, and a peered PDCP entity may receive the same. As another example, the RLC entity may split data in to first data to be transmitted through an E-UTRAN carrier and/or second data to be transmitted through a WLAN carrier and may transmit at least one of the first and second data. A peered RLC entity may receive (or aggregately receive) the at least one of first and second data. Alternatively, the RLC entity may interwork the data to be transmitted through a WLAN carrier and may transmit the same, and a peered RLC entity may receive the same.

However, in the related art, the PDCP layer is standardized based on the interface with the RLC layer, and the RLC layer is standardized based on the interface with the MAC layer. Therefore, when the PDCP layer or the RLC layer splits or interworks first data to be transmitted through an E-UTRAN carrier and second data to be transmitted through a WLAN carrier and transmits the same through a WLAN carrier, the PDCP layer or the RLC layer may not execute a normal function that is required by a lower layer. Accordingly, the PCCP layer or the RLC layer may not work correctly when transmitting and receiving data through a WLAN carrier.

For example, the PDCP layer may provide PDCP layer functions through an interface that is standardized with a lower layer including the RLC layer. For example, the PDCP layer is able to operate handover without an error only when a notification stating a successful data transfer is received from the RLC layer. However, since such a standardized interface is not determined when adding and using a WLAN carrier, there may be an error in the operation of the PDCP layer. In the present specification, the PDCP layer and the RLC layer may be configured in the terminal or in the base station, and an entity that executes functions in each layer will be expressed as a PDCP entity and an RLC entity. Accordingly, a PDCP layer and a PDCP entity may be interchangeably used as necessary, and the PDCP layer and the PDCP entity may be used in the same sense. Likewise, an RLC layer and an RLC entity may be interchangeably used as necessary, and the RLC layer and the RLC entity may be used in the same sense.

As described above, when transmitting specific user plane data, the typical E-UTRAN cannot: add a WLAN carrier as a carrier to the E-UTRAN; and split or interwork the user plane data unit in the E-UTRAN layer 2 to then transmit the user plane data through an E-UTRAN carrier and a WLAN carrier. Since the PDCP layer among sub-layers in the E-UTRAN layer 2 can provide functions of the PDCP layer through a standardized interface with a lower layer including the RLC layer, existing operations in the PDCP layer may not be performed correctly even if the user plane data is transferred through the WLAN carrier.

The present disclosure has been made in order to solve the problems above, and has an objective of providing a split or interworking method that is necessary for: adding a WLAN carrier as a carrier to the E-UTRAN; splitting or interworking a user plane data unit in the PDCP layer; and transmitting the user plane data through the E-UTRAN carrier and/or the WLAN carrier.

For the E-UTRAN to add a WLAN carrier as a carrier of the E-UTRAN to the terminal in the RAN level and to transmit or receive the user plane data through the E-UTRAN carrier and the WLAN carrier, a protocol structure for the same and the operation of each layer should be provided.

The operation in which the E-UTRAN adds a WLAN carrier as a carrier conceptually refers to the operation in which the terminal and the base station add an additional function for the WLAN carrier to the typical E-UTRAN cell to then be configured.

To add a WLAN carrier as a carrier of the E-UTRAN to the terminal in the RAN level and to transmit the user plane data in a radio bearer unit through the E-UTRAN carrier and/or the WLAN carrier, the E-UTRAN may split (or route) or interwork a user plane data unit in the sub-layer of the E-UTRAN Layer 2, and may transmit the same.

For example, the PDCP entity (or RLC entity) may split the data to be transmitted through the E-UTRAN carrier and the data to be transmitted through the WLAN carrier and may transmit the same, and a peered PDCP entity (or RLC entity) may receive (or aggregately receive) the same. Alternatively, the PDCP entity (or RLC entity) may interwork the data to be transmitted through a WLAN carrier and may transmit the same, and a peered PDCP entity (or RLC entity) may receive the same.

<Data Transfer Path>

Hereinafter, the description will be made of a scenario in which the E-UTRAN adds a WLAN carrier as a carrier of the E-UTRAN in the RAN level and transmits the user plan data to or receives the user plane data from the terminal in a radio bearer unit through an E-UTRAN carrier and/or a WLAN carrier with reference to the drawings. That is, the uplink and downlink data transmission path scenario will be described when the PDCP layer transmits user data by splitting the user data into first data to be transmitted through an E-UTRAN carrier and/or second data to be transmitted through a WLAN carrier or by interworking the first data and the second data.

Figure 16:
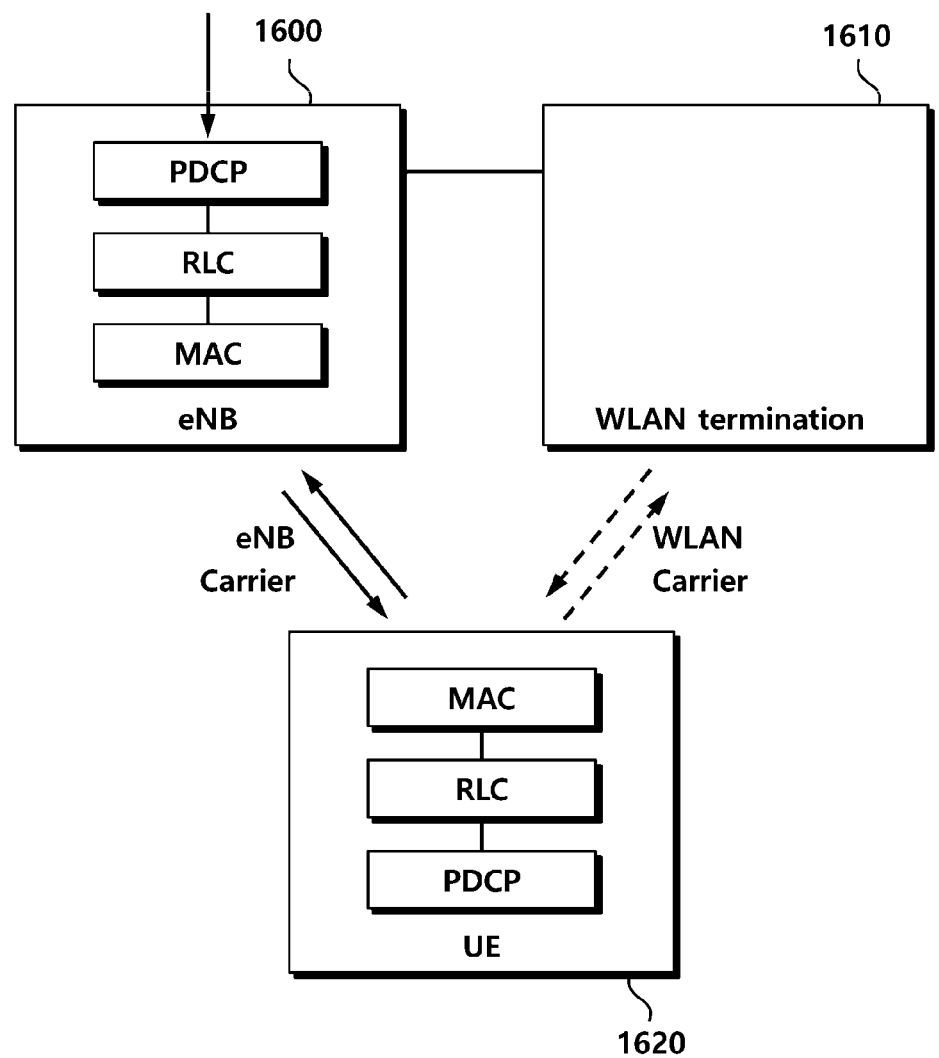
FIG. 16 is a view exemplary illustrating a data transmission path by using an E-UTRAN carrier and a WLAN carrier in accordance with at least one embodiment of the present disclosure.

FIG. 16 is a view exemplary illustrating a data transmission path by using an E-UTRAN carrier and a WLAN carrier in accordance with at least one embodiment.

Referring to FIG. 16, a base station 1600 may transmit or receive uplink or downlink data to or from a terminal 1620 through an eNB carrier. In addition, a WLAN termination 1610 may also transmit or receive uplink or downlink data to or from the terminal 1620 by using a WLAN carrier. That is, both the eNB carrier and the WLAN carrier may process the uplink and downlink data.

Figure 17:
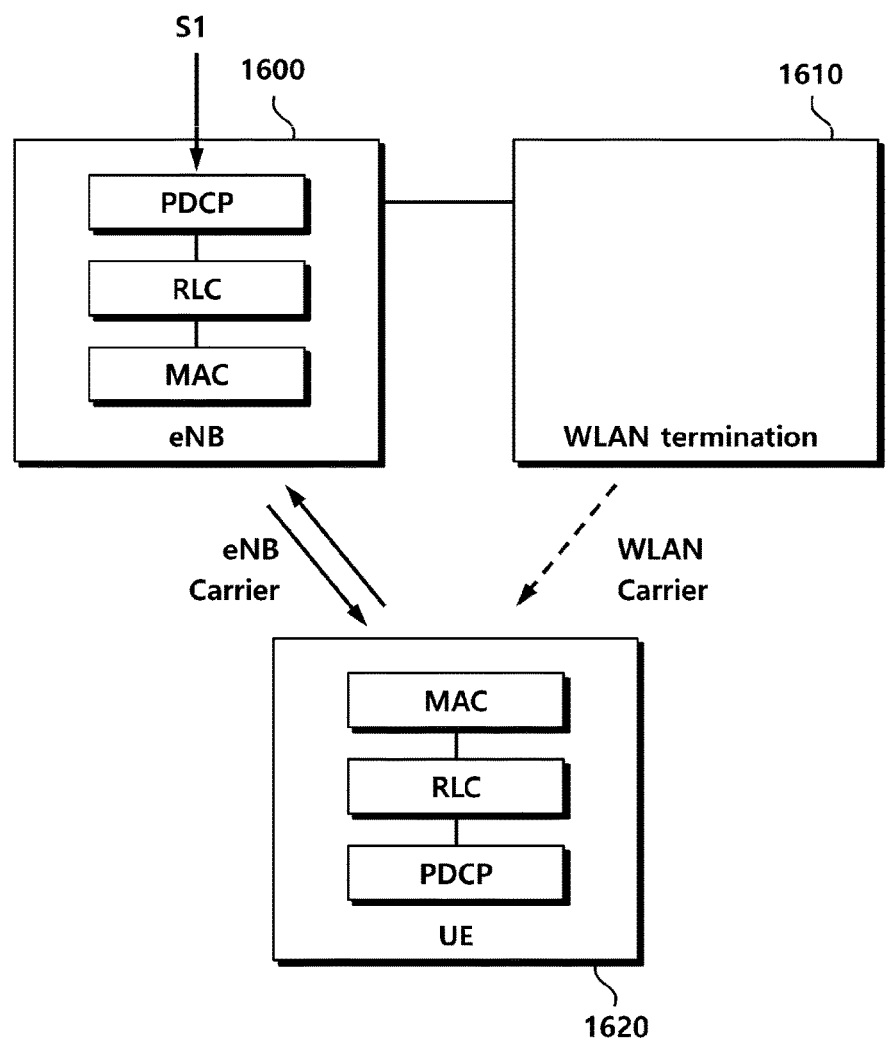
FIG. 17 is a view exemplary illustrating a data transmission path by using an E-UTRAN carrier and a WLAN carrier in accordance with another embodiment of the present disclosure.

FIG. 17 is a view exemplary illustrating a data transmission path by using an E-UTRAN carrier and a WLAN carrier in accordance with another embodiment.

Referring to FIG. 17, the base station 1600 may transmit or receive uplink or downlink data to or from a terminal 1620 through an eNB carrier. On the contrary, the WLAN termination 1610 may transmit only the downlink data to the terminal 1620 by using a WLAN carrier. That is, the downlink data may be transmitted by using both the eNB carrier and the WLAN carrier, but the uplink data may be transmitted by using only the eNB carrier.

Figure 18:
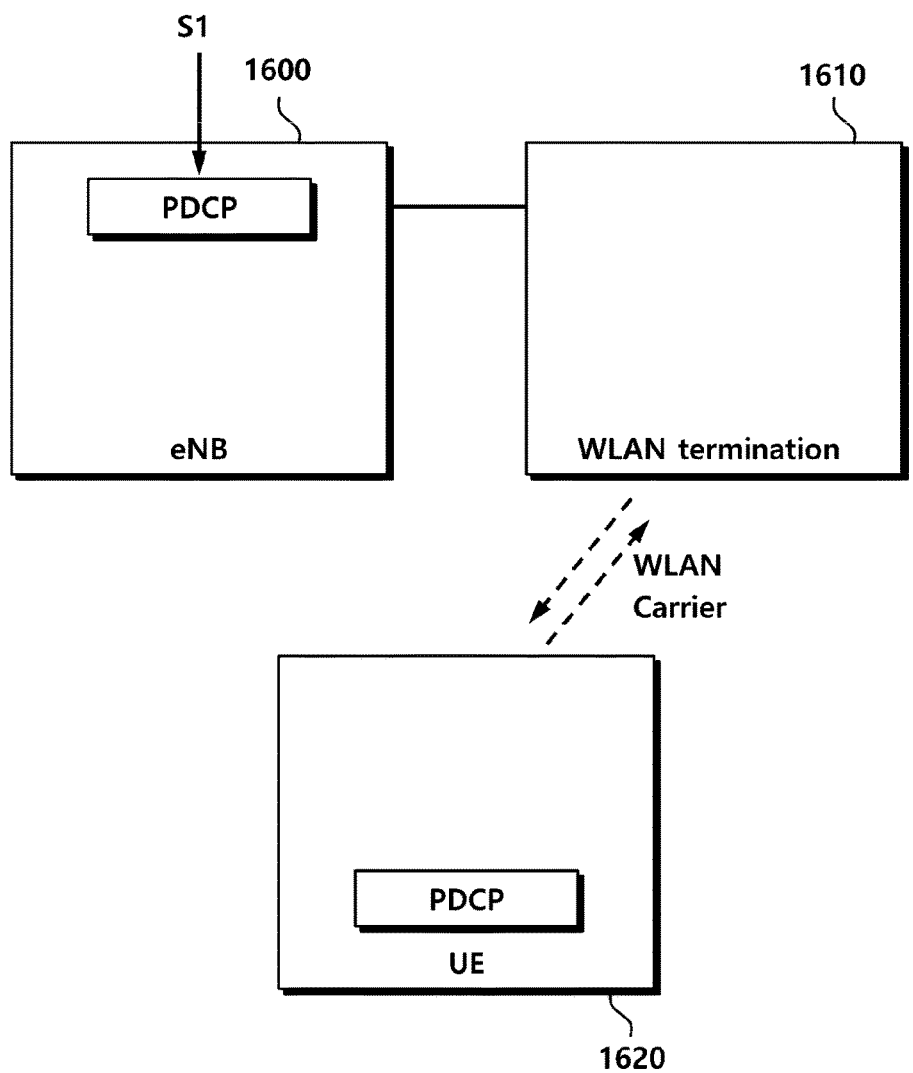
FIG. 18 is a view exemplary illustrating a data transmission path by using an E-UTRAN carrier and a WLAN carrier in accordance with still another embodiment of the present disclosure.

FIG. 18 is a view exemplary illustrating a data transmission path by using an E-UTRAN carrier and a WLAN carrier in accordance with still another embodiment.

Referring to FIG. 18, both the uplink and downlink data may be processed by using a WLAN carrier. That is, the base station 1600 and the WLAN termination 1610 may transmit or receive the downlink and uplink data to or from the terminal 1620 by using the WLAN carrier.

Figure 19:
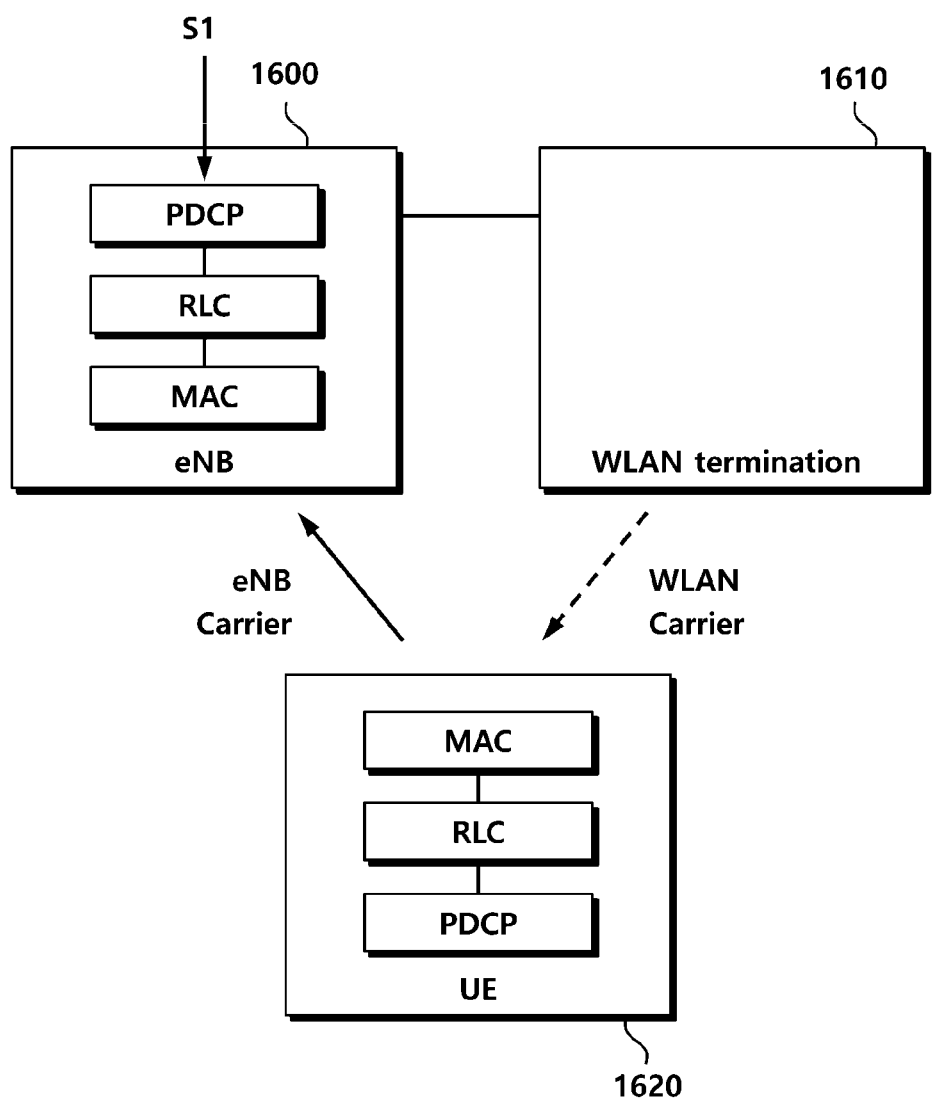
FIG. 19 is a view exemplary illustrating a data transmission path by using an E-UTRAN carrier and a WLAN carrier in accordance with yet another embodiment of the present disclosure.

FIG. 19 is a view exemplary illustrating a data transmission path by using an E-UTRAN carrier and a WLAN carrier in accordance with yet another embodiment.

Referring to FIG. 19, the base station 1600 may receive the uplink data from the terminal 1620 by using an eNB carrier. In addition, the downlink data may be transmitted through the WLAN termination 1610 by using a WLAN carrier. That is, the eNB carrier may process the uplink transmission and the WLAN carrier may process the downlink transmission, respectively.

In the case of FIG. 16 or FIG. 18, a method is required for enabling the base station 1600 to transmit the downlink user data to the terminal 1620 through the WLAN termination 1610, and for enabling the terminal 1620 to transmit the uplink user data to the base station 1600 through the WLAN termination 1610.

Meanwhile, in the case of FIG. 17 or FIG. 19, a method is required for enabling the base station 1600 to transmit downlink user data to the terminal 1620 through the WLAN termination 1610.

The eNB carrier means an E-UTRAN carrier and a carrier that is formed through E-UTRAN wireless resources.

<PDCP Interface Layer>

The PDCP layer provides the user plane data transmission, the header compression, a ciphering service, or the like. In addition, the PDCP layer expects lower layers to perform the services, such as:

an acknowledged data transfer service including the indication of a successful delivery of the PDCP PDUs, an unacknowledged data transfer service, an in-sequence delivery, except for re-establishment of lower layers, or duplicate discarding, except for re-establishment of lower layers.

Meanwhile, competition-based multiple access occurs in the WLAN, in comparison to the E-UTRAN provided with the wireless resource management by the base station scheduling. Therefore, a radio bearer for the unidentified data transfer service that is suitable for delay-sensitive services may not be appropriate to be transmitted through a WLAN carrier. Therefore, the following description will be made in detail of the acknowledged data transmission including an indication of a successful delivery of the PDCP data (for example, PDCP PDUs or PDCP SDUs) among the services described above. Hereinafter, the operation of the terminal for receiving data through a WLAN wireless link will be described by exemplifying the PDCP PDUs. However, the PDCP PDUs are only an example, and it may be applied to user plane data, data, PDCP SDUs, or PDCP SDUs that are associated with a sequence number in the same manner. That is, the embodiment of the present disclosure encompasses the case in which user plane data, data, PDCP SDUs, or PDCP SDUs that are associated with a sequence number are used instead of the PDCP PDUs, which will be described below.

Most of the user plane data that requires lossless transmission may use an acknowledged mode (AM) RLC. The AM RLC ensures lossless data transmission through the retransmission. A receiving end of the AM RLC entity sends an RLC status report to provide a negative acknowledgement for RLC PDUs that have not been received correctly. When the RLC status report is received, a transmitting end of the AM RLC entity retransmits the same. The retransmission is repeatedly performed until all the RLC PDUs are correctly received by the receiving end of the AM RLC entity or until the number of retransmissions reaches the maximum.

Meanwhile, when the upper layer requests the PDCP re-establishment, the terminal may:

reset a header compression protocol for the uplink and start with an IR state in the U-mode (if configured);

apply a ciphering algorithm and key provided by upper layers during the re-establishment procedure;

from the first PDCP SDU for which a successful delivery of the corresponding PDCP PDU has not been acknowledged by lower layers, perform the retransmission or transmission of all the PDCP SDUs that have already been associated with PDCP SNs in ascending order of the COUNT values associated to the PDCP SDU prior to the PDCP re-establishment as described below;

perform the header compression of the PDCP SDU (if configured);

perform the ciphering of the PDCP SDU by using the COUNT value associated with the PDCP SDU; and submit the resulting PDCP Data PDU to a lower layer.

With regard to the user plane radio bearer for the lossless transmission as described above, the PDCP entity may receive an indication/acknowledgment for a successful delivery of the PDCP PDUs from the RLC entity, and may retransmit the PDCP SDUs when performing the PDCP re-establishment.

Meanwhile, to control the PDCP sequence numbers to not be duplicated, the PDCP entity requires an indication/acknowledgment for a successful delivery of the PDCP PDUs. If the indication/acknowledgment for a successful delivery of the PDCP PDUs that are transmitted through a WLAN carrier is not provided, the PDCP entity may create PDCP data that exceeds a limited PDCP sequence number, and in this case, it is difficult for the PDCP entity to process the data in sequence.

When transmitting user plane data for a specific radio bearer by adding a WLAN carrier as a carrier, the E-UTRAN may split or interwork the user plane data in the PDCP layer, and may transmit the user plane data through a WLAN carrier (or an E-UTRAN carrier and WLAN carrier). In this case, the PDCP entity can retransmit the PDCP SDUs when performing the PDCP re-establishment only when the PDCP entity receives an indication/acknowledgment for a successful delivery of the PDCP PDUs from an entity that transmits or receives the PDCP PDUs through a WLAN carrier. Furthermore, the PDCP entity is able to make a control to create the PDCP data within limited PDCP sequence numbers only when the PDCP entity receives an indication/acknowledgment for a successful delivery of the PDCP PDUs from an entity that transmits or receives the PDCP PDUs through a WLAN carrier.

Accordingly, the entity that interfaces with the PDCP entity in the base station and/or the terminal and transmits or receives the PDCP PDUs through a WLAN carrier should provide an interfaced PDCP entity with an indication/acknowledgment for a successful delivery of the PDCP PDUs.

As described above, the present disclosure provides a method for performing a typical PDCP transmission function when the base station processes data by adding a WLAN carrier as a carrier.

Figure 20:
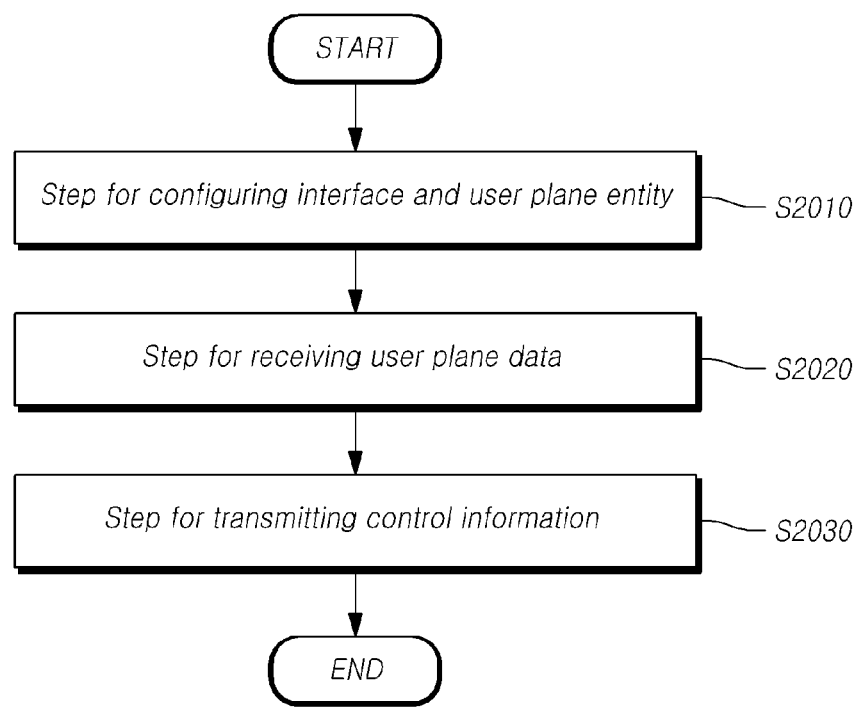
FIG. 20 is a view for explaining operation of a terminal, according to an embodiment of the present disclosure.

FIG. 20 is a flowchart for explaining operation of a terminal, according to an embodiment of the present disclosure.

The terminal, according to an embodiment of the present disclosure, provides a method that includes: configuring an interface and a user plane entity for transmitting data to or receiving data from the base station through a WLAN carrier; receiving user plane data from the base station through the interface; and transmitting, to the base station, control information indicating the successful or unsuccessful reception of the user plane data through the interface or the interface between the terminal and the base station.

Referring to FIG. 20, the terminal may execute configuring an interface and a user plane entity for transmitting data to or receiving data from the base station through a WLAN carrier (S2010). For example, the terminal may configure a data transmission/reception interface with the base station by using a WLAN carrier. As shown in the scenario described with reference to FIG. 16 to FIG. 19, the terminal of the present disclosure may configure a data transmission/reception interface through a WLAN carrier for each of a variety of scenarios. For example, the terminal may configure an interface for receiving the downlink data that is transmitted by the base station through a WLAN termination. Alternatively, the terminal may also configure an interface for transmitting the uplink data through a WLAN carrier. Alternatively, the terminal may configure an interface for transmitting data to or receiving data from the base station by using both the E-UTRAN carrier and the WLAN carrier.

Meanwhile, the terminal may configure a user plane entity to transmit data or receive data through a WLAN carrier. The user plane entity refers to a functional entity for transmitting or receiving data by using a WLAN carrier. The user plane entity may be configured with an entity that is peered with the base station or may be configured with an entity that is peered with the WLAN termination.

In addition, the user plane entity may be configured to be associated with each data radio bearer. That is, it may be determined whether the user plane entity is configured for each data radio bearer. For example, the user plane entity may not be configured for a data radio bearer that does not use a WLAN carrier, and the user plane entity may be configured only for a data radio bearer that uses a WLAN carrier.

The terminal may receive configuration information for configuring the user plane entity from the base station. The configuration information for configuring the user plane entity may be included in the radio bearer configuration information and received with the radio bearer configuration information. That is, each piece of the radio bearer configuration information may include the configuration information for the user plane entity that is configured for each radio bearer. For example, in the case of a radio bearer that transmits or receives data only by using an E-UTRAN carrier, the radio bearer configuration information may not include the configuration information for configuring the user plane entity. On the contrary, in the case of a data radio bearer that uses a WLAN carrier, the radio bearer configuration information may include the configuration information for configuring the user plane entity. The radio bearer configuration information may be received through an upper layer signaling. For example, the radio bearer configuration information may be included in an RRC message, such as an RRC connection reconfiguration message and received with the RRC message.

The terminal may execute receiving the user plane data from the base station through the configured interface (S2020). For example, as described with reference to FIG. 16 to FIG. 19, the terminal may receive the user plane data through a WLAN carrier according to each scenario. In this case, the data may be received through the interface that is configured in the step S2010 and uses a WLAN carrier. That is, the terminal may process the data received through the WLAN carrier by the user plane entity.

The terminal may execute transmitting, to the base station, control information that indicates the successful or unsuccessful reception of the user plane data through the interface between the terminal and the base station (S2030).

For example, the control information is intended to acknowledge or indicate the successful reception of the data transmitted by the PDCP entity described above, and the control information may include at least one of: i) the highest PDCP SDU/PDU sequence number that is successfully received/delivered in sequence by the terminal among the PDCP SUDs/PDUs that are received from the eNB/WLAN termination; ii) a PDCP sequence number that is regarded to be lost; transmission packet information that contains PDCP data of the highest PDCP sequence number that is successfully received by the terminal through the WLAN carrier; iii) information (for example, a sequence number) on the user plane data that is successfully received by the terminal through the WLAN carrier; or iv) information on the user plane data that is regarded to be lost. That is, the terminal may transmit, to the base station, the control information that includes the information indicating whether or not the data is successfully received through the WLAN carrier.

In this case, the control information may be provided from the user plane entity or the PDCP entity. For example, the user plane entity may check whether the PDCP PDU has been successfully received. If the PDCP PDU is missing or is received out of sequence, the user plane entity may include information on the same in the control information and transmit the control information to the base station. Alternatively, the PDCP entity may check whether the PDCP PDU has been successfully received. If the PDCP PDU is missing or is received out of sequence, the PDCP entity may include information on the same in the control information and transmit the control information to the base station. Alternatively, the transmission of the control information may be triggered based on the polling of the base station, or based on a period or timer that is set by the base station. In this case, the terminal may receive the period or timer for transmitting the control information in advance.

Meanwhile, the control information may be transmitted to the base station through an interface that is configured to process the data by using a WLAN carrier. Alternatively, the control information may be transmitted to the base station through an interface between the terminal and the base station by using an E-UTRAN carrier. That is, the control information may be transmitted through an interface using the WLAN carrier, or the control information may be transmitted through an interface using only the E-UTRAN carrier.

As described above, when the user plane entity or the PDCP entity configured in the terminal processes the data by using the WLAN carrier, a PDCP transmission function within a limited PDCP sequence number or a PDCP PDU retransmission function according to the PDCP re-establishment may be provided by providing the base station with the control information indicating the successful or unsuccessful reception. In addition, the typical functions provided by the PDCP entity may also be provided in the case of the data transmission and reception by using the WLAN carrier.

Hereinafter, interface configuration and control information transmission according to at least one embodiment will be described with reference to the drawings.

Method for Using Tunnel-Based User Plane Protocol

Figure 21:
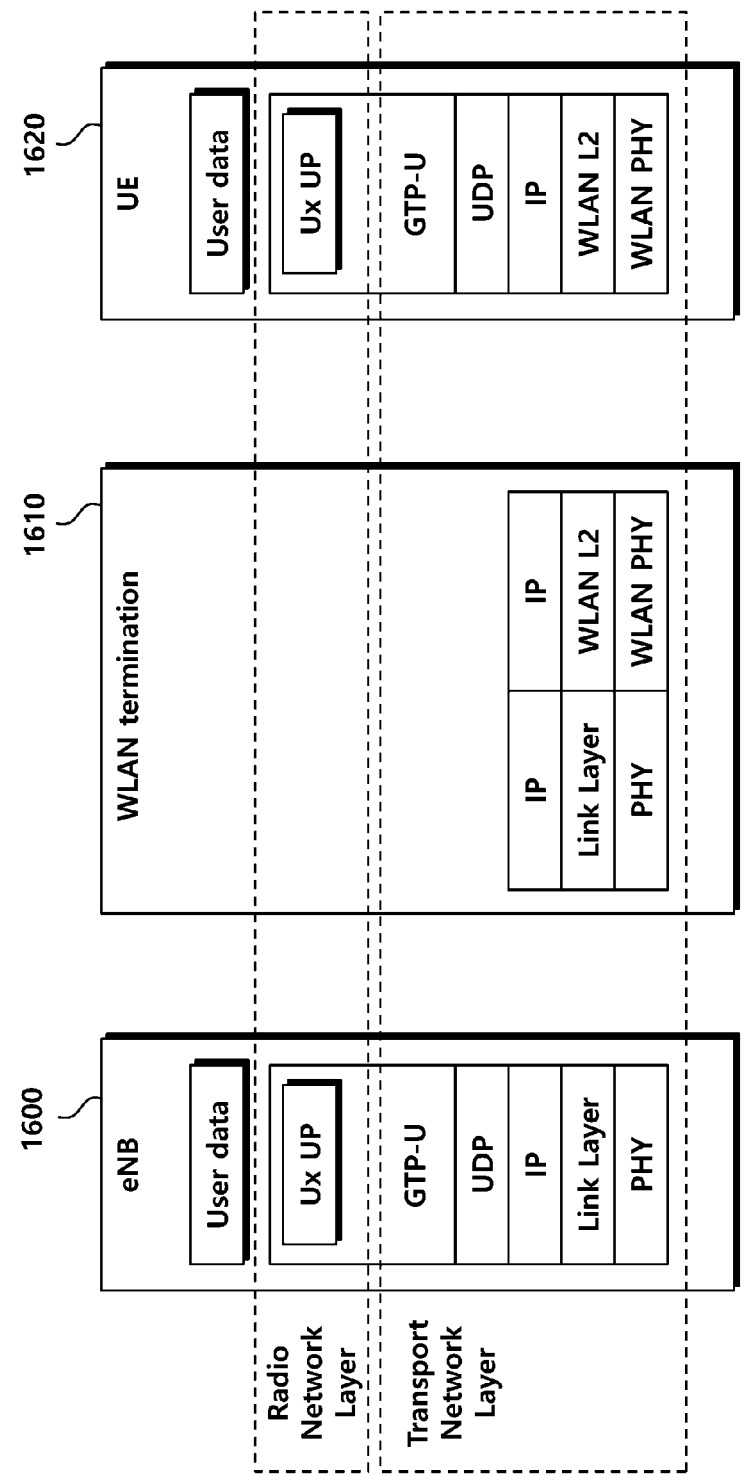
FIG. 21 is a view exemplary illustrating a user plane protocol structure for the transmission of user plane data, according to at least one embodiment of the present disclosure.

FIG. 21 is a view exemplary illustrating a user plane protocol structure for transmitting user plane data according to at least one embodiment of the present disclosure.

Hereinafter, for convenience and ease of understanding, in order to separate an interface configured by using the WLAN carrier from another interface configured by using the typical E-UTRAN carrier, the interface connected between the base station and the terminal through the WLAN carrier is denoted as an Ux interface. For example, the Ux interface may represent an interface between a WLAN termination and a terminal. As another example, the Ux interface may refer to an interface between a base station, a WLAN termination, and a terminal.

In accordance with at least one embodiment, the terminal and the base station, or the terminal and the WLAN termination may be provided with an Ux user plane protocol to deliver the control information for providing an indication or acknowledgment for a successful delivery of the PDCP PDUs through the Ux interface. The Ux user plane protocol may refer to a protocol for controlling the E-UTRAN wireless network user plane data transmission through the Ux interface, and the Ux user plane protocol may refer to as an Ux UP or an Ux UP protocol for convenience, hereinafter.

Referring to FIG. 21, the Ux UP protocol may be positioned in the user plane of a radio network layer on the interface that is connected between the base station 1600 and the terminal 1620 through a WLAN. Alternatively, the Ux UP protocol may be positioned in the Layer 2 user plane on the interface (Ux interface) that is connected between the base station 1600 and the terminal 1620 through a WLAN. Alternatively, the Ux UP protocol may be positioned in the PDCP layer user plane on the interface (Ux interface) that is connected between the base station 1600 and the terminal 1620 through a WLAN. Alternatively, the Ux UP protocol may be positioned in the RLC layer user plane on the interface (Ux interface) that is connected between the base station 1600 and the terminal 1620 through a WLAN. Alternatively, the Ux UP protocol may be positioned in the lower layer user plane of the PDCP on the interface (Ux interface) that is connected between the base station 1600 and the terminal 1620 through a WLAN. Alternatively, the Ux UP protocol may be positioned in the user plane between the PDCP and the RLC layer on the interface (Ux interface) that is connected between the base station 1600 and the terminal 1620 through a WLAN.

The entity in the terminal or the base station for processing the Ux UP protocol may be variously referred to as a user plane entity, a Ux UP protocol entity, a Ux protocol instance or Ux interlocking entity, a Ux interlocking instance or interlocking entity, an interlocking protocol entity, an interlocking entity, an aggregation entity, a transmission protocol entity, or the like. However, in the following description, for convenience and ease of understanding, a user plane entity or an Ux UP protocol entity will be used.

The user plane entity may be associated with a single radio bearer (for example, data radio bearer). Alternatively, each user plane entity may be associated with a single E-RAB.

If configured, the user plane entity may be configured in the base station and terminal in which the radio bearer is set up/added/configured on the Ux interface. For example, the base station may include user plane entity configuration information for configuring the user plane entity in the radio bearer configuration information (DRB-ToAddMod) that is configured to be radio bearer-specific (or for each radio bearer), and the base station may transfer the same to the terminal through an RRC reconfiguration message.

As shown in FIG. 21, the Ux UP protocol data or the Ux UP PDU(s) may be included in a GTP-U protocol. Alternatively, as shown in FIG. 21, the Ux UP protocol data, the Ux UP SDU(s), the PDCP SDU, or the PDCP PDU(s) may be included in a GTP-U protocol header. Alternatively, as shown in FIG. 21, the Ux UP protocol data, the Ux UP SDU(s), the PDCP SDU, or the PDCP PDU(s) may be included in a GTP-U extension header. Alternatively, as shown in FIG. 21, the Ux UP protocol data, the Ux UP SDU(s), the PDCP SDU(s), or the PDCP PDU(s) may be included in a GTP-U extension header by defining a field (or container) for the Ux UP protocol.

Meanwhile, the Ux UP protocol may provide a sequence number for the user data (or PDCP SDUs/PDUs) that is transmitted from the base station to the terminal through a WLAN carrier. Alternatively, the Ux UP protocol may provide a sequence number for the user data (or PDCP SDUs/PDUs) that is transmitted from the terminal to the base station through a WLAN carrier.

The Ux UP protocol may also provide the control information to acknowledge/indicate a successful delivery of the PDCP SDUs/PDUs that are transmitted from the base station to the terminal through a WLAN carrier. Alternatively, the Ux UP protocol may provide the control information to acknowledge/indicate a successful delivery of the PDCP SDUs/PDUs that are transmitted from the terminal to the base station through a WLAN carrier.

When the user plane data for a specific radio bearer (or E-RAB) is transmitted through an Ux interface, the user plane entity may operate the procedure to provide the control information to acknowledge/indicate a successful delivery of the PDCP SDUs/PDUs.

For example, in the case of the downlink data transmission, the base station may allocate consecutive Ux-UP sequence numbers to the respective Ux-UP packets to be transmitted. The terminal may detect whether the Ux-UP packet has been lost in a regular interval that is set by the base station or when a request is received from the base station. Alternatively, the terminal may detect whether the Ux-UP packet has been lost constantly or according to a polling field setting included in the Ux-UP packet header by the base station. Alternatively, in the case of receiving the downlink data by using both the E-UTRAN carrier and the WLAN carrier, the terminal may detect whether the packet has been lost by means of the reordering function of the PDCP entity, and may transfer the same to the user plane entity.

If a Ux-UP packet is detected to be out of sequence or to have been lost, the terminal may transmit, to the base station, at least one piece of information of: the highest Ux-UP sequence number that is successfully received; the highest PDCP sequence number that is successfully received; or a PDCP sequence number that is regarded to have been lost. Alternatively, the terminal may transmit, to the base station, at least one piece of information of: the highest Ux-UP sequence number that is successfully received; the highest PDCP sequence number that is successfully received; or a PDCP sequence number that is regarded to have been lost constantly or according to a constant period, a request received from the base station, or a polling field setting.

Alternatively, the terminal may detect whether the Ux-UP packet has been lost in a constant period set by the base station, by a request of the base station, by way of a polling field setting that is included in the Ux-UP packet header by the base station, or constantly. If a Ux-UP packet is detected to be out of sequence or to have been lost, the terminal may transmit, to the base station, at least one piece of information of: the highest PDCP sequence number that is successfully received; the sequence number of the Ux-UP packet that is declared to have been lost by the terminal; or the sequence numbers of the PDCP PDUs that are declared to have been lost by the terminal. At least one piece of information of: the highest PDCP sequence number that is successfully received by the terminal; the sequence number of the Ux-UP packet that is declared to have been lost by the terminal; or the sequence numbers of the PDCP PDUs that are declared to have been lost by the terminal may be transmitted by means of the configuration information described above.

For example, the control information may be transmitted through an uplink Ux interface. As another example, the control information may be transmitted through an uplink Uu interface between the base station and the terminal. The Uu interface refers to the typical interface between the base station and the terminal through an E-UTRAN carrier. The control information may be provided by the PDCP control PDU when it is transmitted through the Uu interface. For example, a PDCP status report may be used. Alternatively, it may be provided through a new format of PDCP control PDU for the control information transmission.

Meanwhile, the terminal may declare, as being lost, the Ux-UP packet, which has not been received according to a constant period set by the base station or according to a request of the base station. Alternatively, the terminal may declare, as being lost, the Ux-UP packet, which has not been received or according to a polling field setting included in the Ux-UP packet header from the base station. Alternatively, the terminal may declare, as being lost, the Ux-UP packet, which has not been received after receiving the Ux-UP packet that is out of sequence. Alternatively, the terminal may declare, as being lost, the Ux-UP packet, which has not been received after receiving the Ux-UP packet that is out of sequence and after the lapse of the expiration time by the base station.

Until now, the case has been described in which the user plane entity checks the successful or unsuccessful reception of the user plane data that is received by using a WLAN carrier and transmits the control information. However, a method has been described in which the user plane entity identifies the data that is out of sequence or is lost by using a separate sequence number for the data received through a WLAN carrier.

Meanwhile, as another method, the Ux UP protocol may not provide a sequence number for the user data (or PDCP SDUs/PDUs) that is transmitted through a WLAN carrier, and the Ux UP protocol may provide the terminal with the control information to acknowledge/indicate a successful delivery of the PDCP SDUs/PDUs through a WLAN carrier by using sequence numbers of the SDUs/PDCP PDUs.

For example, in the case of the downlink data transmission, the terminal may detect whether the Ux-UP packet has been lost constantly, according to a constant period set by the base station, by a request of the base station, or according to a polling field setting by the base station.

If an Ux-UP packet is detected to be out of sequence or to have been lost, the terminal may transmit, to the base station, the highest PDCP sequence number that is successfully received. Alternatively, the terminal may transmit, to the base station, the highest PDCP sequence number that is successfully received constantly or according to a constant period, in response to a request of the base station, or according to a polling field setting included in the Ux-UP packet header from the base station.

Alternatively, the terminal may detect whether the Ux-UP packet has been lost constantly, according to a constant period set by the base station, in response to a request of the base station, or according to a polling field setting. If an Ux-UP packet is detected to be out of sequence or to have been lost, the terminal may transmit, to the base station, at least one piece of information of: the highest PDCP sequence number that is successfully received; or the sequence numbers of the PDCP PDUs that are declared as being lost by the terminal. Alternatively, the terminal may transmit, to the base station, at least one piece of information of: the highest PDCP sequence number that is successfully received; or the sequence numbers of the PDCP PDUs that are declared as being lost by the terminal constantly, according to a constant period, in response to a request of the base station, or according to a polling field setting. In this case, information on the highest PDCP sequence number that is successfully received and information on the sequence numbers of the PDCP PDUs that are declared as being lost by the terminal may be included in the control information.

For example, the control information may be transmitted through an uplink Ux interface. As another example, the control information may be transmitted through an uplink Uu interface between the base station and the terminal. The control information may be provided through the PDCP control PDU when it is transmitted through the Uu interface. For example, the control information may be transmitted through a PDCP status report. Alternatively, the configuration information may be transmitted through a new format of PDCP control PDU.

Meanwhile, the terminal may declare, as being lost, the Ux-UP packet, which has not been received: in a constant period set by the base station; by a request of the base station; by a polling field setting that is included in the Ux-UP packet header from the base station; constantly; after the terminal receives the Ux-UP packet that is out of sequence; or after the lapse of expiration time by the base station since the terminal receives the Ux-UP packet that is out of sequence.

Until now, although the description has been made of the transmission of the configuration information that indicates a successful data delivery when the terminal receives the downlink data, the same operation may be applied to the case where the base station receives the uplink data with the replacement of the entity by the base station.

Meanwhile, in the case of the downlink transmission, the base station may remove buffered PDCP SDUs/PDUs according to the feedback of the PDCP SDUs/PDUs that are successfully delivered. Likewise, in the case of the uplink transmission, the terminal may remove buffered PDCP SDUs/PDUs according to the feedback of the PDCP SDUs/PDUs that are successfully delivered.

Figure 22:
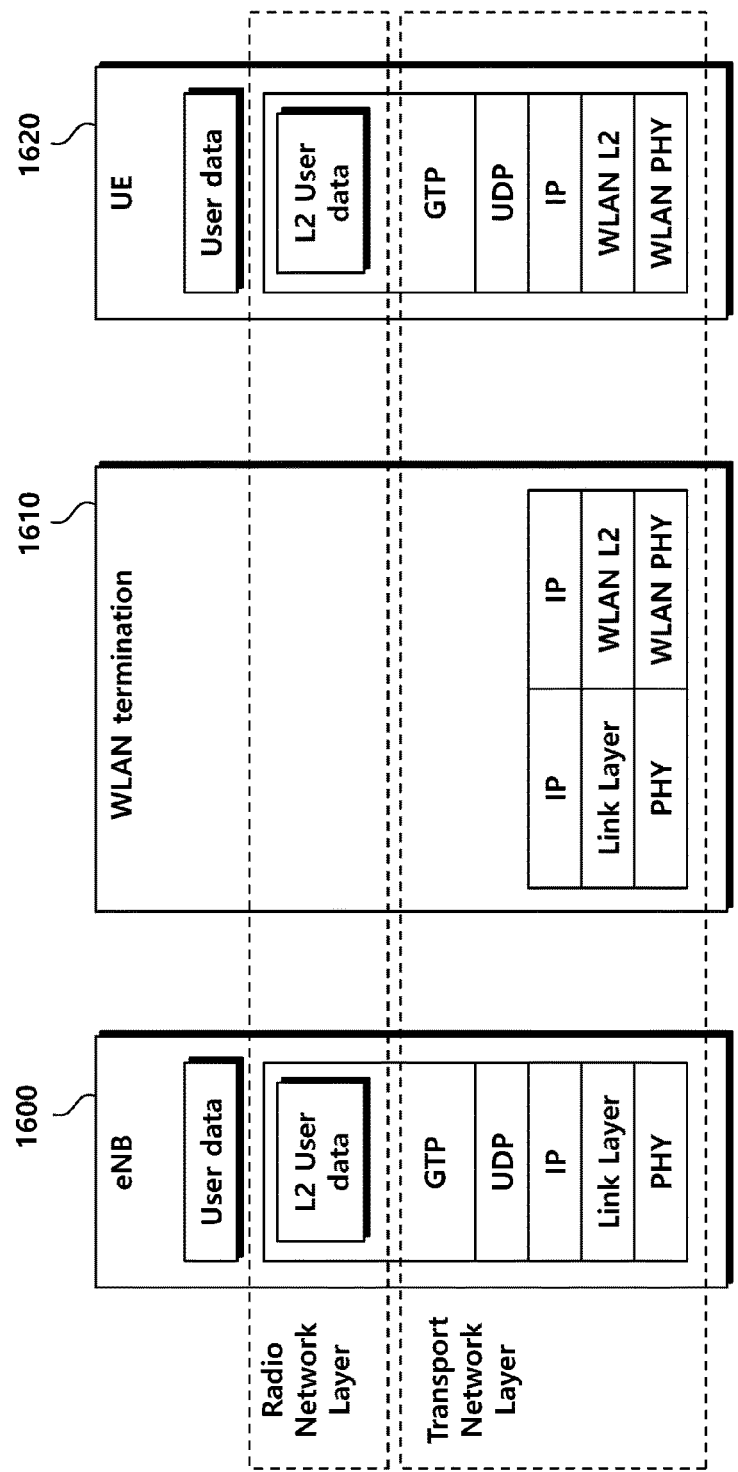
FIG. 22 is a view exemplary illustrating a user plane protocol structure for the transmission of user plane data, according to another embodiment of the present disclosure.

FIG. 22 is a view exemplary illustrating a user plane protocol structure for the transmission of the user plane data, according to another embodiment of the present disclosure.

Although the WLAN termination 1610 performs the routing in the IP layer, the present disclosure may encompass the case where the WLAN termination 1610 performs the routing/switching or MAC switching in the data link layer.

As shown in FIG. 22, a GTP tunnel may be set up in a base station 1600 and a terminal 1620. For example, in the case of performing the downlink transmission through a WLAN carrier as shown in the scenarios of FIG. 16 to FIG. 19, the base station 1600 may deliver, through a GTP protocol (or a GTP-U protocol, a WLAN interworking tunnel protocol, or a certain tunnel protocol), the user data to be transmitted by a split or interworking function through a WLAN carrier by using the downlink tunnel. As another example, in the case of performing the uplink transmission through a WLAN carrier as shown in the scenarios of FIG. 16 to FIG. 18, the terminal 1620 may deliver, through a GTP protocol (or a GTP-U protocol, a WLAN interworking tunnel protocol, or a certain tunnel protocol), the user data to be transmitted by a split or interworking function through a WLAN carrier by using the uplink tunnel.

The above-described tunnel (for example, a GTP tunnel or a certain header encapsulation-based tunnel) between the base station 1600 and the terminal 1620 may be used to deliver an encapsulated user data packet (or E-UTRAN Layer 2 SDU/PDU or E-UTRAN Layer 2 user data) between a pair of given tunnel endpoints.

For example, when the PDCP layer or PDCP entity splits data into or interworks first data to be transmitted through an E-UTRAN carrier and/or second data to be transmitted through a WLAN carrier, the tunnel between the base station 1600 and the terminal 1620 may be used to deliver PDCP SDUs or PDCP PDUs between a pair of given tunnel endpoints.

As another example, when the RLC layer or RLC entity splits data into or interworks the data to be transmitted through an E-UTRAN carrier and/or the data to be transmitted through a WLAN carrier, the tunnel between the base station 1600 and the terminal 1620 may be used to deliver RLC PDUs between a pair of given tunnel endpoints.

A tunnel protocol header (for example, a GTP header or a header on a certain header encapsulation-based tunnel) of the tunnel between the base station 1600 and terminal 1620 includes a tunnel endpoint identification information (for example, TEID) field. This field unambiguously identifies the tunnel endpoints in the receiving tunnel protocol entity (a GTP-U protocol entity, a GTP protocol entity, an interworking entity, an interworking protocol entity, a GTP tunnel entity, a GTP-U tunnel entity, a GTP entity, a GTP-U entity, an aggregation entity, an aggregation protocol entity, or a transmission protocol entity; hereinafter, referred to as a tunnel protocol entity).

The tunnel endpoint included in the tunnel protocol header may indicate a tunnel to which a specific user data packet belongs.

Alternatively, the tunnel endpoint included in the tunnel protocol header may indicate a radio bearer or radio bearer entity to which a specific user data packet belongs. Alternatively, the tunnel endpoint included in the tunnel protocol header may map a specific user data packet with a corresponding radio bearer or radio bearer entity.

The tunnel endpoint identification information (for example, TEID) included in the tunnel protocol header may demultiplex the incoming traffic and transfer the same to the corresponding user plane radio bearer entity.

For example, when the base station PDCP entity splits data into or interworks the data to be transmitted through an E-UTRAN carrier and/or the data to be transmitted through a WLAN carrier, the terminal that receives the data through the downlink tunnel may transfer the received data/PDCP SDUs/PDUs to the peered or corresponding PDCP entity in the terminal through the tunnel endpoint identification information.

Entity Usage for Aggregation/Interworking Between Base Station and WLAN Termination For enabling the E-UTRAN to add a WLAN carrier as a carrier in the PDCP layer and to transmit the downlink user plane data traffic by simultaneously using a carrier and the WLAN carrier, an aggregation entity for the aggregation/interworking between the base station and the WLAN termination may be required. The aggregation entity may be used to encompass an interworking entity, an LTE-WLAN adaptation entity, an interworking function, a logical entity for the LTE-WLAN aggregation, and an LTE-WLAN aggregation entity. In addition, in some cases, the aggregation entity may refer to the above-described user plane entity.

The aggregation entity may be a standalone entity, or the aggregation entity may be a functional entity of another network. For example, when the base station and the WLAN termination are co-located as an integrated device, the aggregation entity may be a functional entity included in the integrated device. As another example, the aggregation entity may be a functional entity included in the WLAN termination in the scenario in which the base station and the WLAN termination are not co-located. As another example, the aggregation entity may be a functional entity included in the base station in the scenario in which the base station and the WLAN termination are not co-located.

The aggregation entity may be implemented to be an upper layer entity than L1/L2. For example, when the aggregation entity is configured as a functional entity included in the WLAN termination, it may operate as being an upper layer entity than WLAN L1/L2 to transmit user plane data to the terminal through the WLAN L1/L2. As another example, when the aggregation entity is configured as a functional entity included in the base station, it may operate as being an upper layer entity (for example, an IP layer, a session layer, or an application layer) to transmit user plane data to the terminal through the WLAN termination. As another example, when the aggregation entity is configured as a functional entity included in the base station, it may operate as being an entity that executes a function of transmitting the PDCP PDUs through the WLAN termination to transmit user plane data to the terminal through the WLAN termination. As another method, the aggregation entity may be configured as a function in the WLAN L2 so that the WLAN L2 entity may implement the operation for the same.

The aggregation entity may receive the PDCP PDUs from the PDCP entity of the base station. Alternatively, the aggregation entity may receive the PDCP PDUs by making a request for the same to the PDCP entity of the base station.

The aggregation entity may transmit the received PDCP PDUs to the terminal through a WLAN carrier. Alternatively, the aggregation entity may transmit the received PDCP PDUs to the terminal by using a WLAN L1/L2 protocol. Alternatively, the aggregation entity may transmit the received PDCP PDUs to the terminal through the WLAN termination (or WLAN carrier) by using IP communication.

The terminal may transfer the PDCP PDUs that are received through the WLAN carrier to the corresponding PDCP entity in the terminal. Alternatively, the terminal may transfer the PDCP PDUs that are received by using the WLAN L1/L2 protocol in the terminal to the corresponding PDCP entity in the terminal.

The base station may split and transmit the data traffic that belongs to a specific bearer in the PDCP layer through the base station and the WLAN termination. That is, to transmit the user plane data in a radio bearer unit through an E-UTRAN carrier and a WLAN carrier, the PDCP entity may split the PDCP PDUs into an associated RLC entity and/or an associated aggregation entity to then be submitted. For the PDCP entity to transmit the user plane data in a radio bearer unit through an E-UTRAN carrier and a WLAN carrier, the base station may be configured to enable the terminal to transfer the PDCP PDUs that are received through a WLAN carrier (or through a WLAN L1/L2 protocol or through a WLAN wireless receiving function) with respect to a specific bearer to the corresponding PDCP entity of the specific bearer in the terminal. Alternatively, for the PDCP entity to transmit the user plane data in a radio bearer unit through an E-UTRAN carrier and a WLAN carrier, the base station may include and send information by which the terminal may transfer the PDCP PDUs that are received through a WLAN carrier (or through a WLAN L1/L2 protocol or through a WLAN wireless receiving function) with respect to a specific bearer to the corresponding PDCP entity of the specific bearer in the terminal.

Figure 23:
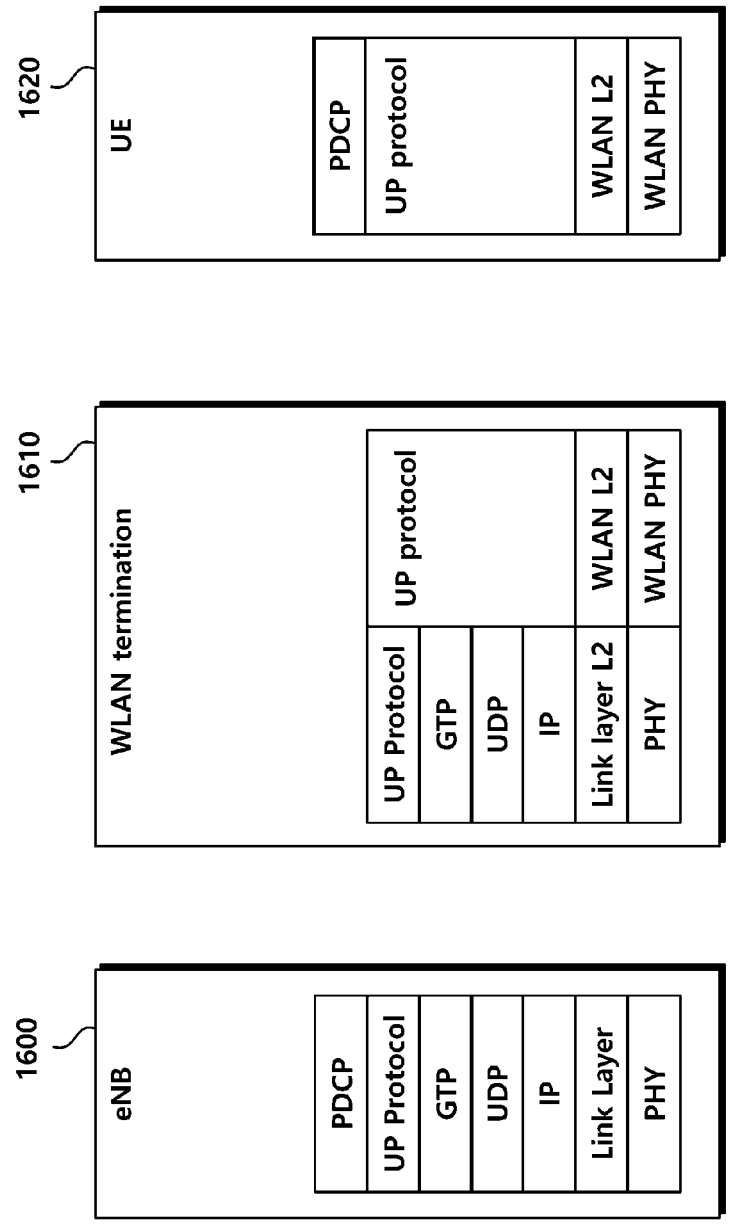
FIG. 23 is a view exemplary illustrating a user plane protocol structure for the transmission of user plane data, according to still another embodiment of the present disclosure.

FIG. 23 is a view exemplary illustrating a user plane protocol structure for the transmission of user plane data, according to still another embodiment of the present disclosure.

When the base station 1600 and the WLAN termination 1610 are not co-located, the user plane data (PDCP PDUs) may be delivered through a GTP-U protocol in the interface between the base station 1600 and the WLAN termination 1610. When the base station 1600 and the WLAN termination 1610 are not co-located, and if the interface between the base station 1600 and the WLAN termination 1610 is associated with an E-RAB for a bearer that is provided through the base station 1600 and WLAN termination 1610, the GTP-U may deliver the PDCP PDUs.

When the E-UTRAN adds a WLAN carrier as a carrier, and when the LTE-WLAN aggregation is configured to transmit the downlink user data traffic by using both the E-UTRAN carrier and the WLAN carrier, a user data bearer is set up in the interface between the base station 1600 and the WLAN termination 1610, and a user plane protocol instance (UP protocol entity) is established in the base station 1600 and the WLAN termination 1610, respectively, as shown in FIG. 23.

Each user plane protocol instance or UP protocol entity in the interface between the base station 1600 and the WLAN termination 1610 is associated with a single E-RAB. Therefore, each E-RAB may identify a user plane data bearer in the interface between the base station 1600 and the WLAN termination 1610, an endpoint of the user plane data bearer of the base station 1600 that is associated with the corresponding bearer, or an endpoint of the WLAN termination 1610 that is associated with the corresponding bearer, respectively, by using a GTP tunnel endpoint IE (Information element).

The aggregation entity included in the WLAN termination 1610 may include the user plane instance/entity in the WLAN termination 1610 described above. Alternatively, the aggregation entity may operate in association with the user plane instance/entity in the WLAN termination 1610 described above. Alternatively, the aggregation entity may operate as the user plane instance/entity in the WLAN termination 1610 described above.

As another method, when the base station 1600 and the WLAN termination 1610 are not co-located, the user plane data (PDCP PDUs) may be included in the payload of the IP protocol to be transmitted in the interface between the base station 1600 and the WLAN termination 1610. The base station 1600 may include the PDCP PDUs (user plane data) to be transmitted to the terminal 1620 through the WLAN termination 1610 in the data field of the IP packet, and the base station 1600 may send the same to the destination of the IP address of the terminal 1620 through the WLAN termination 1610.

As another method, when the base station 1600 and the WLAN termination 1610 are not co-located, the user plane data (PDCP PDUs) may be included in the payload of the WLAN L2 (or WLAN MAC) protocol to be transmitted in the interface between the base station 1600 and the WLAN termination 1610. The base station 1600 may include the PDCP PDUs (user plane data) to be transmitted to the terminal 1620 through the WLAN termination 1610 in the data field of the WLAN L2 (or WLAN MAC) frame, and the base station 1600 may send the same to the destination of the WLAN MAC address of the terminal 1620 through the WLAN termination 1610.

When it is determined to trigger the feedback on the downlink data transfer, the user plane protocol instance (UP protocol entity) included in the WLAN termination 1610 may transfer, to the base station 1600, the information, such as the highest PDCP PDU sequence number that is successfully transmitted to the terminal 1620 among the PDCP PDUs received from the base station 1600, a buffer size for the corresponding E-RAB, a user plane protocol instant packet that is regarded to have been lost, or the like.

To this end, the base station 1600 may receive the information on the successful reception of the PDCP PDUs from the terminal 1620 in the following manners. The function for receiving the configuration information on the successful reception of the PDCP PDUs from the terminal 1620 may be included in the aggregation entity function. As described below, when the terminal 1620 configures a partial RLC entity with respect to the corresponding bearer and transmits the control information on the successful reception of the PDCP PDUs, the aggregation entity may receive the same through a partial RLC entity that is peered with it. In addition, when the terminal transmits the control information on the successful reception of the PDCP PDUs through the PDCP entity with respect to the corresponding bearer, the aggregation entity may receive the same through a PDCP entity that is peered with it.

Configuring and Using Partial RLC Protocol Operation

As described above, the interface connected between the base station and the terminal through a WLAN carrier will be defined and denoted as an Ux interface. When the user plane instance is configured between the base station and WLAN termination in the user plane entity described above, the UP protocol entity may be configured to provide some of the functions (for example, an RLC status reporting function) for the ARQ procedure of the RLC layer. That is, some of the functions (for example, the RLC status reporting function) for the ARQ procedure of the typical RLC layer may be provided through a new user plane entity (for example, a user plane sub-layer entity) in the terminal. In the case of the LTE-WLAN aggregation, this may be a user plane entity separated from the RLC entity for processing the PDCP PDUs received through the LTE wireless link. For example, this may be referred to as a WLAN RLC entity separated from the LTE RLC entity. Hereinafter, this will be referred to as a user plane entity for the convenience of explanation. This is only for the convenience and ease of understanding, and embodiments of the present disclosure are not limited thereto.

The user plane entity may transmit the PDCP PDUs to its peered user plane entity. In addition, the user plane entity may be configured to provide the control information for providing the indication/acknowledgment for a successful delivery of the PDCP PDUs in the Ux interface.

For example, in the case of the downlink transmission, the user plane entity of the base station may transmit the PDCP PDUs to the user plane entity of the terminal. The terminal user plane entity may provide the base station with the control information containing the indication/acknowledgment information on a successful delivery of the downlink PDCP PDUs. That is, the user plane entity of the terminal may transmit, to the WLAN termination, the control information containing the indication/acknowledgment information on a successful delivery of the downlink PDCP PDUs. The WLAN termination may transfer the same to the user plane entity of the base station.

As another example, in the case of the downlink transmission, the user plane entity of the WLAN termination may transmit the PDCP PDUs received from the base station to the user plane entity of the terminal. The terminal user plane entity may transmit, to the user plane entity of the WLAN termination, the control information containing the indication/acknowledgment information on a successful delivery of the downlink PDCP PDUs. The user plane entity of the WLAN termination may transfer the same to the base station. That is, the user plane entity of the terminal may transmit, to the base station, the control information containing the indication/acknowledgment information on a successful delivery of the downlink PDCP PDUs through the WLAN termination.

For example, the status reporting may be triggered whenever its peered user plane entity transmits the data. For example, in the case of the downlink data transmission, the user plane entity of the terminal may trigger the status reporting whenever the data is received.

As another example, the status reporting may be triggered in a period set by the base station. For example, in the case of the downlink data transmission, the user plane entity of the terminal may trigger the status reporting in a period set by the base station.

As another example, the status reporting may be triggered by the polling from its peered user plane entity. For example, in the case of the downlink data transmission, the user plane entity of the terminal may trigger the status reporting by the polling of the user plane entity of the base station or by the polling of the user plane entity of the WLAN termination. To this end, the Ux UP protocol/UP protocol header may have a polling field, and when Ux UP PDU/UP PDU having a set polling field is received, the status reporting may be triggered.

As another example, the status reporting may be triggered when a reception failure of one Ux UP PDU/UP PDU is detected. For example, in the case of the downlink data transmission, when the user plane entity of the terminal receives Ux UP PDU that is out of sequence, the timer may be initiated. When the timer expires, the user plane entity of the terminal may trigger the status reporting.

The base station may include the configuration information for indicating a user plane entity that performs the partial RLC function described above in an RRC reconfiguration message to be transmitted to the terminal. When the user plane entity is configured according to the configuration information of the base station, the terminal that performs the partial RLC function through the user plane entity may be configured to provide the base station with the control information containing the indication/acknowledgment information for a successful delivery of the downlink PDCP PDUs. That is, the user plane entity of the terminal may transmit, to the WLAN termination, the control information containing the indication/acknowledgment information on a successful delivery of the downlink PDCP PDUs. The WLAN termination may transfer the same to the user plane entity of the base station.

In the case of the downlink transmission, the base station or the WLAN termination may remove buffered PDCP PDUs according to the feedback of the PDCP PDUs that are successfully delivered. In the case of the uplink transmission, the terminal may remove buffered PDCP PDUs according to the feedback of the PDCP PDUs that are successfully delivered.

The Ux UP protocol data/UP protocol data or Ux UP PDU(s)/UP PDU may be included in the GTP-U protocol/IP protocol/WLAN MAC protocol data field. Alternatively, the Ux UP protocol data/UP protocol data or Ux UP PDU(s)/UP PDU(s) may be included in the GTP-U protocol/IP protocol/MAC protocol payload. The Ux UP protocol header/UP protocol header may include a field that separates the user plane data (PDCP PDUs) with the control plane data (feedback).

The tunnel endpoint identification information (for example, TEID) included in the tunnel protocol header (for example, a GTP header or a header in a certain header encapsulation-based tunnel) may be configured to demultiplex the incoming traffic and to transfer the same to the corresponding user plane entity.

For example, when the base station user plane entity splits data into or interworks first data to be transmitted through an E-UTRAN carrier and/or second data to be transmitted through a WLAN carrier, the terminal that receives the data through the downlink tunnel or through the WLAN termination that is connected through the downlink tunnel may transfer the PDCP PDUs to the peered or corresponding user plane entity in the terminal through the tunnel endpoint identification information/the identification information included in the UP protocol field.

As another example, when the terminal user plane entity interworks the data to transmit the same through a WLAN carrier, the base station that receives the data through the uplink tunnel or through the WLAN termination that is connected through the uplink tunnel may transfer the PDCP PDUs to the peered or corresponding user plane entity in the base station through the tunnel endpoint identification information.

As another example, when the base station PDCP entity splits data into or interworks first data to be transmitted through an E-UTRAN carrier and/or second data to be transmitted through a WLAN carrier and transmits the same, the terminal that receives data through the downlink tunnel or through the WLAN termination that is connected through the downlink tunnel may transfer the PDCP PDUs to the peered or corresponding PDCP entity in the terminal through the tunnel endpoint identification information/the identification information included in the UP protocol field.

Usage of PDCP Control PDUs

As described above, the interface connected between the base station and the terminal through the WLAN will be defined and denoted as an Ux interface. The PDCP entity may provide the control information to provide the indication/acknowledgment for a successful delivery of the PDCP SDUs/PDUs in the Ux interface.

For example, in the case of the downlink data transmission, the terminal may detect whether the PDCP SDUs/PDUs that are received through the Ux interface have been lost constantly or according to a constant period set by the base station, a request of the base station, or a polling field setting included in the PDCP header from the base station. If the PDCP SDUs/PDUs are detected to be out of sequence or to have been lost, the terminal may transmit, to the base station, the highest PDCP sequence number that is successfully received. Alternatively, the terminal may transmit, to the base station, the highest PDCP sequence number that is successfully received constantly, according to a constant period set by the base station, according to a request of the base station, or according to a polling field setting included in the PDCP header from the base station. Alternatively, the terminal may detect whether the PDCP SDUs/PDUs that are received through the Ux interface have been lost constantly, according to a constant period set by the base station, according to a request of the base station, or according to a polling field setting. If the PDCP SDUs/PDUs are detected to be out of sequence or to have been lost, the terminal may transmit, to the base station, the sequence numbers of the PDCP PDUs that are declared to have been lost by the terminal. Alternatively, the terminal may transmit, to the base station, the sequence numbers of the PDCP SDUs/PDUs that are declared to have been lost by the terminal constantly or according to, a constant period set by the base station, a request of the base station, or a polling field setting.

As described above, the information on the highest PDCP sequence number that is successfully received or the information on the sequence numbers of the PDCP SDUs/PDUs that are declared as being lost by the terminal may be included in the control information for the indication/acknowledgment for the successful reception of the data described above.

For example, the control information may be transmitted through the uplink Ux interface. As another example, the control information may be transmitted through the uplink Uu interface between the base station and the terminal. For example, the control information may be transmitted by using a PDCP status report. Alternatively, the control information may be transmitted through a new format of PDCP control PDU.

Meanwhile, the terminal may declare the PDCP SDU/PDU as being lost, which has not been received: in a constant period set by the base station; by a request of the base station; by a polling field setting that is included in the PDCP SDU/PDU header from the base station; constantly; after the terminal receives the PDCP SDU/PDU that is out of sequence; or after the lapse of expiration time set by the base station since the terminal receives the PDCP SDU/PDU that is out of sequence.

In the case of the downlink transmission, the base station may remove buffered PDCP SDUs/PDUs according to the feedback of the PDCP SDUs/PDUs that are successfully delivered. In the case of the uplink transmission, the terminal may remove buffered PDCP SDUs/PDUs according to the feedback of the PDCP SDUs/PDUs that are successfully delivered.

The base station may configure, in the terminal, the information that instructs to transmit the control information on the indication/acknowledgment for a successful delivery of the PDCP SDUs/PDUs in the Ux interface by using the PDCP control SDUs/PDUs. Alternatively, the base station may configure, in the terminal, the information that instructs to provide the control information on the indication/acknowledgment for a successful delivery of the PDCP SDUs/PDUs by using the PDCP control SDUs/PDUs. The base station may include the information that instructs to transmit the control information on the indication/acknowledgment for a successful delivery of the PDCP SDUs/PDUs in the Ux interface by using the PDCP control SDUs/PDUs and/or the information (for example, a timer, PollPDU, or PollByte) that is related to the same in the radio bearer configuration information (DRB-ToAddMod) or in the PDCP configuration information (PDCP-CONFIG), and may transmit the same.

Until now, the operations of transmitting data by using a WLAN carrier and transmitting the control information to acknowledge a successful delivery of the data, according to the embodiment of the present disclosure, have been described. For the convenience of explanation, the description above has been made of the case where the terminal receives the downlink data by using a WLAN carrier. However, the embodiments described above may also be applied to the case where the base station receives the uplink data by using a WLAN carrier with the replacement of the entity.

Hereinafter, the operation of the base station will be described with reference to the drawings in relation to the case where the terminal receives the downlink data. Of course, the description described below may also be applied to the case where the terminal transmits the uplink data with the replacement of the entity (base station) by the terminal.

Figure 24:
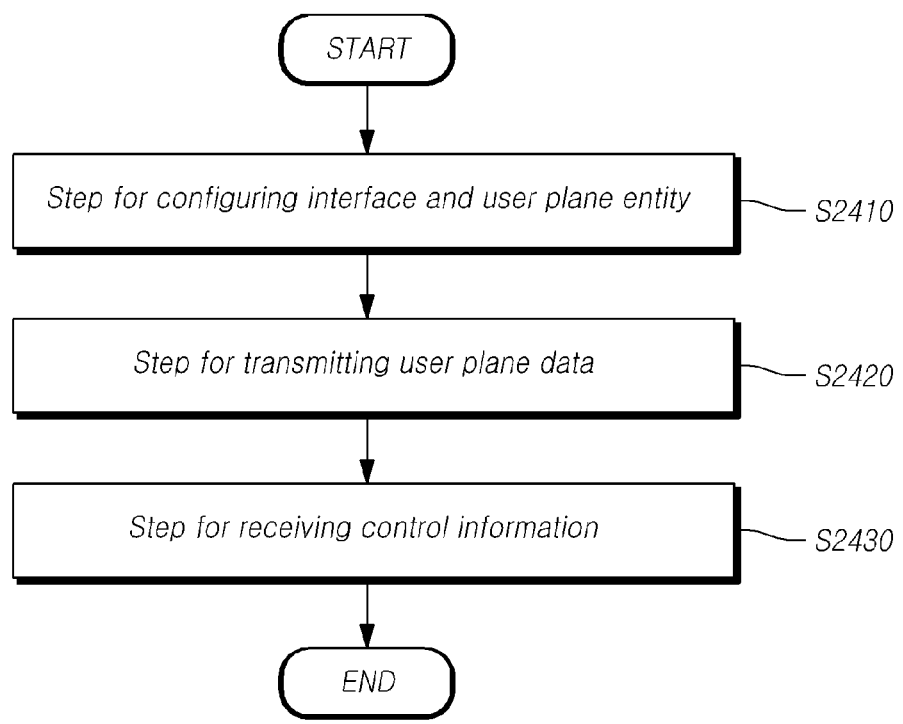
FIG. 24 is a view for explaining operation of a base station, according to an embodiment of the present disclosure.

FIG. 24 is a flowchart for explaining operation of a base station, according to an embodiment of the present disclosure.

The base station, according to another embodiment of the present disclosure, may execute the steps of: configuring an interface and a user plane entity for transmitting or receiving data to or from the terminal through a WLAN carrier; transmitting user plane data to the terminal through an interface; and receiving, from the terminal, control information indicating the successful or unsuccessful reception of the user plane data through the interface or the interface between the terminal and the base station.

Referring to FIG. 24, the base station may execute configuring an interface and a user plane entity for transmitting or receiving data to or from the terminal through a WLAN carrier (S2410). For example, the base station of the present disclosure may configure a data transmission/reception interface with the terminal by using a WLAN carrier. As shown in the scenarios described with reference to FIG. 16 to FIG. 19, the base station of the present disclosure may configure a data transmission/reception interface through a WLAN carrier for each of a variety of scenarios. For example, the base station may configure an interface for transmitting the downlink data that is transmitted to the terminal through a WLAN termination. Alternatively, the base station may also configure an interface for receiving the uplink data through a WLAN termination. Alternatively, the base station may configure an interface for transmitting or receiving data to or from the terminal by using both the E-UTRAN carrier and the WLAN carrier.

Meanwhile, the base station may configure a user plane entity to transmit or receive data through a WLAN carrier. The user plane entity refers to a functional entity for transmitting or receiving data by using a WLAN carrier, and may be configured with an entity that is peered with the terminal.

In addition, the user plane entity may be configured to be associated with each data radio bearer. That is, it may be determined whether the user plane entity is configured for each data radio bearer. For example, the user plane entity may not be configured in the case of a data radio bearer that does not use a WLAN carrier, and the user plane entity may be configured only in the case of a data radio bearer using a WLAN carrier.

The base station may transmit configuration information for configuring the user plane entity to the terminal. The configuration information for configuring the user plane entity may be included in the radio bearer configuration information to then be received. That is, each piece of the radio bearer configuration information may include the configuration information for the user plane entity that is configured for each radio bearer. For example, in the case of a radio bearer that transmits or receives data only by using the E-UTRAN carrier, the radio bearer configuration information may not include the configuration information for configuring the user plane entity. On the contrary, in the case of a data radio bearer that uses a WLAN carrier, the radio bearer configuration information may include the configuration information for configuring the user plane entity. The radio bearer configuration information may be transmitted through an upper layer signaling. For example, the radio bearer configuration information may be included in an RRC message, such as an RRC connection reconfiguring message, to then be transmitted.

The base station may execute transmitting the user plane data to the terminal through the interface (S2420). For example, as described with reference to FIG. 16 to FIG. 19, the base station may transmit the user plane data through a WLAN carrier according to each scenario. In this case, the data may be transmitted through the interface that is configured in the step S2410 and uses a WLAN carrier. That is, the base station may process the data to be transmitted through the WLAN carrier by means of the user plane entity.

The base station may execute receiving, from the terminal, the control information indicating the successful or unsuccessful reception of the user plane data through the interface or through the interface between the terminal and the base station (S2430). For example, the control information may include information that acknowledges or indicates the successful reception of the data transmitted by the PDCP entity described above. That is, the terminal may transmit, to the base station, the control information that includes the information indicating whether the data is successfully received through the WLAN carrier, and the base station may receive the control information.

In this case, the control information may be provided from the user plane entity or the PDCP entity. For example, the user plane entity of the terminal may check whether the PDCP PDU has been successfully received. If the PDCP PDU is missing or is received out of sequence, the user plane entity may include information on the same in the control information and transmitted to the base station. Alternatively, the PDCP entity of the terminal may check whether the PDCP PDU has been successfully received. If the PDCP PDU is missing or is received out of sequence, the PDCP entity may include information on the same in the control information and be transmitted to the base station. Alternatively, the transmission of the control information may be triggered based on the polling of the base station, a period set by the base station, or a timer set by the same. In this case, the base station may transmit the period or timer information for transmitting the control information in advance.

Meanwhile, the control information may be received by the base station through an interface that is configured to process the data by using a WLAN carrier. Alternatively, the control information may be received by the base station through an interface between the terminal and the base station neither of which use a WLAN carrier. That is, the control information may be received through an interface using the WLAN carrier, or may be received through an interface using only the E-UTRAN carrier.

The present disclosure described above will also provide an effect in which the typical PDCP function can be operated in the same manner even when the base station and the terminal add the WLAN carrier to then transmit or receive the data. In addition, the present disclosure also provides an effect in which the retransmission procedure can be executed by identifying the completion of the reception of data even when the base station and the terminal add the WLAN carrier to then transmit or receive the data.

The configurations of the terminal and the base station that can execute the embodiments of the present disclosure will be described with reference to the drawings.

Figure 25:
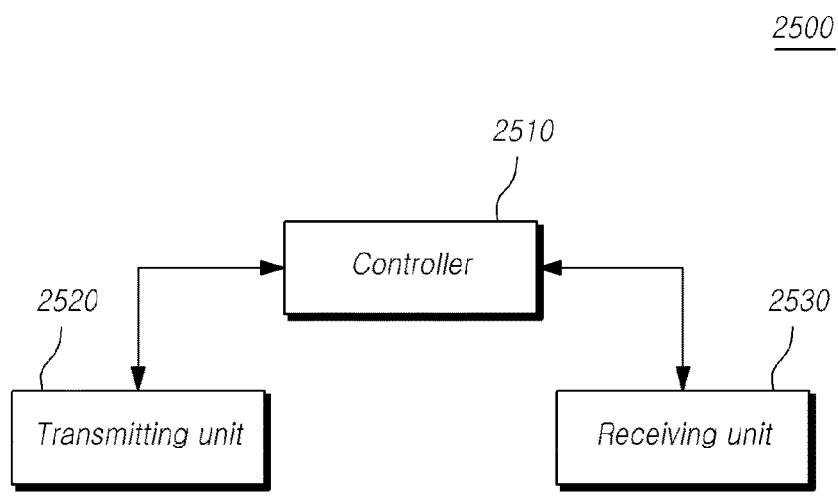
FIG. 25 is a view illustrating a configuration of a terminal, according to an embodiment of the present disclosure.

FIG. 25 illustrates a terminal, according to an embodiment of the present disclosure.

Referring to FIG. 25, the terminal 2500, according to an embodiment of the present disclosure, may include: a controller 2510 that configures an interface and a user plane entity for transmitting or receiving data to or from the base station through a WLAN carrier; a receiving unit 2530 that receives user plane data from the base station through the interface; and a transmitting unit 2520 that transmits, to the base station, the control information indicating the successful or unsuccessful reception of the user plane data through the interface or through the interface between the terminal and the base station.

In addition, the controller 2510 may be associated with each data radio bearer to configure a user plane entity. The controller 2510 may control the overall operations of the terminal that executes the present disclosure described above for transmitting specific user plane data, wherein the operations include: adding a WLAN carrier as a carrier to the E-UTRAN; and performing a split or interworking function with respect to the user plane data in the PDCP layer, which is necessary for the transmission of the user plane data through an E-UTRAN carrier and/or a WLAN carrier.

The receiving unit 2530 may receive the radio bearer configuration information including the configuration information for configuring the user plane entity through an upper layer signaling. Furthermore, the receiving unit 2530 receives downlink control information, data, or messages from the base station through the corresponding channel.

The transmitting unit 2520 may transmit the control information containing the information on the indication/acknowledgment for the successful reception of the data by using an interface through the WLAN carrier or through an interface between the terminal and the base station. The control information may be provided from the user plane entity or the PDCP entity. The control information may be triggered based on at least one of the polling of the base station or a period or timer that is set by the base station. The transmitting unit 2520 transmits, to the base station, uplink control information, data, or messages through the corresponding channel.

In addition, the controller 2510, the transmitting unit 2520, and the receiving unit 2530 may perform all of the operations of the terminal 2500 necessary for the execution of the present disclosure described with reference to FIGS. 16 to 24.

Figure 26:
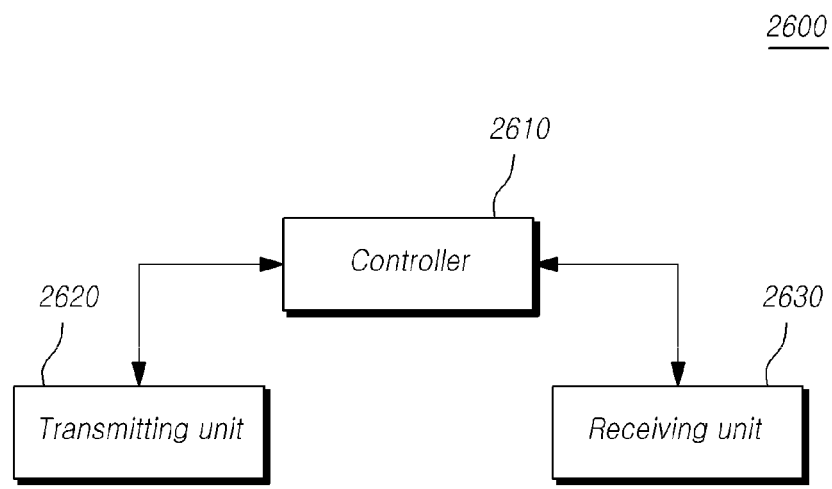
FIG. 26 is a view illustrating a configuration of a base station, according to another embodiment of the present disclosure.

FIG. 26 illustrates a base station, according to an embodiment of the present disclosure.

Referring to FIG. 26, the base station 2600, according to an embodiment of the present disclosure, may include: a controller 2610 that configures an interface and a user plane entity for transmitting or receiving data to or from a terminal through a WLAN carrier; a transmitting unit 2620 that transmits user plane data to the terminal through the interface; and a receiving unit 2630 that receives, from the terminal, the control information indicating the successful or unsuccessful reception of the user plane data through the interface or through the interface between the terminal and the base station.

The controller 2610 may be associated with each data radio bearer to configure a user plane entity. In addition, the controller 2610 may control the overall operations of the base station 2600 that executes the at least one embodiment of the present disclosure described above for transmitting or receiving specific user plane data, wherein the operations include: adding a WLAN carrier as a carrier to the E-UTRAN; and performing a split or interworking function with respect to the user plane data unit in the PDCP layer, which is necessary for the transmission and reception of the user plane data through the E-UTRAN carrier and/or the WLAN carrier.

The transmitting unit 2620 may transmit, to the terminal, the radio bearer configuration information including the configuration information for configuring the user plane entity through an upper layer signaling.

The receiving unit 2630 may receive, from the terminal, the control information indicating the successful or unsuccessful reception of the user plane data through the interface or through the interface between the terminal and the base station. The control information may be provided from the user plane entity or the PDCP entity of the terminal. In addition, the control information may be triggered based on at least one of the polling of the base station or a period or timer that is set by the base station.

Furthermore, the transmitting unit 2620 and the receiving unit 2630 may be used to transmit or receive signals, messages, or data necessary for the execution of the present disclosure described above.

The standard content or standard documents, which have been omitted for the simplicity of the description in the embodiments described above, are incorporated in the present specification. Therefore, the addition or insertion of some of the standard content or standard documents to the present specification or the claims should be construed to fall within the scope of the invention.

Although a preferred embodiment of the present disclosure has been described for illustrative purposes, those skilled in the art will appreciate that various modifications, additions, and substitutions are possible, without departing from the scope and spirit of the invention as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

CROSS-REFERENCE TO RELATED APPLICATION

This application claims priority from and the benefit under 35 U.S.C. § 119(a) of Korean Patent Application Nos. 10-2014-0124570, filed on Sep. 18, 2014, 10-2014-0133265, filed on Oct. 2, 2014, 10-2015-0067822, filed on May 15, 2015, 10-2015-0114273, filed on Aug. 13, 2015, and 10-2015-0114278, filed on Aug. 13, 2015 which are hereby incorporated by reference for all purposes as if fully set forth herein. Also, when this application claims the priority benefit of the same Korean Patent Applications from countries in addition to the U.S., the disclosure will be incorporated herein by reference.

The invention claimed is:

1. A method for processing data by a terminal, the method comprising:

configuring a user plane entity for receiving data from a base station through a wireless local area network (WLAN) carrier, wherein the user plane entity is configured as a separate entity from a packet data convergence protocol (PDCP) entity;

receiving, by the user plane entity, user plane data from the base station through the WLAN carrier; and transmitting control information indicating successful or unsuccessful reception of the user plane data through the WLAN carrier to the base station through an interface between the terminal and the base station.

2. The method according to claim 1, wherein the user plane entity is configured in a lower layer of a PDCP layer.

3. The method according to claim 1, further comprising receiving radio bearer configuration information or PDCP configuration information including parameters for transmission of the control information through an upper layer signaling,
wherein the parameters for the transmission of the control information include at least one piece of information instructing the transmission of the control information, information on a transmission method of the control information, or information on a transmission period thereof.

4. The method according to claim 1, wherein the control information is provided from at least one of the user plane entity and the PDCP entity.

5. The method according to claim 1, wherein the transmission of the control information is triggered based on at least one of polling of the base station, a period and a timer, which is set by the base station.

6. A method for processing data by a base station, the method comprising:
configuring a user plane entity for transmitting data to a terminal through a wireless local area network (WLAN) carrier, wherein the user plane entity is configured as a separate entity from a packet data convergence protocol (PDCP) entity;
transmitting, by the user plane entity, user plane data to the terminal through the WLAN carrier; and
receiving control information indicating successful or unsuccessful reception of the user plane data through the WLAN carrier from the terminal through an interface between the terminal and the base station.

7. The method according to claim 6, wherein the user plane entity is configured in a lower layer of a PDCP layer.

8. The method according to claim 6, further comprising transmitting radio bearer configuration information or PDCP configuration information including parameters for transmission of the control information of the terminal through an upper layer signaling,
wherein the parameters for the control information transmission include at least one piece of information instructing the transmission of the control information, information on a transmission method of the control information, and information on a transmission period thereof.

9. The method according to claim 6, wherein the control information is provided from at least one of the user plane entity and a PDCP entity of the terminal.

10. The method according to claim 6, wherein the transmission of the control information is triggered based on at least one of polling of the base station, a period, and a timer, which is set by the base station.

11. A terminal for processing data, the terminal comprising:
a controller configured to configure a user plane entity for receiving data from a base station through a wireless local area network (WLAN) carrier, wherein the user plane entity is configured as a separate entity from a packet data convergence protocol (PDCP) entity;
a receiving unit configured to receive, by the user plane entity, user plane data from the base station through the WLAN carrier; and
a transmitting unit configured to transmit control information indicating successful or unsuccessful reception of the user plane data through the WLAN carrier to the base station through an interface between the terminal and the base station.

12. The terminal according to claim 11, wherein the user plane entity is configured in a lower layer of a PDCP layer.

13. The terminal according to claim 11, wherein the receiving unit is configured to receive radio bearer configuration information or PDCP configuration information including parameters for transmission of the control information through an upper layer signaling,
wherein the parameters for the transmission of the control information include at least one piece of information instructing the transmission of the control information, information on a transmission method of the control information, and information on a transmission period thereof.

14. The terminal according to claim 11, wherein the control information is provided from at least one of the user plane entity and the PDCP entity.

15. The terminal according to claim 11, wherein the transmission of the control information is triggered based on at least one of polling of the base station, a period, and a timer, which is set by the base station.

* * * * *